US012619477B2

(12) United States Patent　　　(10) Patent No.:　US 12,619,477 B2

Fontaine et al.　　　　　　　　　(45) Date of Patent:　　May 5, 2026

(54) APPLICATION PROGRAMMING INTERFACE TO CAUSE GRAPH CODE TO WAIT ON A SEMAPHORE

(71) Applicant: NVIDIA Corporation, Santa Clara, CA (US)

(72) Inventors: David Anthony Fontaine, Mountain View, CA (US); Jason David Gaiser, Campbell, CA (US); Steven Arthur Gurfinkel, San Francisco, CA (US); Sally Tessa Stevenson, Broomfield, CO (US); Vladislav Zhurba, San Jose, CA (US); Stephen Anthony Bernard Jones, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 330 days.

(21) Appl. No.: 17/549,620

(22) Filed: Dec. 13, 2021

(65) Prior Publication Data

US 2023/0244549 A1　　Aug. 3, 2023

(51) Int. Cl.
| | |
|---|---|
| *G06F 9/52* | (2006.01) |
| *G06F 9/38* | (2018.01) |
| *G06F 9/48* | (2006.01) |
| *G06F 9/50* | (2006.01) |
| *G06F 9/54* | (2006.01) |

(52) U.S. Cl.
CPC .............. *G06F 9/52* (2013.01); *G06F 9/3877* (2013.01); *G06F 9/48* (2013.01); *G06F 9/4843* (2013.01); *G06F 9/4881* (2013.01); *G06F 9/50* (2013.01); *G06F 9/5005*

(2013.01); *G06F 9/5038* (2013.01); *G06F 9/526* (2013.01); *G06F 9/541* (2013.01)

(58) Field of Classification Search
CPC ........ G06F 9/48; G06F 9/4843; G06F 9/4881; G06F 9/50; G06F 9/5005; G06F 9/5016; G06F 9/5038; G06F 9/52; G06F 9/526; G06F 9/541
See application file for complete search history.

(56) References Cited

U.S. PATENT DOCUMENTS

| | | | |
|---|---|---|---|
| 6,212,572 | B1 | 4/2001 | Aydin et al. |
| 6,237,019 | B1 | 5/2001 | Ault et al. |
| 6,286,052 | B1 | 9/2001 | McCloghrie et al. |
| 6,519,623 | B1 | 2/2003 | Mancisidor |
| 6,538,651 | B1 | 3/2003 | Hayman et al. |
| 7,437,535 | B1 | 10/2008 | Joffe et al. |
| 7,861,060 | B1 | 12/2010 | Nickolls et al. |

(Continued)

OTHER PUBLICATIONS

Escobar et al., "Boosting concurrency in Parallel State Machine Replication", Middleware '19, Dec. 8-13, 2019, ACM, pp. 228-240 (Year: 2019).*

(Continued)

*Primary Examiner* — Charles M Swift

(74) *Attorney, Agent, or Firm* — Davis Wright Tremaine LLP

(57) ABSTRACT

Apparatuses, systems, and techniques to facilitate graph code synchronization between application programming interfaces. In at least one embodiment, one or more circuits are to perform an application programming interface (API) to cause graph code to wait on a semaphore used by another API.

28 Claims, 50 Drawing Sheets

(56) References Cited

U.S. PATENT DOCUMENTS

| | | | |
|---|---|---|---|
| 8,387,075 | B1 | 2/2013 | McCann et al. |
| 8,402,229 | B1 | 3/2013 | Wilt et al. |
| 8,539,516 | B1 | 9/2013 | Wilt et al. |
| 11,847,507 | B1 | 12/2023 | Borkovic |
| 2008/0005200 | A1 | 1/2008 | Tysowski et al. |
| 2009/0217294 | A1 | 8/2009 | Dixon et al. |
| 2010/0169887 | A1 | 7/2010 | Waas |
| 2010/0289804 | A1* | 11/2010 | Jackman ............... G06F 9/547 |
| | | | 345/520 |
| 2013/0332937 | A1 | 12/2013 | Gaster et al. |
| 2014/0229953 | A1 | 8/2014 | Sevastiyanov et al. |
| 2015/0007182 | A1 | 1/2015 | Rossbach et al. |
| 2015/0268992 | A1 | 9/2015 | Fan |
| 2016/0210721 | A1 | 7/2016 | Taylor |
| 2018/0197267 | A1 | 7/2018 | Wu et al. |
| 2018/0276040 | A1 | 9/2018 | Hosmani et al. |
| 2019/0139181 | A1 | 5/2019 | Virolainen et al. |
| 2019/0317806 | A1* | 10/2019 | Isoda ....................... G06F 8/75 |
| 2019/0391796 | A1* | 12/2019 | Brady ..................... G06F 8/458 |
| 2020/0104968 | A1 | 4/2020 | Jane et al. |
| 2020/0364088 | A1 | 11/2020 | Ashwathnarayan et al. |
| 2020/0410629 | A1 | 12/2020 | Viggers et al. |
| 2021/0224117 | A1 | 7/2021 | Gosik |
| 2021/0248115 | A1 | 8/2021 | Jones et al. |
| 2021/0263766 | A1 | 8/2021 | Dunajski et al. |
| 2021/0326175 | A1 | 10/2021 | Herbert |
| 2021/0406069 | A1 | 12/2021 | Koneru et al. |

OTHER PUBLICATIONS

International Search Report and Written Opinion for Application No. PCT/US2022/081401, mailed Apr. 26, 2023, filed Dec. 12, 2022, 17 pages.

International Search Report and Written Opinion for Application No. PCT/US2022/081414, mailed Apr. 28, 2023, filed Dec. 13, 2022, 17 pages.

NVIDIA, "CUDA C++ Programming Guide v11.5.1," retrieved from http://docs.nvidia.com/cuda/archive/1.5.1/pdf/CUDA_C_Programming_Guide.pdf, Nov. 23, 2021, 12 pages.

NVIDIA, "CUDA Runtime API v11.5.1," retrieved from http://docs.nvidia.com/cuda/archive/1.5.1/pdf/CUDA_Runtime_API.pdf, Nov. 21, 2021, 95 pages.

IEEE, "IEEE Standard 754-2008 (Revision of IEEE Standard 754-1985): IEEE Standard for Floating-Point Arithmetic," Aug. 29, 2008, 70 pages.

NVIDIA, "CUDA C++ Programming Guide", NVIDIA, v11.1.1, 40-48 and 75-100 (last updated: Oct. 27, 2020), 379 pages.

NVIDIA, "CUDA RuntimeAPI", Jul. 2019, NVIDIA, v11.1.1, 308-372 and 492-495 (last updated: Oct. 27, 2020), 553 pages.

Cabezas et al., Runtime and Architecture Support for Efficient Data Exchange in Multi-Accelerator Applications, Apr. 22, 2014, IEEE Transactions on Parallel and Distributed Systems, 26(5): Apr. 22, 2014, 14 pages.

Cabezas et al., Runtime and Architecture Support for Efficient Data Exchange in Multi-Accelerator Applications, IEEE Transactions on Parallel and Distributed Systems, 26(5): Apr. 22, 2014, 14 pages.

Wikipedia, "API", Wikipedia, 2021, 14 pages.

* cited by examiner

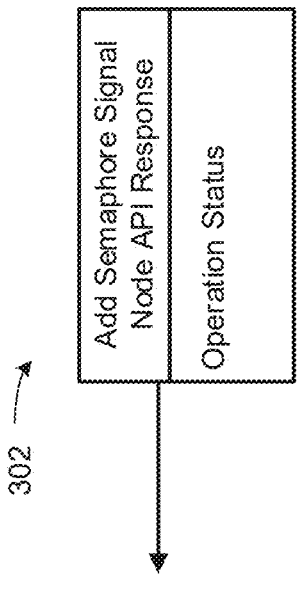
302
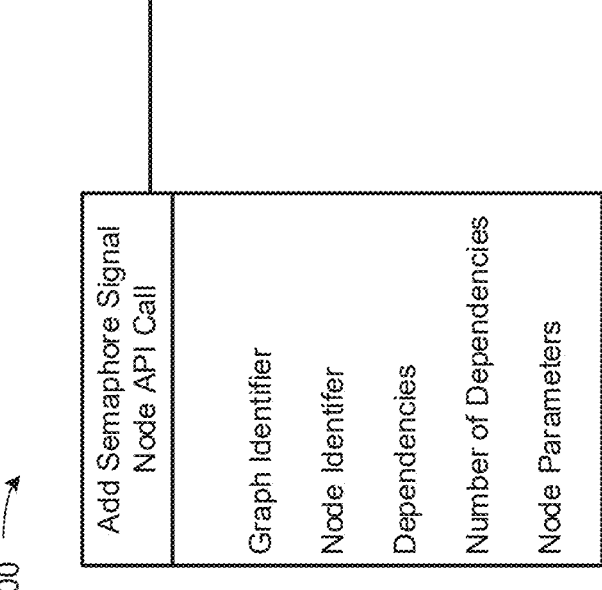
300
FIG. 3

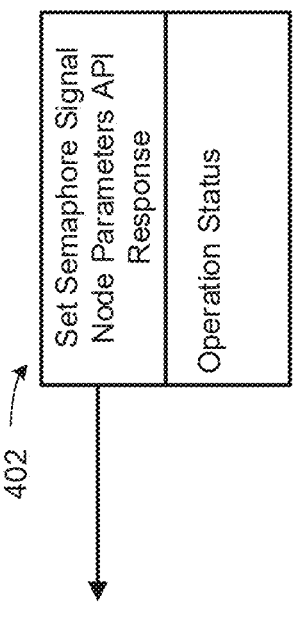
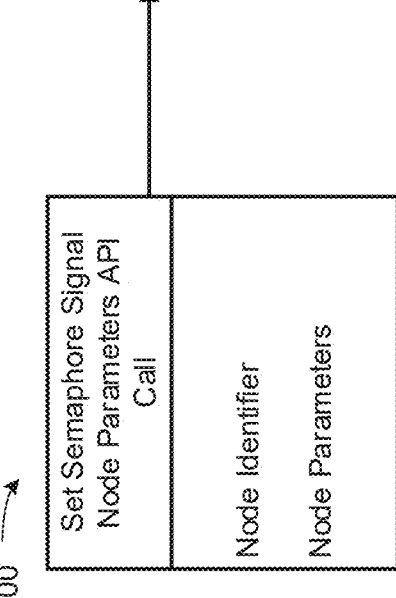
FIG. 4

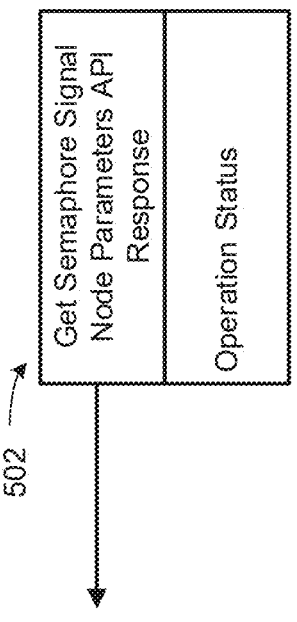
502
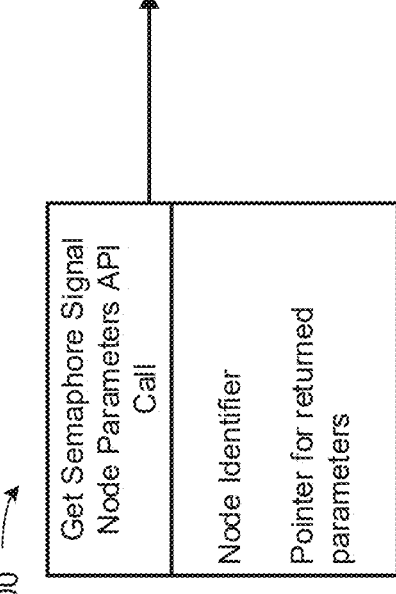
500
FIG. 5

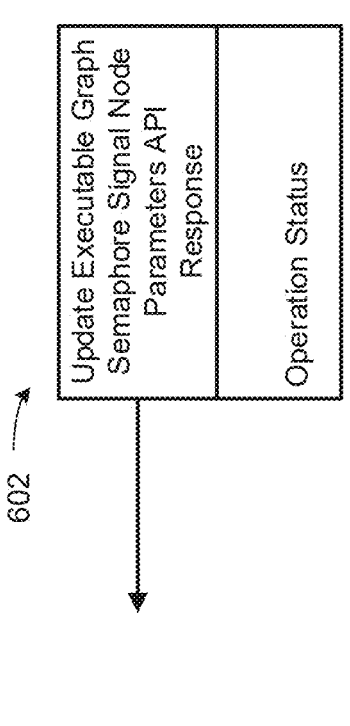
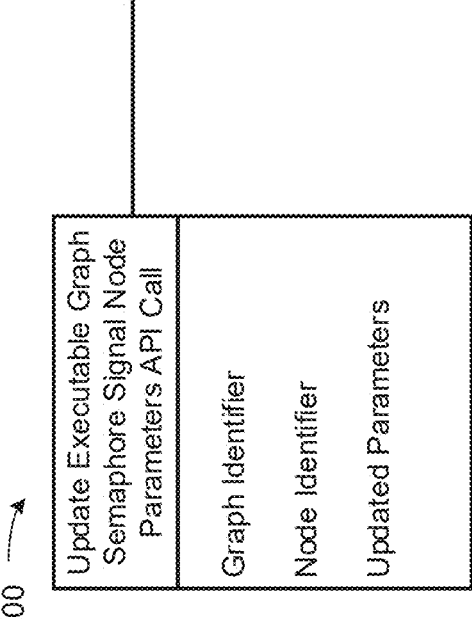
FIG. 6

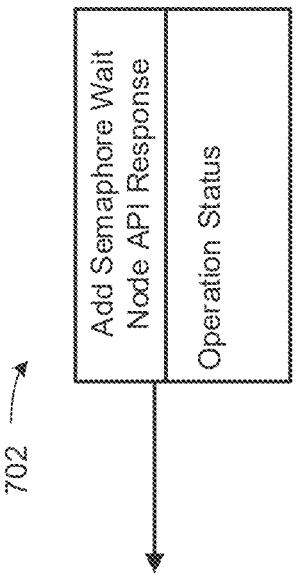
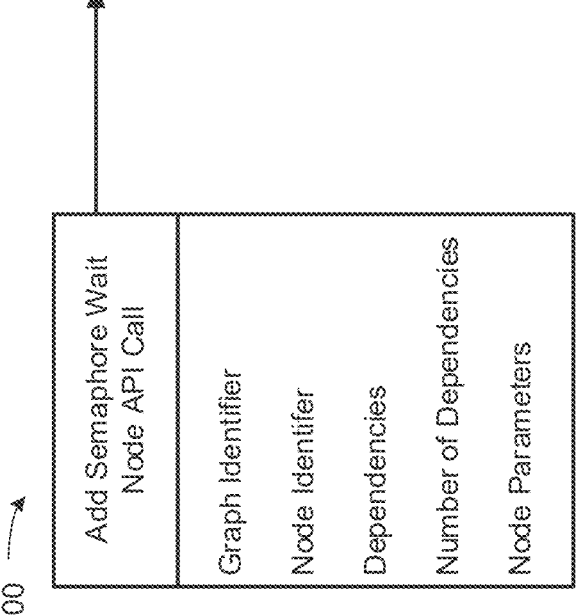
FIG. 7

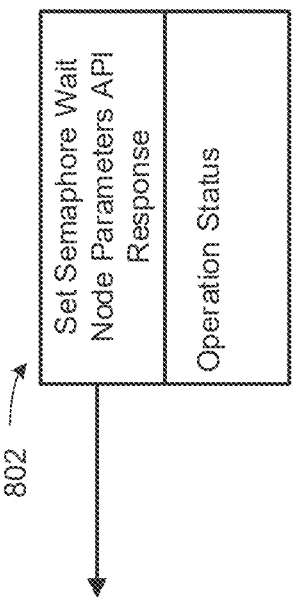
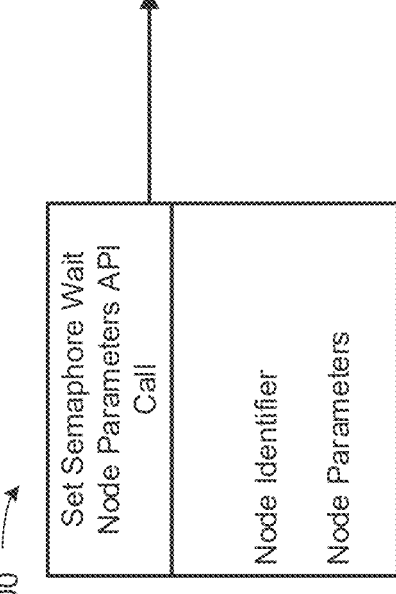
FIG. 8

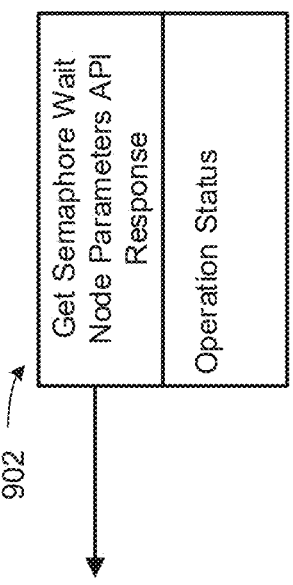
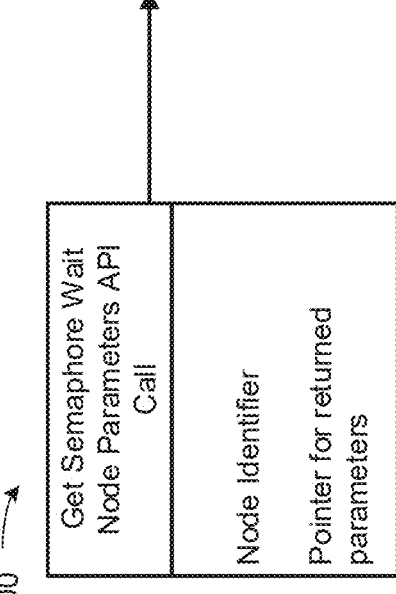
FIG. 9

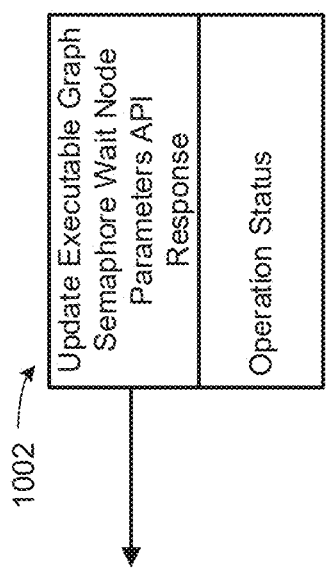
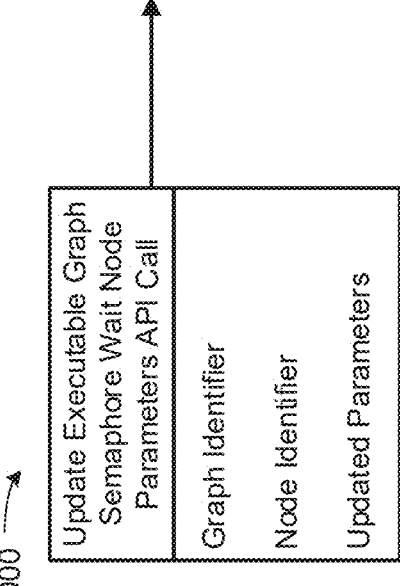
FIG. 10

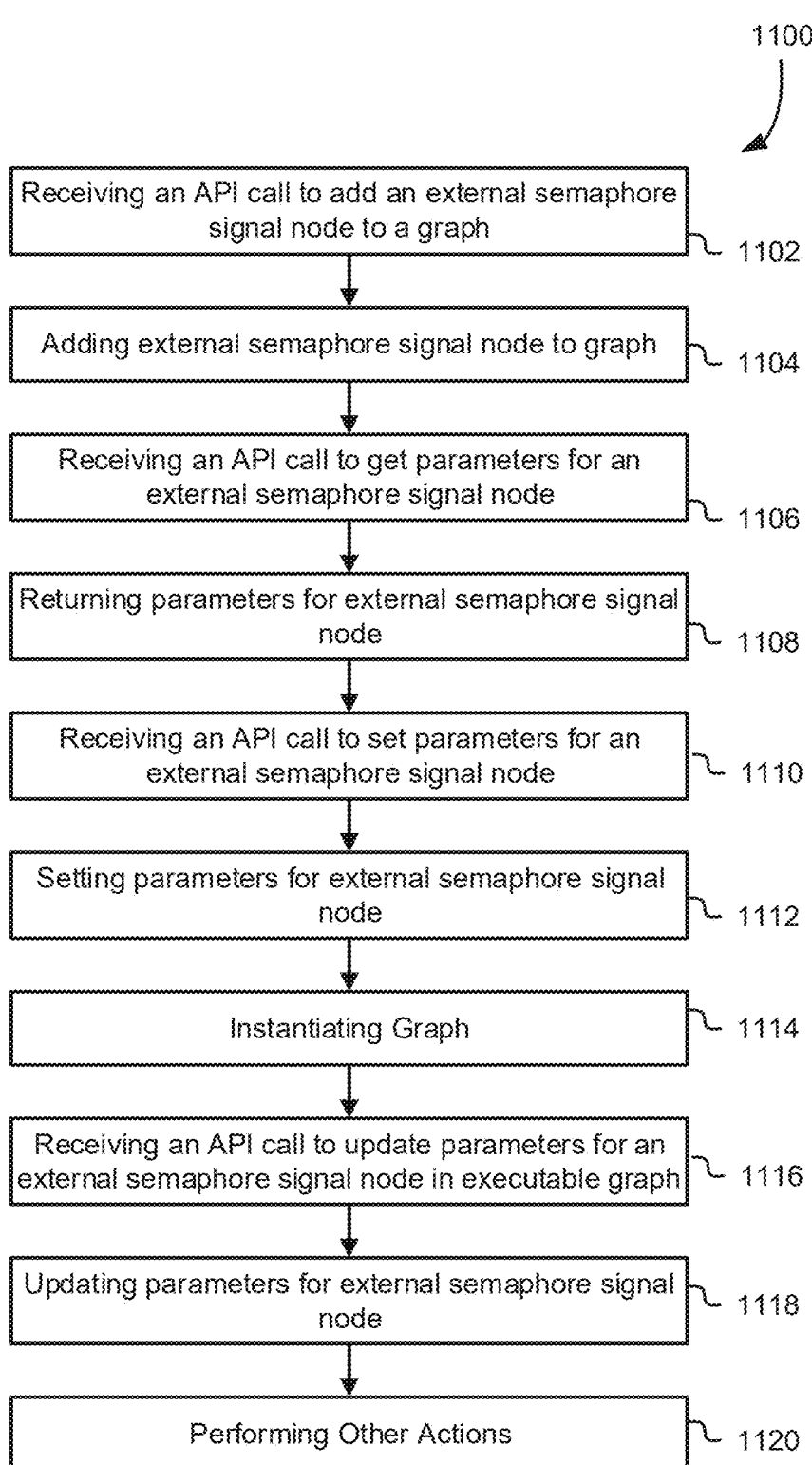

1100

Receiving an API call to add an external semaphore signal node to a graph — 1102

Adding external semaphore signal node to graph — 1104

Receiving an API call to get parameters for an external semaphore signal node — 1106

Returning parameters for external semaphore signal node — 1108

Receiving an API call to set parameters for an external semaphore signal node — 1110

Setting parameters for external semaphore signal node — 1112

Instantiating Graph — 1114

Receiving an API call to update parameters for an external semaphore signal node in executable graph — 1116

Updating parameters for external semaphore signal node — 1118

Performing Other Actions — 1120

FIG. 11

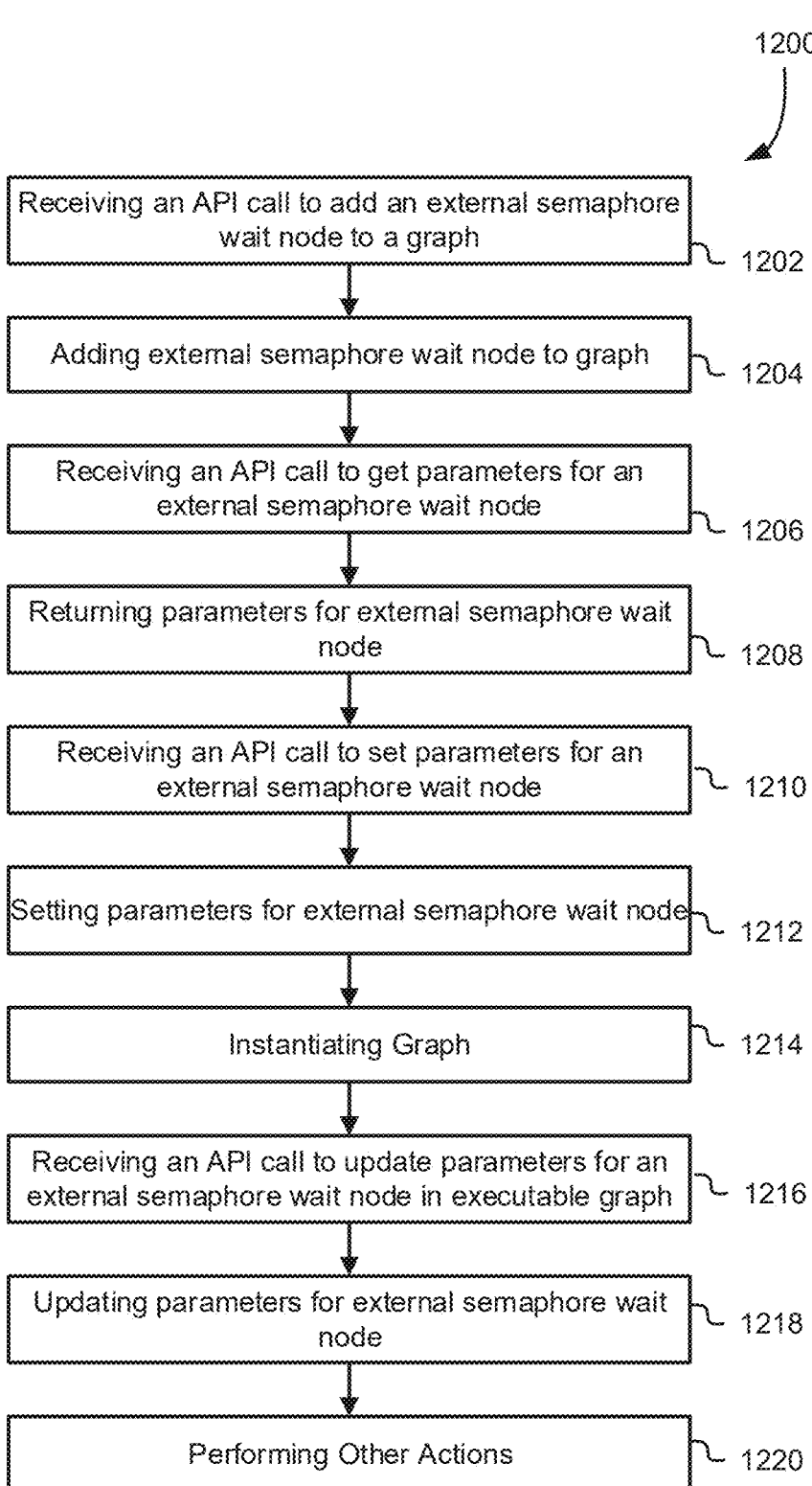

1200

Receiving an API call to add an external semaphore wait node to a graph                    1202

Adding external semaphore wait node to graph                    1204

Receiving an API call to get parameters for an external semaphore wait node                    1206

Returning parameters for external semaphore wait node                    1208

Receiving an API call to set parameters for an external semaphore wait node                    1210

Setting parameters for external semaphore wait node                    1212

Instantiating Graph                    1214

Receiving an API call to update parameters for an external semaphore wait node in executable graph                    1216

Updating parameters for external semaphore wait node                    1218

Performing Other Actions                    1220

FIG. 12

DATA CENTER
1300
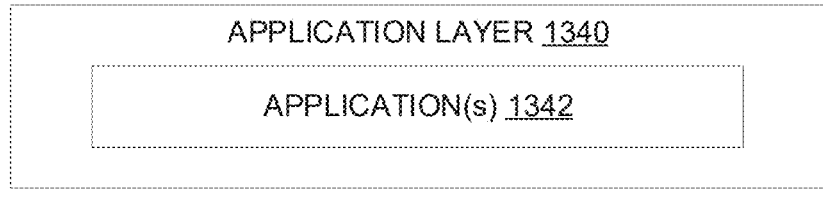
APPLICATION LAYER 1340
APPLICATION(s) 1342
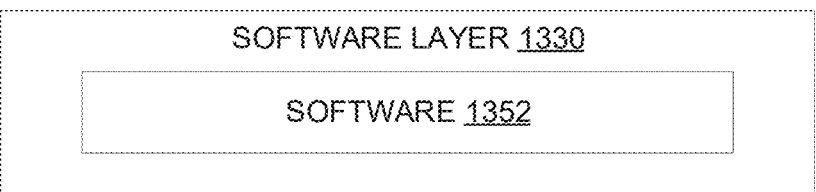
SOFTWARE LAYER 1330
SOFTWARE 1352
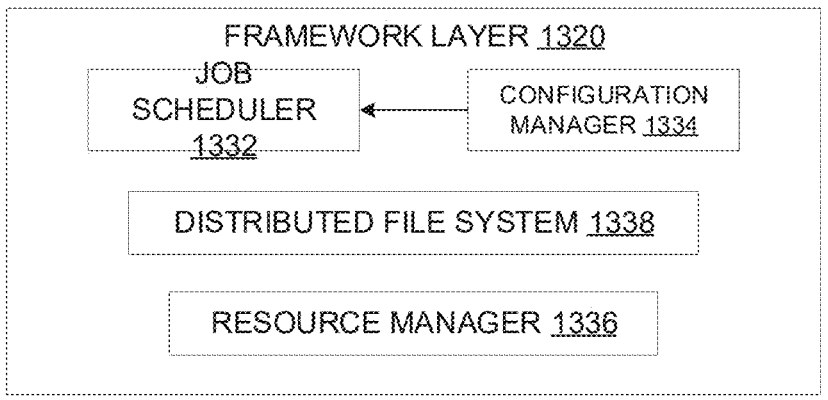
FRAMEWORK LAYER 1320
JOB SCHEDULER 1332 ← CONFIGURATION MANAGER 1334
DISTRIBUTED FILE SYSTEM 1338
RESOURCE MANAGER 1336
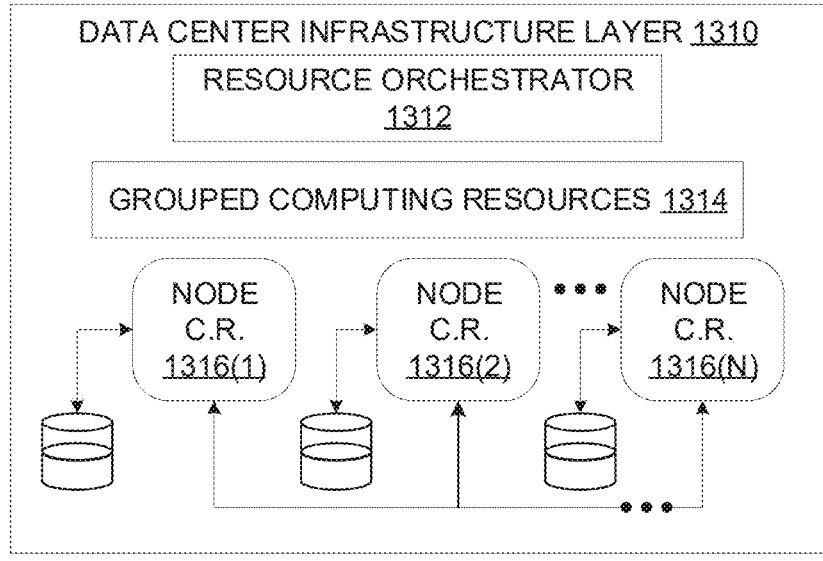
DATA CENTER INFRASTRUCTURE LAYER 1310
RESOURCE ORCHESTRATOR 1312
GROUPED COMPUTING RESOURCES 1314
NODE C.R. 1316(1)    NODE C.R. 1316(2)   • • •   NODE C.R. 1316(N)
FIG. 13

GRAPHICS PROCESSOR
2210

VERTEX PROCESSOR
2205

FRAGMENT PROCESSOR 2215A

FRAGMENT PROCESSOR 2215C

FRAGMENT PROCESSOR 2215N-1

FRAGMENT PROCESSOR 2215B

FRAGMENT PROCESSOR 2215D

FRAGMENT PROCESSOR 2215N

MMU 2220A

MMU 2220B

CACHE 2225A

CACHE 2225B

INTERCONNECT 2230A

INTERCONNECT 2230B

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
} int main()
{
    ...
    // Kernel call
    dim3 threadsPerBlock(16, 16);
    dim3 numBlocks(N / threadsPerBlock.x, N / threadsPerBlock.y);
    MatAdd<<<numBlocks, threadsPerBlock>>>(A, B, C);
    ...
}
```

CUDA Source Code
4010

CUDA to HIP Translation Tool 4020

CUDA Kernel Launch Syntax 4110

KernelName<<<GridSize, BlockSize,
SharedMemorySize,
Stream>>>(KernelArguments);

HIP Kernel Launch Syntax 4120 hipLaunchKernelGGL(KernelName, GridSize,
BlockSize, SharedMemorySize, Stream,
KernelArguments);

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
} int main()
{
    ...
    // Kernel invocation
    dim3 threadsPerBlock(16, 16);
    dim3 numBlocks(N / threadsPerBlock.x, N / threadsPerBlock.y);
    hipLaunchKernelGGL(MatAdd, numBlocks, threadsPerBlock, 0, 0, A, B, C);
    ...
}
```

HIP Source Code
4030

FIG. 41

APPLICATION PROGRAMMING INTERFACE TO CAUSE GRAPH CODE TO WAIT ON A SEMAPHORE

TECHNICAL FIELD

At least one embodiment pertains to processing resources used to execute one or more programs written for a parallel computing platform and application interface. For example, at least one embodiment pertains to processors or computing systems that perform an application programming interface (API) according to various novel techniques described herein.

BACKGROUND

Performing computational operations using code from a first API and code from another API can use significant time, power, or computing resources. The amount of time, power, or computing resources can be improved.

BRIEF DESCRIPTION OF DRAWINGS

FIG. 3 illustrates a diagram of an add semaphore signal node API call, according to at least one embodiment;

FIG. 4 illustrates a diagram of a set semaphore signal node parameters API call, according to at least one embodiment;

FIG. 5 illustrates a diagram of a get semaphore signal node parameters API call, according to at least one embodiment;

FIG. 6 illustrates a diagram of an update executable graph semaphore signal node parameters API call, according to at least one embodiment;

FIG. 7 illustrates a diagram of an add semaphore wait node API call, according to at least one embodiment;

FIG. 8 illustrates a diagram of a set semaphore wait node parameters API call, according to at least one embodiment;

FIG. 9 illustrates a diagram of a get semaphore wait node parameters API call, according to at least one embodiment;

FIG. 10 illustrates a diagram of an update executable graph semaphore wait node parameters API call, according to at least one embodiment;

FIG. 11 is a flowchart of a technique of adding and updating a semaphore signal node, according to at least one embodiment;

FIG. 12 is a flowchart of a technique of adding and updating a semaphore wait node, according to at least one embodiment;

FIG. 13 illustrates an exemplary data center, in accordance with at least one embodiment;

FIG. 41 illustrates an exemplary kernel translated by CUDA-to-HIP translation tool of FIG. 40C, in accordance with at least one embodiment;

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Figure 1:
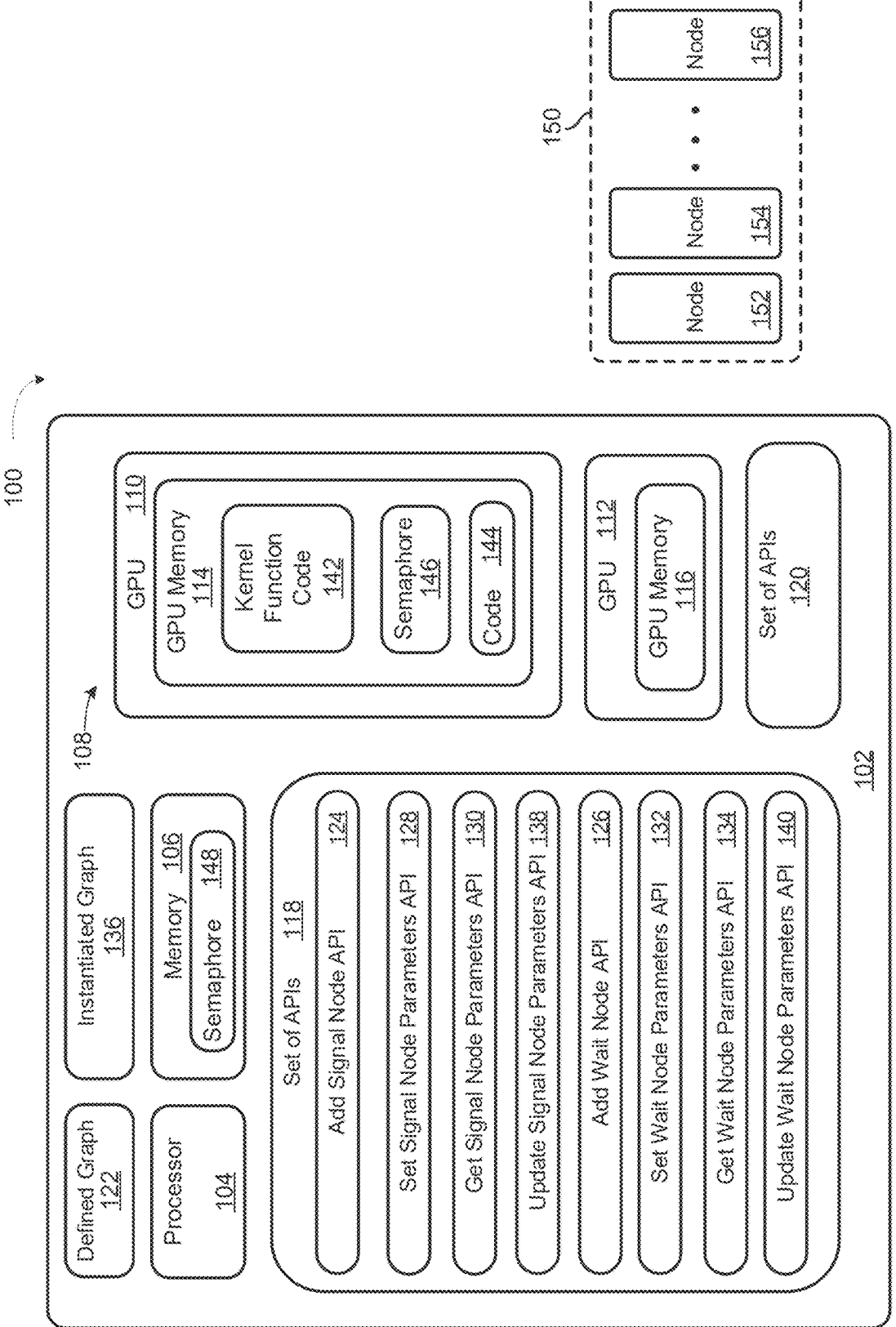
FIG. 1 is a block diagram that illustrates a computing environment, according to at least one embodiment.

FIG. 1 is a block diagram that illustrates a computing environment 100, according to at least one embodiment. In at least one embodiment, a computer system 102 includes a processor 104, a memory 106, and a set of graphics processing units (GPUs) 108. In at least one embodiment, set of GPUs 108 includes a GPU 110 and a GPU 112. In at least one embodiment, set of GPUs 108 includes a different number of GPUs (e.g., fewer or more than two GPUs). In at least one embodiment, GPU 110 includes a GPU memory 114 and GPU 112 includes a GPU memory 116. In at least one embodiment, GPU memory 114 and/or GPU memory 116 includes more than one level and/or type of memory (e.g., global memory accessible by entire GPU, memory accessible by a subset of processors on GPU, cache memory accessible by an individual processor on GPU). In at least one embodiment, a different number of processors (e.g., more than one processor 104) and/or a different number of memories (e.g., more than one memory 106) are included in computer system 102. In at least one embodiment, processor 104 is a central processing unit (CPU). In at least one embodiment, computer system 102 includes one or more other components not shown for clarity (e.g., a network interface card, persistent storage device, one or more input devices, one or more output devices, and/or one or more other suitable components).

In at least one embodiment, processor 102 is a single-core processor. In at least one embodiment, processor 102 is a multi-core processor. In at least one embodiment, processor 102 is an element of a processing system such as processing system 1400 described herein. In at least one embodiment, processor 102 is an element of a computer system such as computer system 1500 described herein. In at least one embodiment, processor 102 is an element of a system such as system 1600 described herein. In at least one embodiment, processor 102 is an element of a computing system such as computing system 1800 described herein. In at least one embodiment, processor 102 is an element of a compute unit such as compute unit 4240 described herein. In at least one embodiment, processor 102 is some other processor shown and/or described herein. In at least one embodiment, one or more GPUs (e.g., GPU 110) in set of GPUs 108 is a graphics processor 2210 described herein. In at least one embodiment, one or more GPUs (e.g., GPU 110) in set of GPUs 108 is a graphics processor 2240 described herein. In at least one embodiment, one or more GPUs (e.g., GPU 110) in set of GPUs 108 is a graphics multiprocessor 2434 described herein. In at least one embodiment, one or more GPUs (e.g., GPU 110) in set of GPUs 108 is a graphics processor 2500 described herein. In at least one embodiment, one or more GPUs (e.g., GPU 110) in set of GPUs 108 is a graphics processor 2708 described herein. In at least one embodiment, one or more GPUs (e.g., GPU 110) in set of GPUs 108 is a GPU 4092 described herein. In at least one embodiment, one or more GPUs (e.g., GPU 110) in set of GPUs 108 is some other GPU shown and/or described herein.

In at least one embodiment, computer system 102 includes a first set of application programming interfaces (APIs) 118 and a second set of APIs 120. In at least one embodiment, when one or more APIs are referred to as performing an action or an aspect of a technique, one or more hardware components (e.g., a CPU, GPU, and/or other hardware component) of a computer system running an API perform that action or aspect of technique. In at least one embodiment, a driver (e.g., a GPU driver), not shown for clarity, performs one or more operations in response to calls to a set of APIs. In at least one embodiment, when an API is referred to as performing an action or an aspect of a technique, a driver running on one or more hardware components performs that action or aspect of technique. In at least one embodiment, a driver includes a library of functions to be used as a driver to make hardware and/or lower-level drivers perform operations.

In at least one embodiment, first set of APIs 118 includes one or more APIs, not shown for clarity (e.g., a define graph API, an instantiate graph API, and/or some other suitable APIs). In at least one embodiment, second set of APIs 120 includes one or more APIs, not shown for clarity (e.g., one or more graphics rendering APIs, or other suitable types of APIs). In at least one embodiment, first set of APIs 118 is a set of APIs for GPUs in set of GPUs 108. In at least one embodiment, second set of APIs 120 is a set of APIs for GPUs in set of GPUs 108. In at least one embodiment, one or more APIs of first set of APIs 118 are to enable nodes in graph code to use external semaphores created and/or allocated by other APIs (e.g., second set of APIs 120).

In at least one embodiment, first set of APIs 118 is referred to as an API (e.g., a driver API or a runtime API) that includes multiple callable functions. In at least one embodiment, first set of APIs 118 is implemented in a dynamic library. In at least one embodiment, first set of APIs 118 is a handle-based, imperative API. In at least one embodiment, first set of APIs 118 is a parallel processing framework API (e.g., a Compute Unified Device Architecture (CUDA) driver API, a Heterogeneous-Compute Interface for Portability (HIP) API, or some other API). In at least one embodiment, first set of APIs 118 is a set of APIs for a programming platform. In at least one embodiment, a programming platform may be, but is not limited to, CUDA, Radeon Open Compute Platform ("ROCm"), OpenCL (OpenCL™ is developed by Khronos group), SYCL, or Intel One API. In at least one embodiment, although some aspects of APIs and/or techniques for synchronizing operations with external semaphores are discussed in relation to CUDA, including CUDA APIs and/or CUDA kernels, it should be understood that ROCm, OpenCL, SYCL, One API, and/or any other suitable APIs and/or kernels may be used. In at least one embodiment, set of APIs 118 is a CUDA driver API. In at least one embodiment, set of APIs 118 is a CUDA runtime API.

In at least one embodiment, first set of APIs 118 is for a different programming platform than second set of APIs 120. In at least one embodiment, first set of APIs 118 is for a first programming platform (e.g., CUDA or some other suitable programming platform), and second set of APIs 120 is for a second programming platform (e.g., Vulkan developed by Khronos Goup, OpenGL developed by Khronos Group, or some other suitable programming platform). In at least one embodiment, graph code generated based, at least in part, on first set of APIs 118 is performed by a first runtime (e.g., using GPU 110 and/or processor 104) of a first programming platform, and code generated based, at least in part, on second set of APIs 120 is performed by a second runtime (e.g., using GPU 110 and/or processor 104) of a second programming platform. In at least one embodiment, first set of APIs 118 uses and/or is a part of a first library (e.g., a CUDA library). In at least one embodiment, second set of APIs 120 uses and/or is a part of a second library (e.g., a Vulkan library). In at least one embodiment, an API means and/or refers to a function of a library. In at least one embodiment, first set of APIs 118 is referred to as an API (e.g., a CUDA driver API or a CUDA runtime API) that includes multiple callable functions (e.g., add signal node API 124, add wait node API 126). In at least one embodiment, second set of APIs 120 is referred to as an API, another API, or other API (e.g., a Vulkan API) that includes multiple callable functions (e.g., an allocate semaphore function, a set semaphore function, a reset semaphore function, and/or one or more graphics rendering functions), not shown for clarity. In at least one embodiment, first set of APIs 118 is handled by and/or is part of a first driver (e.g., a CUDA driver) and second set of APIs 120 is handled by and/or is part of a second driver (e.g., a Vulkan driver or an OpenGL driver). In at least one embodiment, allocating semaphore includes creating semaphore. In at least one embodiment, adding an external semaphore signal node includes creating external semaphore signal node. In at least one embodiment, to signal a semaphore includes updating semaphore, such as by incrementing a counter, or changing semaphore from zero to one or vice versa. In at least one embodiment, adding an external semaphore wait node includes creating external semaphore wait node.

In at least one embodiment, computer system 102 enables defining, instantiating, and/or modifying an execution graph. In at least one embodiment, a graph is defined (e.g., using a define graph API in first set of APIs 118) and stored as defined graph 122. In at least one embodiment, defined graph 122 is created in host code, loaded from disk, built up from libraries, or generated in some other suitable manner. In at least one embodiment, defined graph 122 is stored in memory 106. In at least one embodiment, defined graph 122 includes one or more of a description of nodes of a graph, a description of relationships or dependencies between nodes of a graph, and parameters for nodes of a graph. In at least one embodiment, defined graph 122 is a task graph. In at least one embodiment, in a task graph, a workload that includes multiple tasks is organized as a directed graph, where each node corresponds to a task to be performed, and each directed edge between two nodes corresponds to a data dependency, an execution dependency, or some other dependency between two nodes. In at least one embodiment, a dependency may indicate when a task of one node must complete before a task of another node can begin. In at least one embodiment, a dependency may indicate when one node must wait for data from another node before node can begin and/or continue its task. In at least one embodiment, once a task graph is prepared, a task graph is converted to an executable version of task graph (e.g., an executable graph). In at least one embodiment, an executable graph may be generated from a task graph using instantiation. In at least one embodiment, because converting a task graph to an executable graph has access to an entire task graph, various optimizations may be performed, which may reduce an overall execution time of a workload. In at least one embodiment, an executable graph may be used multiple times to have computing resources perform a same workload without having to be regenerated from a task graph. In at least one embodiment, tasks include kernel functions described by function code to be performed by one or more GPUs.

In at least one embodiment, an add signal node API 124 can be used to add a semaphore signal node to defined graph 122. In at least one embodiment, semaphore signal node is an external semaphore signal node that signals a semaphore allocated and/or created by another API and/or runtime associated with another API (e.g., set of APIs 120). In at least one embodiment, an external semaphore is a semaphore allocated (e.g., in memory) and/or generated by another API and/or runtime (e.g., API such as set of APIs 120 and/or runtime that is not set of APIs 118 or runtime that performs graph code generated by set of APIs 118).

In at least one embodiment, an add wait node API 126 can be used to add a semaphore wait node to defined graph 122. In at least one embodiment, semaphore wait node is an external semaphore wait node that waits, based at least in part, on a semaphore allocated and/or created by another API and/or runtime associated with another API (e.g., set of APIs 120). In at least one embodiment, a set signal node parameters API 128 can be used to set one or more parameters (e.g., parameters used by external semaphore signal node, grid dimensions for threads used to perform code, shared memory size, and/or other suitable node parameters) of a specified semaphore signal node in defined graph 122 (e.g., an external semaphore signal node added to defined graph 122 by add signal node API 124).

In at least one embodiment a get signal node parameters API 130 can be used to get (e.g., return in response to an API call) one or more parameters of a specified signal node in defined graph 122 (e.g., an external semaphore signal node added to defined graph 122 by add signal node API 124). In at least one embodiment, a set wait node parameters API 132 can be used to set one or more parameters (e.g., parameters used by external semaphore wait node, grid dimensions for threads used to perform code, shared memory size, and/or other suitable node parameters) of a specified semaphore wait node in defined graph 122 (e.g., an external semaphore wait node added to defined graph 122 by add wait node API 126). In at least one embodiment, a get wait node parameters API 134 can be used to get (e.g., return in response to an API call) one or more parameters of a specified wait node in defined graph 122 (e.g., an external semaphore wait node added to defined graph 122 by add wait node API 126).

In at least one embodiment, defined graph 122 is instantiated (e.g., using an instantiate graph API in set of APIs 118) and stored as instantiated graph 136. In at least one embodiment, defined graph 122 is referred to as a template graph. In at least one embodiment, instantiated graph 136 includes executable graph code. In at least one embodiment, executable graph code includes kernel function code to be performed by one or more GPUs. In at least one embodiment, instantiated graph 136 is stored in memory 106. In at least one embodiment, instantiated graph 136 is referred to as an executable graph. In at least one embodiment, instantiated graph 136 is referred to as an execution graph. In at least one embodiment, instantiation of defined graph 122 to generate instantiated graph 136 sets up and initializes GPU execution structures that can be run many times after creation. In at least one embodiment, instantiated graph 136 is to be performed by a device, not shown for clarity, other than a GPU (e.g., one or more tensor processing units (TPUs), parallel processing units (PPUs), field programmable gate arrays (FPGAs), coprocessors, and/or accelerators).

In at least one embodiment, set of APIs 118 can be used to update a semaphore node of an instantiated graph to be performed on a GPU or a device other than a GPU (e.g., one or more TPUs, PPUs, FPGAs, coprocessors, and/or accelerators). In at least one embodiment, an update signal node parameters API 138 can be used to update one or more parameters of a specified semaphore signal node in instantiated graph 136 (e.g., an external semaphore signal node added to defined graph 122 by add signal node API 124). In at least one embodiment, an update wait node parameters API 140 can be used to update one or more parameters of a specified semaphore wait node in instantiated graph 136 (e.g., an external semaphore wait node added to defined graph 122 by add wait node API 126).

In at least one embodiment, kernel information is generated based, at least in part on instantiated graph 136. In at least one embodiment, kernel information includes one or more GPU execution structures set up and/or initialized when defined graph 122 is instantiated to generate instantiated graph 136. In at least one embodiment, kernel information, not shown for clarity, is stored in memory 106. In at least one embodiment, a driver, not shown for clarity, generates kernel information. In at least one embodiment, driver is software performed by processor 104 that performs one or more actions in response to receiving API calls to APIs in set of APIs 118. In at least one embodiment, kernel information is included in one or more data structures. In at least one embodiment kernel information is included in a data structure referred to as a QMD data structure. In at least one embodiment, instantiation of defined graph 122 to generate instantiated graph 136 includes assigning each task and/or node of defined graph 122 to a corresponding computing resource and/or a subset of a corresponding computing resource, such as any computing resources, GPUs, cores, execution units, clusters, multiprocessors, compute units, streaming multiprocessors shown and/or described herein, and/or some other suitable processor. In at least one embodiment, correspondences of computing resources to tasks and/or nodes are stored in instantiated graph 136 itself. In at least one embodiment, correspondences of computing resources to tasks and/or nodes are stored in association with instantiated graph 136 (e.g., in kernel information).

In at least one embodiment, a driver, not shown for clarity, copies kernel function code 142 to GPU memory 114. In at least one embodiment, driver is software performed by processor 104 that performs one or more actions in response to receiving API calls to APIs in set of APIs 118. In at least one embodiment, kernel function code 142 is copied to GPU memory 114 from memory 106. In at least one embodiment, kernel function code 142 is based, at least in part, on kernel information. In at least one embodiment, kernel information includes kernel function code 142 copied to GPU. In at least one embodiment, kernel function code 142 is copied by driver in response to instantiation of defined graph 122 to generate instantiated graph 136. In at least one embodiment, kernel function code 142 is copied by driver in response to a first launch of instantiated graph 136. In at least one embodiment, when function code of instantiated graph 136 is modified (e.g., by a call to update signal node parameters API 138 and/or a call to update wait node parameters API 140), driver patches kernel function code 142 by copying only changed portions of kernel information to GPU memory 114.

In at least one embodiment, a driver and/or runtime associated with set of APIs 120 (e.g., a Vulkan driver or runtime for Vulkan APIs) generates code 144 based, at least in part, on set of APIs 120. In at least one embodiment, driver and/or runtime copies code 144 from memory 106 to GPU memory 114. In at least one embodiment, code 144 allocates a semaphore 146 and/or a semaphore 148. In at least one embodiment, semaphore 146 and/or semaphore 148 is a binary semaphore. In at least one embodiment, semaphore 146 and/or semaphore 148 is a counting semaphore. In at least one embodiment, a counting semaphore is referred to as a timeline semaphore. In at least one embodiment, although code 144 allocates and/or sets semaphore 146 and/or 148 when performed (e.g., by GPU 110 and/or processor 104), set of APIs 120 (e.g., referred to as another API in relation to one or more APIs from set of APIs 118) is referred to as allocating and/or setting semaphore 146 and/or semaphore 148 because code 144 was generated using set of APIs 120. In at least one embodiment, kernel function code 142 is executable graph code, and code 144 is code not included in graph code of kernel function code 142.

In at least one embodiment, an application program, not shown for clarity, running on computer system 102 uses set of APIs 118 to define a graph (e.g., defined graph 122), add a signal node to defined graph (e.g., using add signal node API 124), and add a wait node to defined graph (e.g., using add wait node API 126). In at least one embodiment, application program uses set of APIs 118 to instantiate graph (e.g., as instantiated graph 136) based, at least in part, on defined graph. In at least one embodiment, application program launches instantiated graph, which copies kernel function code 142 to GPU 110. In at least one embodiment, application program uses set of APIs 120 to generate and/or launch code 144. In at least one embodiment, application program uses kernel function code 142 for a first set of operations in application program (e.g., modeling physics operations for a floating feather in a video game) and uses code 144 for a second set of operations in application program related to first set of operations (e.g., rendering graphics for floating feather in video game). In at least one embodiment, while a video game is used as an example, other applications can also perform mixed workloads that use one or more semaphores allocated by code (e.g., code 144) generated by second set of APIs 120, synchronized using one or more external semaphore signal and/or wait nodes added to graph code by first set of APIs 118.

In at least one embodiment, when performed, code 144 allocates, creates, and/or sets semaphore 146 and/or semaphore 148. In at least one embodiment, kernel function code 142 and/or other executable graph code generated by set of APIs 118 includes an external semaphore signal node that performs one or more operations on semaphore 146 and/or semaphore 148. In at least one embodiment, kernel function code 142 and/or other executable graph code generated by set of APIs 118 includes an external semaphore wait node that performs a wait operation based, at least in part, on semaphore 146 and/or semaphore 148. In at least one embodiment, use of external semaphore nodes (e.g., external semaphore signal and/or wait nodes) enables graph code generated by first set of APIs 118 to synchronize graph node execution with workflows (e.g., code) from another API and/or computing platform. In at least one embodiment, use of external semaphore nodes enables signaling and waiting on external semaphores in a topologically ordered manner. In at least one embodiment, allocation and/or creation of semaphores by code 144 and/or other code generated by set of APIs 120, and use of those semaphores by external semaphore nodes of code generated by set of APIs 118 provides advantages (e.g., with respect to one or more of more of efficient utilization of computational and/or memory resources) over techniques that do not allow external semaphore signal and/or wait nodes to be added to graph code with an API. In at least one embodiment, application performs a mixed workload, where a mixed workload includes operations to be performed by a first library of APIs (e.g., one or more APIs in first set of APIs 118) and a second library of APIs (e.g., one or more APIs in second set of APIs 120).

In at least one embodiment, computer system 102 includes a set of nodes 150. In at least one embodiment, set of nodes 150 includes a node 152, a node 154, and a node 156. In at least one embodiment, set of nodes 150 includes a different number of nodes. In at least one embodiment, nodes in set of nodes 150 include one or more GPUs. In at least one embodiment, an application can also run mixed workloads that include executable graph code (e.g., instantiated graph 136) that includes external semaphore nodes to synchronize with code generated by another API using nodes in set of nodes 150. In at least one embodiment, kernel information is copied to one or more GPUs included in one or more nodes in set of nodes 150, one or more semaphores are included in one or more nodes in set of nodes 150, and/or one or more sets of code generated by another API are in set of nodes 150. In at least one embodiment, one or more components and/or aspects of computer system 102 and/or set of nodes 150 are implemented with one or more hardware components, one or more software components, one or more circuits, dedicated hardware such as fixed function circuitry, and/or any other suitable type of hardware, software, or combination thereof.

In at least one embodiment, processor 104 includes one or more circuits to perform a first API (e.g., add signal node API 124, set signal node parameters API 128, update signal node parameters API 138, and/or some other suitable API) to cause graph code (e.g., defined graph 122, instantiated graph 136, kernel function code 142, and/or other suitable graph code) to update a semaphore (e.g., semaphore 146, semaphore 148, or some other suitable semaphore) used by another API (e.g., one or more APIs in set of APIs 120). In at least one embodiment, graph code is to be performed, at least in part, by one or more GPUs (e.g., GPU 110). In at least one embodiment, first API is to add a semaphore signal node to graph code (e.g., using add signal node API 124). In at least one embodiment, graph code is to be performed, at least in part, by one or more GPUs and first API is to add a semaphore signal node to graph code based, at least in part, on a parameter (e.g., graph identifier parameter of add semaphore signal node API call 300 of FIG. 3) that specifies a graph to which to add semaphore signal node. In at least one embodiment, a semaphore is to be allocated by other API and first API is to add a semaphore signal node to graph code that is to perform a signal operation based, at least in part, on allocated semaphore, when added semaphore signal node is performed. In at least one embodiment, first API is to add a semaphore signal node to graph code, one or more circuits of processor 104 are to perform a second API (e.g., set signal node parameters API 128 or some other suitable API), and other API is a third API. In at least one embodiment, graph code is executable graph code (e.g., instantiated graph 136), and first API (e.g., update signal node parameters API 138 or some other suitable API) is to set one or more parameters for a semaphore signal node in executable graph code. In at least one embodiment, graph code is to be performed, at least in part, by one or more GPUs, other API is a graphics rendering API (e.g., Vulkan, OpenGL, or some other suitable graphics rendering API), and semaphore is a counting semaphore.

In at least one embodiment, computer system 102 includes one or more processors (e.g., processor 104) to perform a first API (e.g., add signal node API 124, set signal node parameters API 128, update signal node parameters API 138, and/or some other suitable API) to cause graph code (e.g., defined graph, 122, instantiated graph 122, kernel function code 142, and/or other suitable graph code) to update a semaphore used by another API (e.g., one or more APIs in set of APIs 120), and one or more memories (e.g., memory 106) to store graph code. In at least one embodiment, graph code is to be performed, a least in part, by one or more GPUs (e.g., GPU 110), and semaphore (e.g., semaphore 146, semaphore 148, or some other suitable semaphore) is to be allocated by other API. In at least one embodiment, first API (e.g., get signal node parameters API 130) is to return one or more parameters for a semaphore signal node in graph code in response to an API call to get one or more parameters. In at least one embodiment, first API (e.g., add signal node API 124) is to add a semaphore signal node to graph code. In at least one embodiment, one or more memories are to store semaphore and other API is to use code (e.g., code 144) not included in graph code. In at least one embodiment, graph code is to be performed, at least in part, by one or more GPUs and other API is a graphics rendering API.

In at least one embodiment, processor 104 includes one or more circuits to perform a first API (e.g., add wait node API 126, set wait node parameters API 132, update wait node parameters API 140, and/or some other suitable API) to cause graph code (e.g., defined graph 122, instantiated graph 136, kernel function code 142, and/or other suitable graph code) to wait on a semaphore (e.g., semaphore 146, semaphore 148, or some other suitable semaphore) used by another API (e.g., one or more APIs in set of APIs 120). In at least one embodiment, graph code is to be performed, at least in part, by one or more GPUs (e.g., GPU 110). In at least one embodiment, first API is to add a semaphore wait node to graph code (e.g., using add wait node API 126). In at least one embodiment, graph code is to be performed, at least in part, by one or more GPUs and first API is to add a semaphore wait node to graph code based, at least in part, on a parameter (e.g., graph identifier parameter of add semaphore wait node API call 700 of FIG. 7) that specifies a graph to which to add semaphore wait node. In at least one embodiment, a semaphore is to be allocated by other API and first API is to add a semaphore wait node to graph code that is to perform a wait operation based, at least in part, on allocated semaphore, when added semaphore wait node is performed. In at least one embodiment, first API is to add a semaphore wait node to graph code, one or more circuits of processor 104 are to perform a second API (e.g., set wait node parameters API 132 or some other suitable API), and other API is a third API. In at least one embodiment, graph code is executable graph code (e.g., instantiated graph 136), and first API (e.g., update wait node parameters API 140 or some other suitable API) is to set one or more parameters for a semaphore wait node in executable graph code. In at least one embodiment, graph code is to be performed, at least in part, by one or more GPUs, other API is a graphics rendering API (e.g., Vulkan, OpenGL, or some other suitable graphics rendering API), and semaphore is a counting semaphore.

In at least one embodiment, computer system 102 includes one or more processors (e.g., processor 104) to perform a first API (e.g., add wait node API 126, set wait node parameters API 132, update wait node parameters API 140, and/or some other suitable API) to cause graph code (e.g., defined graph, 122, instantiated graph 122, kernel function code 142, and/or other suitable graph code) to wait on a semaphore used by another API (e.g., one or more APIs in set of APIs 120), and one or more memories (e.g., memory 106) to store graph code. In at least one embodiment, semaphore is to be allocated by other API, and first API is to set one or more parameters for a semaphore wait node in graph code that is to perform one or more wait operations based, at least in part, on allocated semaphore. In at least one embodiment, semaphore is to be allocated by other API. In at least one embodiment, first API is to add a semaphore wait node to graph code. In at least one embodiment, one or more memories are to store semaphore. In at least one embodiment, graph code is to be performed, at least in part, by one or more GPUs (e.g., GPU 110), other API is to allocate semaphore, and other API is to use code not included in graph code (e.g., code 144).

Figure 2:
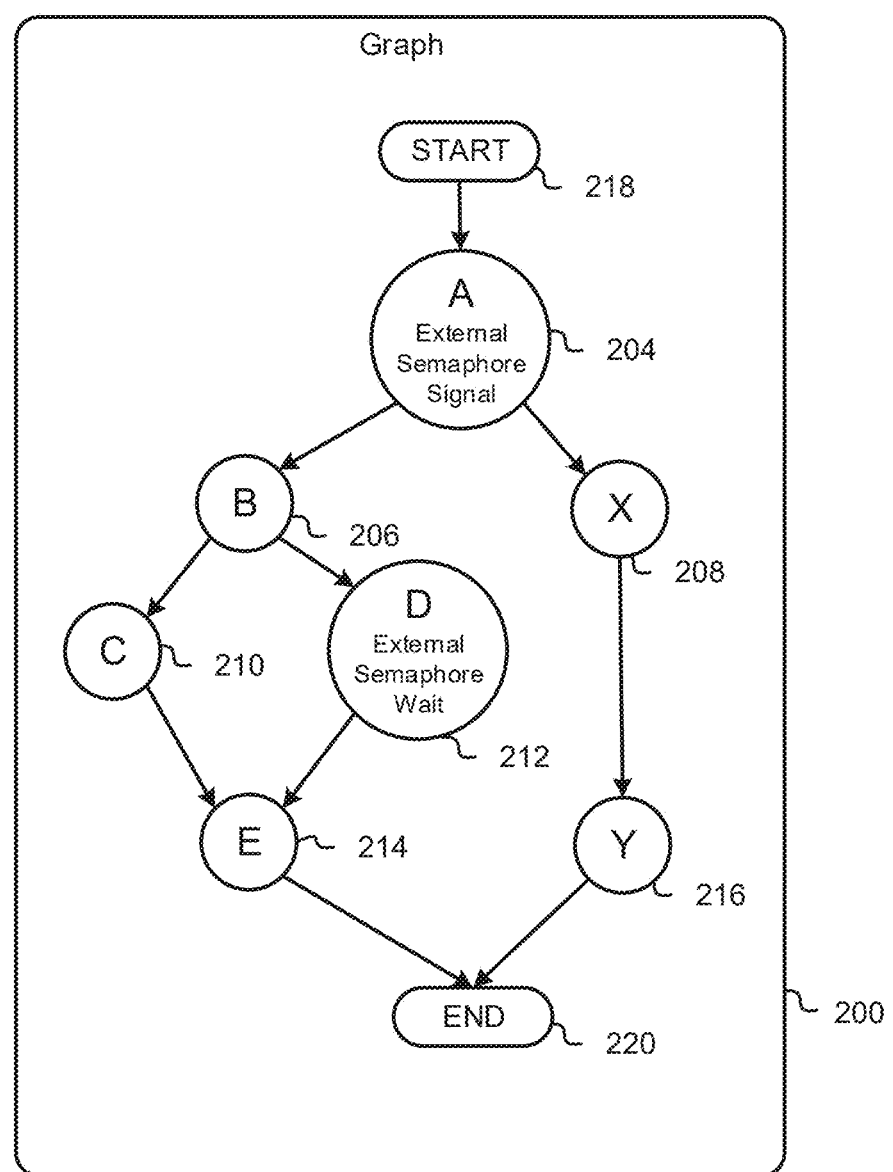
FIG. 2 illustrates a diagram of a graph with semaphore nodes, according to at least one embodiment.

FIG. 2 illustrates a diagram of a graph 200 with semaphore nodes, according to at least one embodiment. In at least one embodiment graph 200 is an execution graph (e.g., instantiated graph 136 of FIG. 1) based, at least in part, on a defined graph (e.g., defined graph 122 of FIG. 1). In at least one embodiment, graph 200 includes one or more external semaphore signal nodes. In at least one embodiment, graph 200 includes one or more external semaphore wait nodes. In at least one embodiment, graph 200 includes executable graph code. In at least one embodiment, it should be understood that graph 200 is for purposes of illustration, and graph 200 could include a different number and/or type of nodes and/or have a different topology. In at least one embodiment, one or more APIs in set of APIs 118 generates graph 200.

In at least one embodiment, graph 200 includes one or more nodes and one or more relationships between those one or more nodes. In at least one embodiment, graph 200 includes node "A" 204, node "B" 206, node "C" 210, node "D" 212, node "E" 214, node "X" 208, and node "Y" 216. In at least one embodiment, graph 200 includes a start node 218 and an end node 220. In at least one embodiment, graph 200 is a directed acyclic graph. In at least one embodiment, graph 200 is a representation of an execution graph that indicates node types of nodes in graph 200. In at least one embodiment, graph 200 is a representation of an execution graph that indicates links between nodes to indicate an execution order and/or dependencies between operations represented by nodes of graph 200.

In at least one embodiment, graph 200 includes one or more external semaphore signal nodes. In at least one embodiment, node "A" 204 is an external semaphore signal node. In at least one embodiment, add signal node API 124 generated node "A" 204 (e.g., by adding an external semaphore signal node to defined graph 122 of FIG. 1, which was instantiated to generate graph 200). In at least one embodiment, node "A" 204 includes signal node parameters set by add signal node API 124. In at least one embodiment, node "A" 204 includes signal node parameters set by set signal node parameters API 128 (e.g., set on corresponding signal node in defined graph 122, which was instantiated to generate graph 200). In at least one embodiment, node "A" 204 includes signal node parameters set by update signal node parameters API 130. In at least one embodiment, external semaphore signal node "A" 204, when performed (e.g., by GPU 110) is to perform an operation (e.g., incrementing or decrementing a counting semaphore, setting or resetting a binary semaphore) based, at least in part, on a semaphore (e.g., semaphore 146 and/or semaphore 148) allocated by another API (e.g., an API in set of APIs 120). In at least one embodiment, operation to be performed by node "A" 204 is based, at least on part, on one or more parameters of node "A" 204 and/or function code, not shown for clarity, of node "A" 204.

In at least one embodiment, graph 200 includes one or more external semaphore wait nodes. In at least one embodiment, node "D" 212 is an external semaphore wait node. In at least one embodiment, add wait node API 126 generated node "D" 212 (e.g., by adding an external semaphore wait node to defined graph 122 of FIG. 1, which was instantiated to generate graph 200). In at least one embodiment, node "D" 212 includes wait node parameters set by add wait node API 126. In at least one embodiment, node "D" 212 includes wait node parameters set by set wait node parameters API 132 (e.g., set on corresponding wait node in defined graph 122, which was instantiated to generate graph 200). In at least one embodiment, node "D" 212 includes wait node parameters set by update wait node parameters API 140. In at least one embodiment, external semaphore wait node "D" 212, when performed (e.g., by GPU 110), is to perform a wait operation (e.g., waiting to proceed to node "E" 214 from node "D" 212) based, at least in part, on a semaphore (e.g., semaphore 146 and/or semaphore 148) allocated by another API (e.g., an API in set of APIs 120). In at least one embodiment, wait operation is based, at least in part, on a counting semaphore and a predetermined value (e.g., whether counting semaphore is greater than or equal to predetermined value, whether counting semaphore is equal to predetermined value, or whether counting semaphore is less than predetermined value depending on code and/or parameters associated with node "D" 212). In at least one embodiment, wait operation is based, at least in part, on a binary semaphore (e.g., whether binary semaphore is set to a zero, or whether binary semaphore is set to a one depending on code and/or parameters associated with node "D" 212). In at least one embodiment, wait operation to be performed by node "D" 212 is based, at least on part, on one or more parameters of node "D" 212 and/or function code, not shown for clarity, of node "D" 212.

In at least one embodiment, an execution order of graph 200 is indicated by edges of graph 200. In at least one embodiment, a dependency between nodes of graph 200 is indicated by edges of graph 200. In at least one embodiment, an edge between, for example, node "A" 204 and node "B" 206 is an indication that node "B" 206 executes after node "A" 204 completes. In at least one embodiment, an edge between, for example, node "A" 204 and node "B" 206 is an indication that node "B" 206 depends on node "A" 204.

In at least one embodiment, a node of graph 200 has a single incoming edge (node "B" 206). In at least one embodiment, a node of an execution graph with a single incoming edge is a node with a single dependency. In at least one embodiment, for example, node "B" 206 is dependent only on node "A" 204. In at least one embodiment, a node of graph 200 has a plurality of incoming edges (node "E" 214). In at least one embodiment, a node of an execution graph with a plurality of incoming edges is a node with a plurality of dependencies. In at least one embodiment, for example, node "E" 214 is dependent on node "C" 210 and on node "D" 212. In at least one embodiment, a node of graph 200 has no incoming edges (e.g., start node 218). In at least one embodiment, a node with no incoming edges has no dependencies. In at least one embodiment, a node with no dependencies may be a start node or root node of graph 200. In at least one embodiment, a node with no incoming edges may also have no outgoing edges such that a single node, representing a single operation, is a complete graph. In at least one embodiment, a node with no incoming edges and no outgoing edges is a disconnected node from another portion of a graph.

In at least one embodiment, a node of graph 200 has a single outgoing edge (node "X" 208). In at least one embodiment, a node of an execution graph with a single outgoing edge is a node with a single dependent. In at least one embodiment, for example, node "X" 208 has a single dependent in node "Y" 216. In at least one embodiment, a node of graph 200 has a plurality of outgoing edges (node "B" 206). In at least one embodiment, a node of an execution graph with a plurality of outgoing edges is a node with a plurality of dependents. In at least one embodiment, for example, node "B" 206 has a first dependent in node "C" 210 and a second dependent in node "D" 212. In at least one embodiment, a node of graph 200 has no outgoing edges (e.g., end node 220). In at least one embodiment, a node with no outgoing edges has no dependents. In at least one embodiment, a node with no dependents may be an end node or leaf node of graph 200. In at least one embodiment, graph 200 may have a plurality of end nodes.

In at least one embodiment, one or more execution graph nodes is a kernel node, which is a node that executes one or more operations on a GPU (e.g., GPU 110 of FIG. 1). In at least one embodiment, a kernel node invokes a kernel function on a GPU by executing a kernel function using a thread block, such as described herein. In at least one embodiment kernel function is referred to as kernel function code. In at least one embodiment, kernel function is referred to as function code. In at least one embodiment, node "C" 210 may, for example, be a kernel node that invokes a kernel function on a GPU by executing a kernel function using a thread block. In at least one embodiment, one or more execution graph nodes is a GPU data management node such as a memory copy node or a memory set node. In at least one embodiment, one or more execution graph nodes are CPU function call nodes that are to perform one or more callback functions on a CPU (e.g., processor 102 of FIG. 1).

In at least one embodiment, an external semaphore signal node (e.g., node "A" 204) includes and/or invokes one or more semaphore signal operations to be performed, at least in part by a processor (e.g., processor 104 of FIG. 1). In at least one embodiment, an external semaphore signal node (e.g., node "A" 204) includes and/or invokes one or more semaphore signal operations to be performed, at least in part, by a GPU (e.g., GPU 110 of FIG. 1). In at least one embodiment, an external semaphore wait node (e.g., node "D" 212) includes and/or invokes one or more semaphore wait operations to be performed, at least in part by a processor (e.g., processor 104 of FIG. 1). In at least one embodiment, an external semaphore wait node (e.g., node "D" 212) includes and/or invokes one or more semaphore wait operations to be performed, at least in part, by a GPU (e.g., GPU 110 of FIG. 1).

In at least one embodiment, one or more execution graph nodes is a sub-graph (e.g., a child graph node), which is a node that represents an embedded (or child) graph. In at least one embodiment, a child graph node represents a new execution graph which may be substituted for a child graph node when graph 200 is instantiated. In at least one embodiment, a child graph node has zero, one, or a plurality of incoming edges and zero, one, or a plurality outgoing edges. In at least one embodiment, a child graph node with, for example, a single incoming edge is dependent on a single node. In at least one embodiment, for example, if node "B" 206 is a child graph node, node "B" 206 is dependent on node "A" 204 and after node "A" 204 completes, a graph that node "B" 206 represents may then execute.

FIG. 3 illustrates a diagram of an add semaphore signal node API call 300, according to at least one embodiment. In at least one embodiment, add semaphore signal node API call 300 is a call to add signal node API 124 of FIG. 1. In at least one embodiment, add semaphore signal node API call 300 is used (e.g., called by an application or library) to add an external semaphore signal node (e.g., a node in a defined graph corresponding to node "A" 204 of FIG. 2) to a defined graph (e.g., defined graph 122 of FIG. 1). In at least one embodiment, add semaphore signal node API call 300 is referred to as an add external semaphore signal node API call and/or an add external semaphore signal node API request. In at least one embodiment, add semaphore signal node API call 300 includes a graph identifier parameter that specifies a graph to which to add an external semaphore signal node. In at least one embodiment, add semaphore signal node API call 300 includes a node identifier parameter that is an outgoing parameter to return a pointer to a location of newly created semaphore signal node in memory. In at least one embodiment, add semaphore signal node API call 300 includes a dependencies parameter that specifies dependencies of added semaphore signal node. In at least one embodiment, add semaphore signal node API call 300 includes a number of dependencies parameter that specifies a number of dependencies of added semaphore signal node. In at least one embodiment, add semaphore signal node API call 300 includes a node parameters parameter that specifies parameters for added semaphore signal node. In at least one embodiment, add semaphore signal node API call 300 includes a different number and/or type of parameters.

In at least one embodiment, pseudocode for an add semaphore signal node API call 300 function definition is:
    CUresult    cuGraphAddExternalSemaphoresSignalNode
        (CUgraphNode*  phGraphNode,  CUgraph  hGraph,
        const CUgraphNode* dependencies, size_t numDependencies, const CUDA_EXT_SEM_SIGNAL_NODE_
        PARAMS* nodeParams)
In at least one embodiment, parameter phGraphNode returns a newly created node. In at least one embodiment, parameter hGraph specifies a graph to which to add node. In at least one embodiment, parameter dependencies specifies dependencies of added signal node. In at least one embodiment, parameter numDependencies specifies a number of dependencies of added signal node. In at least one embodiment, parameter nodeParams is a pointer to a location in memory where a data structure with node parameters for added signal node is stored. In at least one embodiment, Graph Identifier of add semaphore signal node API call 300 corresponds to parameter hGraph, Node Identifier of add semaphore signal node API call 300 corresponds to parameter phGraphNode, Dependencies of add semaphore signal node API call 300 corresponds to parameter dependencies, Number of Dependencies of add semaphore signal node API call 300 corresponds to parameter numDependencies, and Node Parameters of add semaphore signal node API call 300 corresponds to parameter nodeParams. In at least one embodiment, add semaphore signal node API call 300 function definition includes a different number and/or type of parameters. In at least one embodiment, add semaphore signal node API call 300 function definition uses one or more parameter objects that include more than one parameter (e.g., an object, such as a collection object, used as a parameter that combines numDependencies and dependencies).

In at least one embodiment, add semaphore signal node API call 300 creates a new external semaphore signal node (e.g., a node in a defined graph corresponding to node "A" 204 of FIG. 2) and adds it to hGraph with numDependencies specified via dependencies parameter, and arguments specified in nodeParams. In at least one embodiment, it is possible for numDependencies to be zero, in which case, node will be placed at root of graph. In at least one embodiment, dependencies parameter may not have any duplicate entries. In at least one embodiment, a handle to new node will be returned in phGraphNode. In at least one embodiment, added node performs a signal operation on a set of externally allocated semaphore objects (e.g., one or more semaphores such as semaphore 146 and/or semaphore 148) when node is launched. In at least one embodiment, operations of added node occur after all of node's dependencies have completed.

In at least one embodiment, a response 302 to add semaphore signal node API call 300 includes an operation status. In at least one embodiment, response 302 to add semaphore signal node API call 300 indicates if add semaphore signal node API call 300 was successful, has failed, or if other errors have occurred. In at least one embodiment, operation status is returned in response to add semaphore signal node API call 300 to indicate a status of add semaphore signal node API call 300. In at least one embodiment, operation status is returned as a numeric value (e.g., an integer) that is interpreted by a calling application and/or library (e.g., using a mapping of operation status numeric identifiers to their meaning and/or actions to take). In at least one embodiment, response 302 includes a different number of informational components (e.g., returns more than one value). In at least one embodiment, operation status returned by response 302 is of type CUresult, as indicated in above pseudocode for add semaphore signal node API call 300 function definition.

FIG. 4 illustrates a diagram of a set semaphore signal node parameters API call 400, according to at least one embodiment. In at least one embodiment, set semaphore signal node parameters API call 400 is a call to set signal node parameters API 128 of FIG. 1. In at least one embodiment, set semaphore signal node parameters API call 400 is used (e.g., called by an application or library) to set parameters of an external semaphore signal node (e.g., a node in a defined graph, such as defined graph 122 of FIG. 1, corresponding to node "A" 204 of FIG. 2). In at least one embodiment, set semaphore signal node parameters API call 400 is referred to as a set external semaphore signal node parameters API call and/or a set external semaphore signal node parameters request. In at least one embodiment, set semaphore signal node parameters API call 400 includes a node identifier parameter that specifies an external semaphore signal node for which parameters are to be set. In at least one embodiment, set semaphore signal node parameters API call 400 includes a node parameters parameter that specifies parameters to be set and/or updated for specified signal node. In at least one embodiment, set semaphore signal node parameters API call 400 includes a different number and/or type of parameters (e.g., a graph identifier parameter to identify a graph to which specified signal node belongs).

In at least one embodiment, pseudocode for a set semaphore signal node parameters API call 400 function definition is:

```
CUresult    cuGraphExternalSemaphoresSignalNodeSet-
    Params (CUgraphNode hNode, const CUDA_EXT_
    SEM_SIGNAL_NODE_PARAMS* nodeParams)
```

In at least one embodiment, parameter hNode specifies a signal node for which parameters are to be set. In at least one embodiment, parameter nodeParams is a pointer to a location in memory that stores a data structure with node parameters to be set for specified signal node. In at least one embodiment, Node Identifier of set semaphore signal node parameters API call 400 corresponds to parameter hNode. In at least one embodiment, Node Parameters of set semaphore signal node parameters API call 400 corresponds to parameter nodeParams. In at least one embodiment, set semaphore signal node parameters API call 400 function definition includes a different number and/or type of parameters. In at least one embodiment, set semaphore signal node parameters API call 400 sets parameters of an external semaphore signal node hNode to nodeParams.

In at least one embodiment, a response 402 to set semaphore signal node parameters API call 400 includes an operation status. In at least one embodiment, response 402 to set semaphore signal node parameters API call 400 indicates if set semaphore signal node parameters API call 400 was successful, has failed, or if other errors have occurred. In at least one embodiment, operation status is returned in response to set semaphore signal node parameters API call 400 to indicate a status of set semaphore signal node parameters API call 400. In at least one embodiment, operation status is returned as a numeric value (e.g., an integer) that is interpreted by a calling application and/or library (e.g., using a mapping of operation status numeric identifiers to their meaning and/or actions to take). In at least one embodiment, response 402 includes a different number of informational components (e.g., returns more than one value). In at least one embodiment, operation status returned by response 402 is of type CUresult, as indicated in above pseudocode for set semaphore signal node parameters API call 400 function definition.

FIG. 5 illustrates a diagram of a get semaphore signal node parameters API call 500, according to at least one embodiment. In at least one embodiment, get semaphore signal node parameters API call 500 is a call to get signal node parameters API 130 of FIG. 1. In at least one embodiment, get semaphore signal node parameters API call 500 is used (e.g., called by an application or library) to get parameters for an external semaphore signal node (e.g., a node in a defined graph corresponding to node "A" 204 of FIG. 2). In at least one embodiment, get semaphore signal node parameters API call 500 is referred to as a get external semaphore signal node parameters API call and/or a get external semaphore signal node parameters API request. In at least one embodiment, get semaphore signal node parameters API call 500 incudes a node identifier parameter that specifies an external semaphore signal node for which parameters are to be returned. In at least one embodiment, get semaphore signal node parameters API call 500 includes a pointer for returned parameters parameter that identifies a memory location where a data structure with returned parameters is to be stored. In at least one embodiment, get semaphore signal node parameters API call 500 includes a different number and/or type of parameters (e.g., a graph identifier parameter to identify a graph to which specified signal node belongs).

In at least one embodiment, pseudocode for a get semaphore signal node parameters API call 500 function definition is:

```
CUresult    cuGraphExternalSemaphoresSignalNodeGet-
    Params (CUgraphNode hNode, CUDA_EXT_SEM_
    SIGNAL_NODE_PARAMS* params_out)
```

In at least one embodiment, parameter hNode specifies a signal node for which parameters are to be returned. In at least one embodiment, parameter params_out is a pointer to return parameters. In at least one embodiment, Node Identifier of get semaphore signal node parameters API call 500 corresponds to parameter hNode. In at least one embodiment, Pointer for returned parameters parameter of get semaphore signal node parameters API call 500 corresponds to parameter params_out. In at least one embodiment, get semaphore signal node parameters API call 500 function definition includes a different number and/or type of parameters.

In at least one embodiment, get semaphore signal node parameters API call 500 returns parameters of an external semaphore signal node hNode in params_out. In at least one embodiment, params_out includes one or more data structures (e.g. extSemArray and paramsArray). In at least one embodiment, extSemArray and paramsArray returned in params_out are owned by node. In at least one embodiment, memory remains valid until node is destroyed or its parameters are modified and should not be modified directly, instead using set semaphore signal node parameters API call 400 to update parameters of node.

In at least one embodiment, a response 502 to get semaphore signal node parameters API call 500 includes an operation status. In at least one embodiment, response 502 to get semaphore signal node parameters API call 500 indicates if get semaphore signal node parameters API call 500 was successful, has failed, or if other errors have occurred. In at least one embodiment, operation status is returned in response to get semaphore signal node parameters API call 500 to indicate a status of get semaphore signal node parameters API call 500. In at least one embodiment, operation status is returned as a numeric value (e.g., an integer) that is interpreted by a calling application and/or library (e.g., using a mapping of operation status numeric identifiers to their meaning and/or actions to take). In at least one embodiment, response 502 includes a different number of informational components (e.g., returns more than one value). In at least one embodiment, operation status returned by response 502 is of type CUresult, as indicated in above pseudocode for get semaphore signal node parameters API call 500 function definition.

FIG. 6 illustrates a diagram of an update executable graph semaphore signal node parameters API call 600, according to at least one embodiment. In at least one embodiment, update executable graph semaphore signal node parameters API call 600 is a call to update signal node parameters API 138 of FIG. 1. In at least one embodiment, update executable graph semaphore signal node parameters API call 600 is used (e.g., called by an application or library) to set parameters for an external semaphore signal node in an instantiated graph (e.g., node "A" 204 of FIG. 2). In at least one embodiment, update executable graph semaphore signal node parameters API call 600 is referred to as an update executable graph external semaphore signal node parameters API call and/or an update executable graph external semaphore signal node parameters API request. In at least one embodiment, update executable graph semaphore signal node parameters API call 600 includes a graph identifier parameter that specifies an executable graph in which to set specified node. In at least one embodiment, update executable graph semaphore signal node parameters API call 600 includes a node identifier parameter that specifies external semaphore signal node from graph (e.g., defined graph 122) from which specified executable graph (e.g., instantiated graph 136) was instantiated. In at least one embodiment, update executable graph semaphore signal node parameters API call 600 includes an updated parameters parameter that specifies updated parameters to set for specified node of specified graph. In at least one embodiment, update executable graph semaphore signal node parameters API call 600 includes a different number and/or type of parameters.

In at least one embodiment, pseudocode for an update executable graph semaphore signal node parameters API call 600 function definition is:

CUresult cuGraphExecExternalSemaphoresSignalNode-
SetParams (CUgraphExec hGraphExec, CUgraphNode
hNode, const CUDA_EXT_SEM_SIGNAL_NODE_
PARAMS* nodeParams)

In at least one embodiment, parameter hGraphExec specifies an executable graph in which to set specified node. In at least one embodiment, parameter hNode specifies a signal node for which parameters are to be set. In at least one embodiment, nodeParams is a pointer to a location in memory of a data structure that includes updated parameters to be set. In at least one embodiment, Graph Identifier of update executable graph semaphore signal node parameters API call 600 corresponds to parameter hGrahExec. In at least one embodiment, Node Identifier of update executable graph semaphore signal node parameters API call 600 corresponds to parameter hNode. In at least one embodiment, Updated Parameters of update executable graph semaphore signal node parameters API call 600 corresponds to parameter nodeParams. In at least one embodiment, update executable graph semaphore signal node parameters API call 600 function definition includes a different number and/or type of parameters.

In at least one embodiment, update executable graph semaphore signal node parameters API call 600 sets parameters of an external signal node in an executable graph hGraphExec. In at least one embodiment, node is identified by corresponding node hNode in non-executable graph from which executable graph was instantiated. In at least one embodiment, hNode is present in original graph and has not been removed. In at least one embodiment, modifications (e.g., update with newly set parameters) only affect future launches of hGraph Exec. In at least one embodiment, already enqueued or running launches of hGraphExec are not affected by update executable graph semaphore signal node parameters API call 600. In at least one embodiment, hNode is not modified by update executable graph semaphore signal node parameters API call 600.

In at least one embodiment, a response 602 to update executable graph semaphore signal node parameters API call 600 includes an operation status. In at least one embodiment, response 602 to update executable graph semaphore signal node parameters API call 600 indicates if update executable graph semaphore signal node parameters API call 600 was successful, has failed, or if other errors have occurred. In at least one embodiment, operation status is returned in response to update executable graph semaphore signal node parameters API call 600 to indicate a status of update executable graph semaphore signal node parameters API call 600. In at least one embodiment, operation status is returned as a numeric value (e.g., an integer) that is interpreted by a calling application and/or library (e.g., using a mapping of operation status numeric identifiers to their meaning and/or actions to take). In at least one embodiment, response 602 includes a different number of informational components (e.g., returns more than one value). In at least one embodiment, operation status returned by response 602 is of type CUresult, as indicated in above pseudocode for update executable graph semaphore signal node parameters API call 600 function definition.

In at least one embodiment, one or more of add semaphore signal node API call 300 of FIG. 3, set semaphore signal node parameters API call 400 of FIG. 4, get semaphore signal node parameters API call 500 of FIG. 5, and/or update executable graph semaphore signal node parameters API call 600 of FIG. 6 is handled by a processor (e.g., processor 104 of FIG. 1). In at least one embodiment, a driver (e.g., a CUDA driver running on computer system 102) handles (e.g., performs one or more operations in response to) one or more of add semaphore signal node API call 300 of FIG. 3, set semaphore signal node parameters API call 400 of FIG. 4, get semaphore signal node parameters API call 500 of FIG. 5, and/or update executable graph semaphore signal node parameters API call 600 of FIG. 6. In at least one embodiment, a machine-readable medium (e.g., a non-transitory computer-readable medium) includes a first API (e.g., add signal node API 124, set signal node parameters API 128, update signal node parameters API 138, or some other suitable API) stored thereon (e.g., instructions stored thereon for first API) which if performed by one or more processors (e.g., processor 104 of FIG. 1) is to cause graph code to at least update a semaphore used by another API. In at least one embodiment, graph code is to be performed, at least in part, by one or more GPUs, and semaphore is a binary semaphore to be allocated by other API. In at least one embodiment, graph code is to be performed, at least in part, by one or more GPUs, and semaphore is a counting semaphore to be allocated by other API. In at least one embodiment, semaphore is to be allocated by other API based, at least in part, on code not included in graph code, and first API is to add a semaphore signal node to graph code that is to change a value of semaphore when semaphore signal node is performed. In at least one embodiment, first API is to add a semaphore signal node to graph code based, at least in part, on a first parameter that specifies a graph to which to add semaphore signal node, a second parameter that specifies one or more parameters for signal node, and a third parameter that specifies one or more dependencies of signal node. In at least one embodiment, semaphore is a counting semaphore to be allocated by other API based, at least in part, on code not included in graph code.

FIG. 7 illustrates a diagram of an add semaphore wait node API call 700, according to at least one embodiment. In at least one embodiment, add semaphore wait node API call 700 is a call to add wait node API 126 of FIG. 1. In at least one embodiment, add semaphore wait node API call 700 is used (e.g., called by an application or library) to add an external semaphore wait node (e.g., a node in a defined graph corresponding to node "D" 212 of FIG. 2) to a defined graph (e.g., defined graph 122 of FIG. 1). In at least one embodiment, add semaphore wait node API call 700 is referred to as an add external semaphore wait node API call and/or an add external semaphore wait node API request. In at least one embodiment, add semaphore wait node API call 700 includes a graph identifier parameter that specifies a graph to which to add an external semaphore wait node. In at least one embodiment, add semaphore wait node API call 700 includes a node identifier parameter that is an outgoing parameter to return a pointer to a location of newly created semaphore wait node in memory. In at least one embodiment, add semaphore wait node API call 700 includes a dependencies parameter that specifies dependencies of added semaphore wait node. In at least one embodiment, add semaphore wait node API call 700 includes a number of dependencies parameter that specifies a number of dependencies of added semaphore wait node. In at least one embodiment, add semaphore wait node API call 700 includes a node parameters parameter that specifies parameters for added semaphore wait node. In at least one embodiment, add semaphore wait node API call 700 includes a different number and/or type of parameters.

In at least one embodiment, pseudocode for an add semaphore wait node API call 700 function definition is:

CUresult          cuGraphAddExternalSemaphoresWaitNode
(CUgraphNode* phGraphNode, CUgraph hGraph,
const CUgraphNode* dependencies, size_t numDependencies,    const    CUDA_EXT_SEM_WAIT_NODE_
PARAMS* nodeParams)

In at least one embodiment, parameter phGraphNode returns a newly created node. In at least one embodiment, parameter hGraph specifies a graph to which to add node. In at least one embodiment, parameter dependencies specifies dependencies of added wait node. In at least one embodiment, parameter numDependencies specifies a number of dependencies of added wait node. In at least one embodiment, parameter nodeParams is a pointer to a location in memory where a data structure with node parameters for added wait node is stored. In at least one embodiment, Graph Identifier of add semaphore wait node API call 700 corresponds to parameter hGraph, Node Identifier of add semaphore wait node API call 700 corresponds to parameter phGraphNode, Dependencies of add semaphore wait node API call 700 corresponds to parameter dependencies, Number of Dependencies of add semaphore wait node API call 700 corresponds to parameter numDependencies, and Node Parameters of add semaphore wait node API call 700 corresponds to parameter nodeParams. In at least one embodiment, add semaphore wait node API call 700 function definition includes a different number and/or type of parameters. In at least one embodiment, add semaphore wait node API call 700 function definition uses one or more parameter objects that include more than one parameter (e.g., an object, such as a collection object, used as a parameter that combines numDependencies and dependencies).

In at least one embodiment, add semaphore wait node API call 700 creates a new external semaphore wait node (e.g., a node in a defined graph corresponding to node "D" 212 of FIG. 2) and adds it to hGraph with numDependencies specified via dependencies parameter, and arguments specified in nodeParams. In at least one embodiment, it is possible for numDependencies to be zero, in which case, node will be placed at root of graph. In at least one embodiment, dependencies parameter may not have any duplicate entries. In at least one embodiment, a handle to new node will be returned in phGraphNode. In at least one embodiment, added node performs a wait operation on a set of externally allocated semaphore objects (e.g., one or more semaphores such as semaphore 146 and/or semaphore 148) when node is launched. In at least one embodiment, node's dependencies will not be launched until wait operation has completed.

In at least one embodiment, a response 702 to add semaphore wait node API call 700 includes an operation status. In at least one embodiment, response 702 to add semaphore wait node API call 700 indicates if add semaphore wait node API call 700 was successful, has failed, or if other errors have occurred. In at least one embodiment, operation status is returned in response to add semaphore wait node API call 700 to indicate a status of add semaphore wait node API call 700. In at least one embodiment, operation status is returned as a numeric value (e.g., an integer) that is interpreted by a calling application and/or library (e.g., using a mapping of operation status numeric identifiers to their meaning and/or actions to take). In at least one embodiment, response 702 includes a different number of informational components (e.g., returns more than one value). In at least one embodiment, operation status returned by response 702 is of type CUresult, as indicated in above pseudocode for add semaphore wait node API call 700 function definition.

FIG. 8 illustrates a diagram of a set semaphore wait node parameters API call 800, according to at least one embodiment. In at least one embodiment, set semaphore wait node parameters API call 800 is a call to set wait node parameters API 132 of FIG. 1. In at least one embodiment, set semaphore wait node parameters API call 800 is used (e.g., called by an application or library) to set parameters of an external semaphore wait node (e.g., a node in a defined graph, such as defined graph 122 of FIG. 1, corresponding to node "D" 212 of FIG. 2). In at least one embodiment, set semaphore wait node parameters API call 800 is referred to as a set external semaphore wait node parameters API call and/or a set external semaphore wait node parameters request. In at least one embodiment, set semaphore wait node parameters API call 800 includes a node identifier parameter that specifies an external semaphore wait node for which parameters are to be set. In at least one embodiment, set semaphore wait node parameters API call 800 includes a node parameters parameter that specifies parameters to be set and/or updated for specified wait node. In at least one embodiment, set semaphore wait node parameters API call 800 includes a different number and/or type of parameters (e.g., a graph identifier parameter to identify a graph to which specified wait node belongs).

In at least one embodiment, pseudocode for a set semaphore wait node parameters API call 800 function definition is:

CUresult      cuGraphExternalSemaphoresWaitNodeSet-
   Params (CUgraphNode hNode, const CUDA_EXT_
   SEM_WAIT_NODE_PARAMS* nodeParams)

In at least one embodiment, parameter hNode specifies a wait node for which parameters are to be set. In at least one embodiment, parameter nodeParams is a pointer to a location in memory that stores a data structure with node parameters to be set for specified wait node. In at least one embodiment, Node Identifier of set semaphore wait node parameters API call 800 corresponds to parameter hNode. In at least one embodiment, Node Parameters of set semaphore wait node parameters API call 800 corresponds to parameter nodeParams. In at least one embodiment, set semaphore wait node parameters API call 800 function definition includes a different number and/or type of parameters. In at least one embodiment, set semaphore wait node parameters API call 800 sets parameters of an external semaphore wait node hNode to nodeParams.

In at least one embodiment, a response 802 to set semaphore wait node parameters API call 800 includes an operation status. In at least one embodiment, response 802 to set semaphore wait node parameters API call 800 indicates if set semaphore wait node parameters API call 800 was successful, has failed, or if other errors have occurred. In at least one embodiment, operation status is returned in response to set semaphore wait node parameters API call 800 to indicate a status of set semaphore wait node parameters API call 800. In at least one embodiment, operation status is returned as a numeric value (e.g., an integer) that is interpreted by a calling application and/or library (e.g., using a mapping of operation status numeric identifiers to their meaning and/or actions to take). In at least one embodiment, response 802 includes a different number of informational components (e.g., returns more than one value). In at least one embodiment, operation status returned by response 802 is of type CUresult, as indicated in above pseudocode for set semaphore wait node parameters API call 800 function definition.

FIG. 9 illustrates a diagram of a get semaphore wait node parameters API call 900, according to at least one embodiment. In at least one embodiment, get semaphore wait node parameters API call 900 is a call to get wait node parameters API 134 of FIG. 1. In at least one embodiment, get semaphore wait node parameters API call 900 is used (e.g., called by an application or library) to get parameters for an external semaphore wait node (e.g., a node in a defined graph corresponding to node "D" 212 of FIG. 2). In at least one embodiment, get semaphore wait node parameters API call 900 is referred to as a get external semaphore wait node parameters API call and/or a get external semaphore wait node parameters API request. In at least one embodiment, get semaphore wait node parameters API call 900 incudes a node identifier parameter that specifies an external semaphore wait node for which parameters are to be returned. In at least one embodiment, get semaphore wait node parameters API call 900 includes a pointer for returned parameters parameter that identifies a memory location where a data structure with returned parameters is to be stored. In at least one embodiment, get semaphore wait node parameters API call 900 includes a different number and/or type of parameters (e.g., a graph identifier parameter to identify a graph to which specified wait node belongs).

In at least one embodiment, pseudocode for a get semaphore wait node parameters API call 900 function definition is:

CUresult      cuGraphExternalSemaphoresWaitNodeGet-
   Params (CUgraphNode hNode, CUDA_EXT_SEM_
   WAIT_NODE_PARAMS* params_out)

In at least one embodiment, parameter hNode specifies a wait node for which parameters are to be returned. In at least one embodiment, parameter params_out is a pointer to return parameters. In at least one embodiment, Node Identifier of get semaphore wait node parameters API call 900 corresponds to parameter hNode. In at least one embodiment, Pointer for returned parameters parameter of get semaphore wait node parameters API call 900 corresponds to parameter params_out. In at least one embodiment, get semaphore wait node parameters API call 900 function definition includes a different number and/or type of parameters.

In at least one embodiment, get semaphore wait node parameters API call 900 returns parameters of an external semaphore wait node hNode in params_out. In at least one embodiment, params_out includes one or more data structures (e.g. extSemArray and paramsArray). In at least one embodiment, extSemArray and paramsArray returned in params_out are owned by node. In at least one embodiment, memory remains valid until node is destroyed or its parameters are modified and should not be modified directly, instead using set semaphore wait node parameters API call 800 to update parameters of node.

In at least one embodiment, a response 902 to get semaphore wait node parameters API call 900 includes an operation status. In at least one embodiment, response 902 to get semaphore wait node parameters API call 900 indicates if get semaphore wait node parameters API call 900 was successful, has failed, or if other errors have occurred. In at least one embodiment, operation status is returned in response to get semaphore wait node parameters API call 900 to indicate a status of get semaphore wait node parameters API call 900. In at least one embodiment, operation status is returned as a numeric value (e.g., an integer) that is interpreted by a calling application and/or library (e.g., using a mapping of operation status numeric identifiers to their meaning and/or actions to take). In at least one embodiment, response 902 includes a different number of informational components (e.g., returns more than one value). In at least one embodiment, operation status returned by response 902 is of type CUresult, as indicated in above pseudocode for get semaphore wait node parameters API call 900 function definition.

FIG. 10 illustrates a diagram of an update executable graph semaphore wait node parameters API call 1000, according to at least one embodiment. In at least one embodiment, update executable graph semaphore wait node parameters API call 1000 is a call to update wait node parameters API 140 of FIG. 1. In at least one embodiment, update executable graph semaphore wait node parameters API call 1000 is used (e.g., called by an application or library) to set parameters for an external semaphore wait node in an instantiated graph (e.g., node "D" 212 of FIG. 2). In at least one embodiment, update executable graph semaphore wait node parameters API call 1000 is referred to as an update executable graph external semaphore wait node parameters API call and/or an update executable graph external semaphore wait node parameters API request. In at least one embodiment, update executable graph semaphore wait node parameters API call 1000 includes a graph identifier parameter that specifies an executable graph in which to set specified node. In at least one embodiment, update executable graph semaphore wait node parameters API call 1000 includes a node identifier parameter that specifies external semaphore wait node from graph (e.g., defined graph 122) from which specified executable graph (e.g., instantiated graph 136) was instantiated. In at least one embodiment, update executable graph semaphore wait node parameters API call 1000 includes an updated parameters parameter that specifies updated parameters to set for specified node of specified graph. In at least one embodiment, update executable graph semaphore wait node parameters API call 1000 includes a different number and/or type of parameters.

In at least one embodiment, pseudocode for an update executable graph semaphore wait node parameters API call 1000 function definition is:

CUresult    cuGraphExecExternalSemaphoresWaitNode-
        SetParams (CUgraphExec hGraphExec, CUgraphNode
        hNode,    const    CUDA_EXT_SEM_WAIT_NODE_
        PARAMS* nodeParams)

In at least one embodiment, parameter hGraphExec specifies an executable graph in which to set specified node. In at least one embodiment, parameter hNode specifies a wait node for which parameters are to be set. In at least one embodiment, nodeParams is a pointer to a location in memory of a data structure that includes updated parameters to be set. In at least one embodiment, Graph Identifier of update executable graph semaphore wait node parameters API call 1000 corresponds to parameter hGrahExec. In at least one embodiment, Node Identifier of update executable graph semaphore wait node parameters API call 1000 corresponds to parameter hNode. In at least one embodiment, Updated Parameters of update executable graph semaphore wait node parameters API call 1000 corresponds to parameter nodeParams. In at least one embodiment, update executable graph semaphore wait node parameters API call 1000 function definition includes a different number and/or type of parameters.

In at least one embodiment, update executable graph semaphore wait node parameters API call 1000 sets parameters of an external wait node in an executable graph hGraphExec. In at least one embodiment, node is identified by corresponding node hNode in non-executable graph from which executable graph was instantiated. In at least one embodiment, hNode is present in original graph and has not been removed. In at least one embodiment, modifications (e.g., update with newly set parameters) only affect future launches of hGraph Exec. In at least one embodiment, already enqueued or running launches of hGraphExec are not affected by update executable graph semaphore wait node parameters API call 1000. In at least one embodiment, hNode is not modified by update executable graph semaphore wait node parameters API call 1000.

In at least one embodiment, a response 1002 to update executable graph semaphore wait node parameters API call 1000 includes an operation status. In at least one embodiment, response 1002 to update executable graph semaphore wait node parameters API call 1000 indicates if update executable graph semaphore wait node parameters API call 1000 was successful, has failed, or if other errors have occurred. In at least one embodiment, operation status is returned in response to update executable graph semaphore wait node parameters API call 1000 to indicate a status of update executable graph semaphore wait node parameters API call 1000. In at least one embodiment, operation status is returned as a numeric value (e.g., an integer) that is interpreted by a calling application and/or library (e.g., using a mapping of operation status numeric identifiers to their meaning and/or actions to take). In at least one embodiment, response 1002 includes a different number of informational components (e.g., returns more than one value). In at least one embodiment, operation status returned by response 1002 is of type CUresult, as indicated in above pseudocode for update executable graph semaphore wait node parameters API call 1000 function definition.

In at least one embodiment, one or more of add semaphore wait node API call 700 of FIG. 7, set semaphore wait node parameters API call 800 of FIG. 8, get semaphore wait node parameters API call 900 of FIG. 9, and/or update executable graph semaphore wait node parameters API call 1000 of FIG. 10 is handled by a processor (e.g., processor 104 of FIG. 1). In at least one embodiment, a driver (e.g., a CUDA driver running on computer system 102) handles (e.g., performs one or more operations in response to) one or more of add semaphore wait node API call 700 of FIG. 7, set semaphore wait node parameters API call 800 of FIG. 8, get semaphore wait node parameters API call 900 of FIG. 9, and/or update executable graph semaphore wait node parameters API call 1000 of FIG. 10. In at least one embodiment, a machine-readable medium (e.g., a non-transitory computer-readable medium) includes a first API (e.g., add wait node API 126, set wait node parameters API 132, update wait node parameters API 140, or some other suitable API) stored thereon (e.g., instructions stored thereon for first API) which if performed by one or more processors (e.g., processor 104 of FIG. 1) is to cause graph code to at least wait on a semaphore used by another API. In at least on embodiment, graph code is to be performed, at least in part, by one or more GPUs, and semaphore is a binary semaphore to be allocated by other API. In at least one embodiment, graph code is to be performed, at least in part, by one or more GPUs, and semaphore is a counting semaphore to be allocated by other API. In at least one embodiment, semaphore is to be allocated by other API based, at least in part, on code not included in graph code, and first API is to add a semaphore wait node to graph code that is to perform a wait operation based, at least in part, on a value of semaphore. In at least one embodiment, graph code is to be performed, at least in part, by one or more GPUs, and semaphore is a binary semaphore. In at least one embodiment, graph code is to be performed, at least in part, by one or more GPUs, and semaphore is a counting semaphore.

FIG. 11 is a flowchart of a technique 1100 of adding and updating a semaphore signal node, according to at least one embodiment. In at least one embodiment, technique 1100 is performed by at least one circuit, at least one system, at least one processor, at least one graphics processing unit, at least one parallel processor, and/or at least some other processor or component thereof described and/or shown herein. In at least one embodiment, at least one aspect of technique 1100 is performed by computer system 102 of FIG. 1. In at least one embodiment, technique 1100 is performed, at least in part, by performing a set of instructions (e.g., from a non-transitory machine-readable medium) using one or more processors (e.g., of computer system 102 of FIG. 1 and/or any other suitable processor such as shown or described herein). In at least one embodiment, performing a set of instructions includes executing set of instructions (e.g., using one or more processors). In at least one embodiment, a driver (e.g., a CUDA driver running on computer system 102) performs one or more aspects of technique 1100.

In at least one embodiment, at a block 1102, technique 1100 includes receiving an API call to add an external semaphore signal node to a graph. In at least one embodiment, API call to add external semaphore signal node to a graph is add semaphore signal node API call 300 of FIG. 3. In at least one embodiment, API call to add external semaphore signal node to a graph uses add signal node API 124 of FIG. 1. In at least one embodiment, a GPU driver receives API call (e.g., a driver that performs actions in response to calls to APIs in set of APIs 118 of FIG. 1). In at least one embodiment, driver is software, firmware, or a combination thereof performed by processor 104 of FIG. 1 or some other suitable processor.

In at least one embodiment, at a block 1104, technique 1100 includes adding external semaphore signal node (e.g., node "A" 204 of FIG. 2) to graph. In at least one embodiment, add signal node API 124 of FIG. 1 adds external semaphore signal node to graph. In at least one embodiment, adding external semaphore signal node to graph includes setting one or more parameters for added external semaphore signal node.

In at least one embodiment, at a block 1106, technique 1100 includes receiving an API call to get parameters for an external semaphore signal node. In at least one embodiment, API call to get parameters for external semaphore signal node is get semaphore signal node parameters API call 500 of FIG. 5. In at least one embodiment, API call to get parameters for external semaphore signal node uses get signal node parameters API 130 of FIG. 1. In at least one embodiment, a GPU driver receives API call (e.g., a driver that performs actions in response to calls to APIs in set of APIs 118 of FIG. 1). In at least one embodiment, driver is software, firmware, or a combination thereof performed by processor 104 of FIG. 1 or some other suitable processor.

In at least one embodiment, at a block 1108, technique 1100 includes returning parameters for external semaphore signal node. In at least one embodiment, get signal node parameters API 130 returns parameters for external semaphore signal node. In at least one embodiment, returning parameters includes returning a pointer to one or more data structures stored in memory that include parameters.

In at least one embodiment, at a block 1110, technique 1100 includes receiving an API call to set parameters for an external semaphore signal node. In at least one embodiment, API call to set parameters for external semaphore signal node is set semaphore signal node parameters API call 400 of FIG. 4. In at least one embodiment, API call to set parameters for external semaphore signal node uses set signal node parameters API 128 of FIG. 1. In at least one embodiment, a GPU driver receives API call (e.g., a driver that performs actions in response to calls to APIs in set of APIs 118 of FIG. 1). In at least one embodiment, driver is software, firmware, or a combination thereof performed by processor 104 of FIG. 1 or some other suitable processor.

In at least one embodiment, at a block 1112, technique 1100 includes setting parameters for external semaphore signal node. In at least one embodiment, set signal node parameters API 128 sets parameters for external semaphore signal node. In at least one embodiment, at a block 1114, technique 1100 includes instantiating graph. In at least one embodiment, an API in set of APIs 118 of FIG. 1 instantiates graph.

In at least one embodiment, at a block 1116, technique 1100 includes receiving an API call to update parameters for an external semaphore signal node in executable graph. In at least one embodiment, API call to update parameters for an external semaphore signal node in executable graph is update executable graph semaphore signal node parameters API call 600 of FIG. 6. In at least one embodiment, API call to update parameters for external semaphore signal node in executable graph uses update signal node parameters API 138 of FIG. 1. In at least one embodiment, a GPU driver receives API call (e.g., a driver that performs actions in response to calls to APIs in set of APIs 118 of FIG. 1). In at least one embodiment, driver is software, firmware, or a combination thereof performed by processor 104 of FIG. 1 or some other suitable processor.

In at least one embodiment, at a block 1118, technique 1100 includes updating parameters for external semaphore signal node. In at least one embodiment, update signal node parameters API 138 updates parameters. In at least one embodiment, at a block 1120, technique 1100 includes performing other actions. In at least one embodiment, performing other actions includes launching instantiated graph. In at least one embodiment, performing other actions includes performing one or more signal and/or wait operations based, at least in part, on added external semaphore signal and/or wait nodes (e.g., when nodes are performed after instantiated graph is launched). In at least one embodiment, technique 1100 does not perform one or more actions shown and/or described (e.g., does not receive an API call at block 1116 or update parameters at block 1118). In at least one embodiment, technique 1100 performs one or more actions shown and/or described more than once (e.g., receiving an API call to get parameters for an external semaphore signal node at block 1106 and returning parameters for external semaphore signal node at block 1108).

In at least one embodiment, one or more aspects of technique 1100 include causing, based at least in part, on a first API, graph code to update a semaphore used by another API. In at least one embodiment, graph code is to be performed, at least in part, by one or more GPUs and first API is to add a semaphore signal node to graph code that is to change a value of semaphore. In at least one embodiment, graph code is to be performed, at least in part, by one or more GPUs, semaphore is to be allocated by other API, and causing graph code to update semaphore includes causing graph code to change a value of semaphore when a semaphore signal node of graph code is to be performed. In at least one embodiment, graph code is to be performed, at least in part, by one or more GPUs and other API is to use code not included in graph code. In at least one embodiment, one or more aspects of technique 1100 further include generating executable graph code based, at least in part, on graph code, and setting one or more parameters of a semaphore signal node of executable graph code. In at least one embodiment, graph code is to be performed, at least in part, by one or more GPUs, semaphore is a counting semaphore to be allocated by other API based, at least in part, on code not included in graph code, and one or more aspects of technique 1100 further includes adding, based at least in part, on first API, a semaphore signal node to graph code that is to change a value of counting semaphore when semaphore signal node is performed.

FIG. 12 is a flowchart of a technique 1200 of adding and updating a semaphore wait node, according to at least one embodiment. In at least one embodiment, technique 1200 is performed by at least one circuit, at least one system, at least one processor, at least one graphics processing unit, at least one parallel processor, and/or at least some other processor or component thereof described and/or shown herein. In at least one embodiment, at least one aspect of technique 1200 is performed by computer system 102 of FIG. 1. In at least one embodiment, technique 1200 is performed, at least in part, by performing a set of instructions (e.g., from a non-transitory machine-readable medium) using one or more processors (e.g., of computer system 102 of FIG. 1 and/or any other suitable processor such as shown or described herein). In at least one embodiment, performing a set of instructions includes executing set of instructions (e.g., using one or more processors). In at least one embodiment, a driver (e.g., a CUDA driver running on computer system 102) performs one or more aspects of technique 1200.

In at least one embodiment, at a block 1202, technique 1200 includes receiving an API call to add an external semaphore wait node to a graph. In at least one embodiment, API call to add external semaphore wait node to a graph is add semaphore wait node API call 700 of FIG. 7. In at least one embodiment, API call to add external semaphore wait node to a graph uses add wait node API 126 of FIG. 1. In at least one embodiment, a GPU driver receives API call (e.g., a driver that performs actions in response to calls to APIs in set of APIs 118 of FIG. 1). In at least one embodiment, driver is software, firmware, or a combination thereof performed by processor 104 of FIG. 1 or some other suitable processor.

In at least one embodiment, at a block 1204, technique 1200 includes adding external semaphore wait node (e.g., node "D" 212 of FIG. 2) to graph. In at least one embodiment, add wait node API 126 of FIG. 1 adds external semaphore wait node to graph. In at least one embodiment, adding external semaphore wait node to graph includes setting one or more parameters for added external semaphore wait node.

In at least one embodiment, at a block 1206, technique 1200 includes receiving an API call to get parameters for an external semaphore wait node. In at least one embodiment, API call to get parameters for external semaphore wait node is get semaphore wait node parameters API call 900 of FIG. 9. In at least one embodiment, API call to get parameters for external semaphore wait node uses get wait node parameters API 134 of FIG. 1. In at least one embodiment, a GPU driver receives API call (e.g., a driver that performs actions in response to calls to APIs in set of APIs 118 of FIG. 1). In at least one embodiment, driver is software, firmware, or a combination thereof performed by processor 104 of FIG. 1 or some other suitable processor.

In at least one embodiment, at a block 1208, technique 2100 includes returning parameters for external semaphore wait node. In at least one embodiment, get wait node parameters API 134 returns parameters for external semaphore wait node. In at least one embodiment, returning parameters includes returning a pointer to one or more data structures stored in memory that include parameters.

In at least one embodiment, at a block 1210, technique 1200 includes receiving an API call to set parameters for an external semaphore wait node. In at least one embodiment, API call to set parameters for external semaphore wait node is set semaphore wait node parameters API call 800 of FIG. 8. In at least one embodiment, API call to set parameters for external semaphore wait node uses set wait node parameters API 132 of FIG. 1. In at least one embodiment, a GPU driver receives API call (e.g., a driver that performs actions in response to calls to APIs in set of APIs 118 of FIG. 1). In at least one embodiment, driver is software, firmware, or a combination thereof performed by processor 104 of FIG. 1 or some other suitable processor.

In at least one embodiment, at a block 1212, technique 1200 includes setting parameters for external semaphore wait node. In at least one embodiment, set wait node parameters API 132 sets parameters for external semaphore wait node. In at least one embodiment, at a block 1214, technique 1200 includes instantiating graph. In at least one embodiment, an API in set of APIs 118 of FIG. 1 instantiates graph.

In at least one embodiment, at a block 1216, technique 1200 includes receiving an API call to update parameters for an external semaphore wait node in executable graph. In at least one embodiment, API call to update parameters for an external semaphore wait node in executable graph is update executable graph semaphore wait node parameters API call 1000 of FIG. 10. In at least one embodiment, API call to update parameters for external semaphore wait node in executable graph uses update wait node parameters API 140 of FIG. 1. In at least one embodiment, a GPU driver receives API call (e.g., a driver that performs actions in response to calls to APIs in set of APIs 118 of FIG. 1). In at least one embodiment, driver is software, firmware, or a combination thereof performed by processor 104 of FIG. 1 or some other suitable processor.

In at least one embodiment, at a block 1218, technique 1200 includes updating parameters for external semaphore wait node. In at least one embodiment, update wait node parameters API 140 updates parameters. In at least one embodiment, at a block 1220, technique 1200 includes performing other actions. In at least one embodiment, performing other actions includes launching instantiated graph. In at least one embodiment, performing other actions includes performing one or more signal and/or wait operations based, at least in part, on added external semaphore signal and/or wait nodes (e.g., when nodes are performed after instantiated graph is launched). In at least one embodiment, technique 1200 does not perform one or more actions shown and/or described (e.g., does not receive an API call at block 1216 or update parameters at block 1218). In at least one embodiment, technique 1200 performs one or more actions shown and/or described more than once (e.g., receiving an API call to set parameters for an external semaphore wait node at block 1210 and setting parameters for external semaphore wait node at block 1212). In at least one embodiment, performing other actions includes performing one or more actions shown and/or described with respect to technique 1100 of FIG. 11.

In at least one embodiment, one or more aspects of technique 1200 include causing, based at least in part, on a first API, graph code to wait on a semaphore used by another API. In at least one embodiment, graph code is to be performed, at least in part, by one or more GPUs, and first API is to add a semaphore wait node to graph code that is to perform a wait operation based, at least in part, on semaphore. In at least one embodiment, graph code is to be performed, at least in part, by one or more GPUs, semaphore is to be allocated by other API, and wait operation includes waiting to proceed until semaphore is a predetermined value. In at least one embodiment, graph code is to be performed, at least in part, by one or more GPUs, and other API is to use code not included in graph code. In at least one embodiment, one or more aspects of technique 1200 further include generating executable graph code based, at least in part, on graph code, and setting one or more parameters of a semaphore wait node of executable graph code. In at least one embodiment, graph code is to be performed, at least in part, by one or more GPUs, semaphore is a counting semaphore to be allocated by other API based, at least in part, on code not included in graph code, and one or more aspects of technique 1200 further include adding, based at least in part on first API, a semaphore wait node to graph code that is to perform a wait operation based, at least in art, on a value of counting semaphore.

Data Center

The following figure sets forth, without limitation, exemplary data center systems that can be used to implement at least one embodiment. In at least one embodiment, one or more data center components of following figure can implement one or more aspects of an embodiment described with respect to one or more of FIGS. 1-12. In at least one embodiment, one or more data center components include one or more components of computer system 102 of FIG. 1 (e.g., processor 104, memory 106, GPU 110, first set of APIs 118, second set of APIs 120, defined graph 122, instantiated graph 136, kernel function code 142, code 144, semaphore 146, semaphore 148 and/or one or more components of set of nodes 150 of FIG. 1. In at least one embodiment, one or more data center components perform one or more aspects with respect to graph 200 of FIG. 2. In at least one embodiment, one or more data center components perform one or more aspects of one or more API calls and/or responses shown and/or described with respect to one or more of FIGS. 3-10. In at least one embodiment, one or more data center components perform one or more aspects of technique 1100 of FIG. 11 and/or technique 1200 of FIG. 12.

FIG. 13 illustrates an exemplary data center 1300, in accordance with at least one embodiment. In at least one embodiment, data center 1300 includes, without limitation, a data center infrastructure layer 1310, a framework layer 1320, a software layer 1330 and an application layer 1340.

In at least one embodiment, as shown in FIG. 13, data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1316(1)-1316(N) may be a server having one or more of above-mentioned computing resources.

In at least one embodiment, grouped computing resources 1314 may include separate groupings of node C.R.s housed within one or more racks (not shown), or many racks housed in data centers at various geographical locations (also not shown). Separate groupings of node C.R.s within grouped computing resources 1314 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1312 may configure or otherwise control one or more node C.R.s 1316(1)-1316(N) and/or grouped computing resources 1314. In at least one embodiment, resource orchestrator 1312 may include a software design infrastructure ("SDI") management entity for data center 1300. In at least one embodiment, resource orchestrator 1312 may include hardware, software or some combination thereof.

In at least one embodiment, as shown in FIG. 13, framework layer 1320 includes, without limitation, a job scheduler 1332, a configuration manager 1334, a resource manager 1336 and a distributed file system 1338. In at least one embodiment, framework layer 1320 may include a framework to support software 1352 of software layer 1330 and/or one or more application(s) 1342 of application layer 1340. In at least one embodiment, software 1352 or application(s) 1342 may respectively include web-based service software or applications, such as those provided by Amazon Web Services, Google Cloud and Microsoft Azure. In at least one embodiment, framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1332 may include a Spark driver to facilitate scheduling of workloads supported by various layers of data center 1300. In at least one embodiment, configuration manager 1334 may be capable of configuring different layers such as software layer 1330 and framework layer 1320, including Spark and distributed file system 1338 for supporting large-scale data processing. In at least one embodiment, resource manager 1336 may be capable of managing clustered or grouped computing resources mapped to or allocated for support of distributed file system 1338 and job scheduler 1332. In at least one embodiment, clustered or grouped computing resources may include grouped computing resource 1314 at data center infrastructure layer 1310. In at least one embodiment, resource manager 1336 may coordinate with resource orchestrator 1312 to manage these mapped or allocated computing resources.

In at least one embodiment, software 1352 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. In at least one or more types of applications may include, without limitation, CUDA applications.

In at least one embodiment, any of configuration manager 1334, resource manager 1336, and resource orchestrator 1312 may implement any number and type of self-modifying actions based on any amount and type of data acquired in any technically feasible fashion. In at least one embodiment, self-modifying actions may relieve a data center operator of data center 1300 from making possibly bad configuration decisions and possibly avoiding underutilized and/or poor performing portions of a data center.

Computer-Based Systems

The following figures set forth, without limitation, exemplary computer-based systems that can be used to implement at least one embodiment. In at least one embodiment, one or more computer-based systems of following figures can implement one or more aspects of an embodiment described with respect to one or more of FIGS. 1-12. In at least one embodiment, one or more computer-based systems include one or more components of computer system 102 of FIG. 1 (e.g., processor 104, memory 106, GPU 110, first set of APIs 118, second set of APIs 120, defined graph 122, instantiated graph 136, kernel function code 142, code 144, semaphore 146, semaphore 148 and/or one or more components of set of nodes 150 of FIG. 1. In at least one embodiment, one or more computer-based systems perform one or more aspects with respect to graph 200 of FIG. 2. In at least one embodiment, one or more computer-based systems perform one or more aspects of one or more API calls and/or responses shown and/or described with respect to one or more of FIGS. 3-10. In at least one embodiment, one or more computer-based systems perform one or more aspects of technique 1100 of FIG. 11 and/or technique 1200 of FIG. 12.

Figure 14:
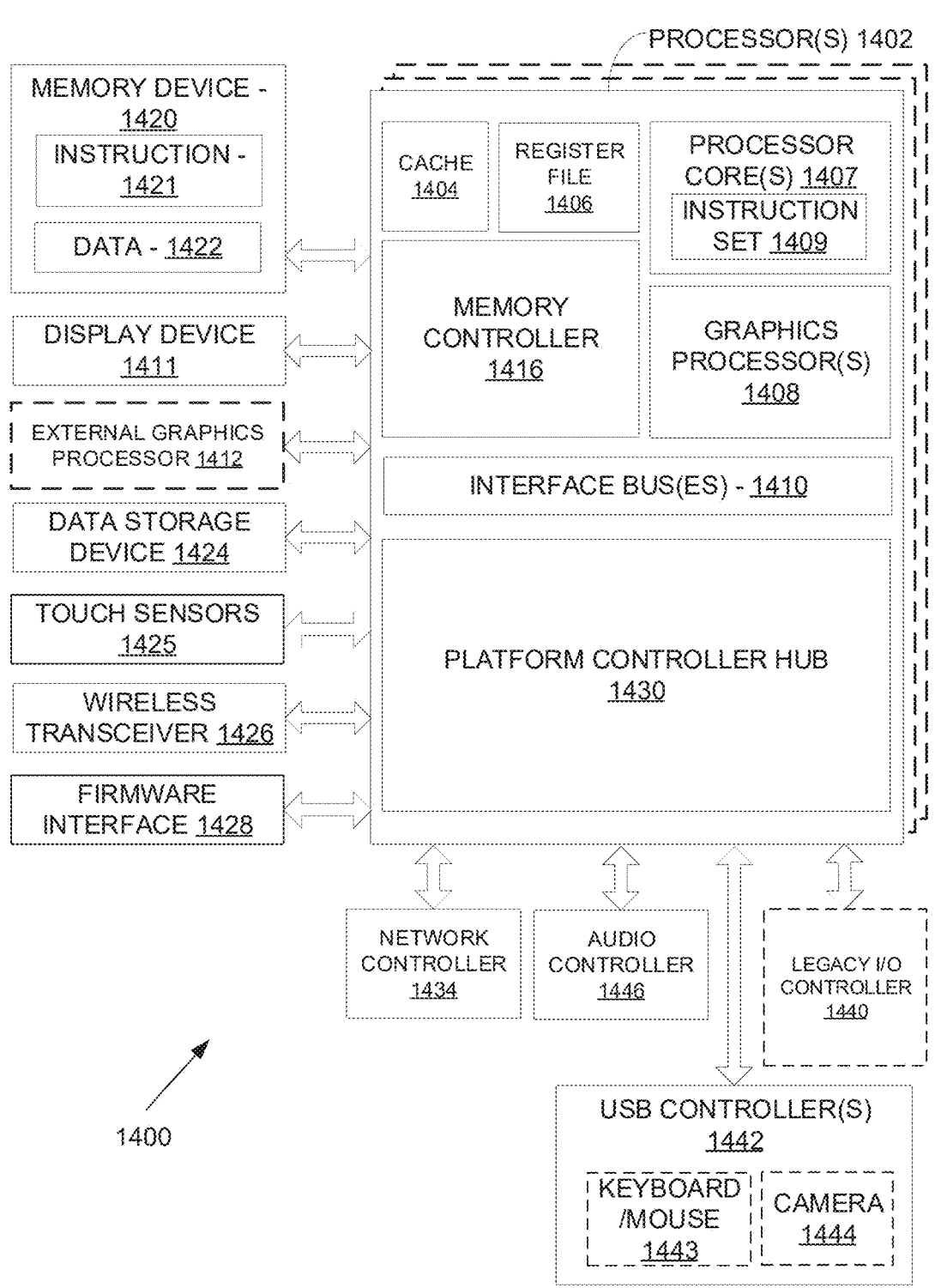
FIG. 14 illustrates a processing system, in accordance with at least one embodiment.

FIG. 14 illustrates a processing system 1400, in accordance with at least one embodiment. In at least one embodiment, processing system 1400 includes one or more processors 1402 and one or more graphics processors 1408, and may be a single processor desktop system, a multiprocessor workstation system, or a server system having a large number of processors 1402 or processor cores 1407. In at least one embodiment, processing system 1400 is a processing platform incorporated within a system-on-a-chip ("SoC") integrated circuit for use in mobile, handheld, or embedded devices.

In at least one embodiment, processing system 1400 can include, or be incorporated within a server-based gaming platform, a game console, a media console, a mobile gaming console, a handheld game console, or an online game console. In at least one embodiment, processing system 1400 is a mobile phone, smart phone, tablet computing device or mobile Internet device. In at least one embodiment, processing system 1400 can also include, couple with, or be integrated within a wearable device, such as a smart watch wearable device, smart eyewear device, augmented reality device, or virtual reality device. In at least one embodiment, processing system 1400 is a television or set top box device having one or more processors 1402 and a graphical interface generated by one or more graphics processors 1408.

In at least one embodiment, one or more processors 1402 each include one or more processor cores 1407 to process instructions which, when executed, perform operations for system and user software. In at least one embodiment, each of one or more processor cores 1407 is configured to process a specific instruction set 1409. In at least one embodiment, instruction set 1409 may facilitate Complex Instruction Set Computing ("CISC"), Reduced Instruction Set Computing ("RISC"), or computing via a Very Long Instruction Word ("VLIW"). In at least one embodiment, processor cores 1407 may each process a different instruction set 1409, which may include instructions to facilitate emulation of other instruction sets. In at least one embodiment, processor core 1407 may also include other processing devices, such as a digital signal processor ("DSP").

In at least one embodiment, processor 1402 includes cache memory ('cache") 1404. In at least one embodiment, processor 1402 can have a single internal cache or multiple levels of internal cache. In at least one embodiment, cache memory is shared among various components of processor 1402. In at least one embodiment, processor 1402 also uses an external cache (e.g., a Level 3 ("L3") cache or Last Level Cache ("LLC")) (not shown), which may be shared among processor cores 1407 using known cache coherency techniques. In at least one embodiment, register file 1406 is additionally included in processor 1402 which may include different types of registers for storing different types of data (e.g., integer registers, floating point registers, status registers, and an instruction pointer register). In at least one embodiment, register file 1406 may include general-purpose registers or other registers.

In at least one embodiment, one or more processor(s) 1402 are coupled with one or more interface bus(es) 1410 to transmit communication signals such as address, data, or control signals between processor 1402 and other components in processing system 1400. In at least one embodiment interface bus 1410, in one embodiment, can be a processor bus, such as a version of a Direct Media Interface ("DMI") bus. In at least one embodiment, interface bus 1410 is not limited to a DMI bus, and may include one or more Peripheral Component Interconnect buses (e.g., "PCI," PCI Express ("PCIe")), memory buses, or other types of interface buses. In at least one embodiment processor(s) 1402 include an integrated memory controller 1416 and a platform controller hub 1430. In at least one embodiment, memory controller 1416 facilitates communication between a memory device and other components of processing system 1400, while platform controller hub ("PCH") 1430 provides connections to Input/Output ("I/O") devices via a local I/O bus.

In at least one embodiment, memory device 1420 can be a dynamic random access memory ("DRAM") device, a static random access memory ("SRAM") device, flash memory device, phase-change memory device, or some other memory device having suitable performance to serve as processor memory. In at least one embodiment memory device 1420 can operate as system memory for processing system 1400, to store data 1422 and instructions 1421 for use when one or more processors 1402 executes an application or process. In at least one embodiment, memory controller 1416 also couples with an optional external graphics processor 1412, which may communicate with one or more graphics processors 1408 in processors 1402 to perform graphics and media operations. In at least one embodiment, a display device 1411 can connect to processor(s) 1402. In at least one embodiment display device 1411 can include one or more of an internal display device, as in a mobile electronic device or a laptop device or an external display device attached via a display interface (e.g., DisplayPort, etc.). In at least one embodiment, display device 1411 can include a head mounted display ("HMD") such as a stereoscopic display device for use in virtual reality ("VR") applications or augmented reality ("AR") applications.

In at least one embodiment, platform controller hub 1430 enables peripherals to connect to memory device 1420 and processor 1402 via a high-speed I/O bus. In at least one embodiment, I/O peripherals include, but are not limited to, an audio controller 1446, a network controller 1434, a firmware interface 1428, a wireless transceiver 1426, touch sensors 1425, a data storage device 1424 (e.g., hard disk drive, flash memory, etc.). In at least one embodiment, data storage device 1424 can connect via a storage interface (e.g., SATA) or via a peripheral bus, such as PCI, or PCIe. In at least one embodiment, touch sensors 1425 can include touch screen sensors, pressure sensors, or fingerprint sensors. In at least one embodiment, wireless transceiver 1426 can be a Wi-Fi transceiver, a Bluetooth transceiver, or a mobile network transceiver such as a 3G, 4G, or Long Term Evolution ("LTE") transceiver. In at least one embodiment, firmware interface 1428 enables communication with system firmware, and can be, for example, a unified extensible firmware interface ("UEFI"). In at least one embodiment, network controller 1434 can enable a network connection to a wired network. In at least one embodiment, a high-performance network controller (not shown) couples with interface bus 1410. In at least one embodiment, audio controller 1446 is a multi-channel high definition audio controller. In at least one embodiment, processing system 1400 includes an optional legacy I/O controller 1440 for coupling legacy (e.g., Personal System 2 ("PS/2")) devices to processing system 1400. In at least one embodiment, platform controller hub 1430 can also connect to one or more Universal Serial Bus ("USB") controllers 1442 connect input devices, such as keyboard and mouse 1443 combinations, a camera 1444, or other USB input devices.

In at least one embodiment, an instance of memory controller 1416 and platform controller hub 1430 may be integrated into a discreet external graphics processor, such as external graphics processor 1412. In at least one embodiment, platform controller hub 1430 and/or memory controller 1416 may be external to one or more processor(s) 1402. For example, in at least one embodiment, processing system 1400 can include an external memory controller 1416 and platform controller hub 1430, which may be configured as a memory controller hub and peripheral controller hub within a system chipset that is in communication with processor(s) 1402.

Figure 15:
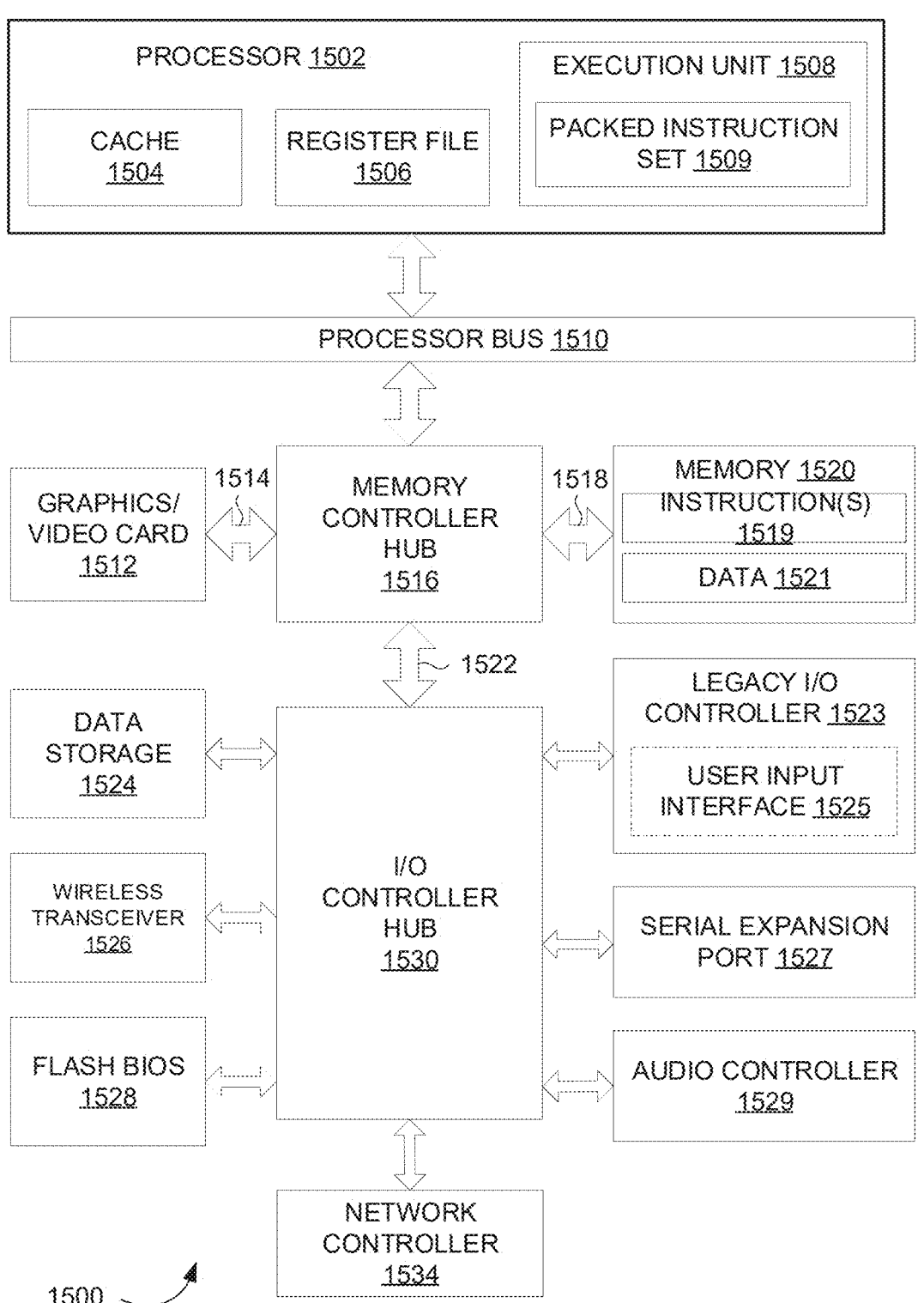
FIG. 15 illustrates a computer system, in accordance with at least one embodiment.

FIG. 15 illustrates a computer system 1500, in accordance with at least one embodiment. In at least one embodiment, computer system 1500 may be a system with interconnected devices and components, an SOC, or some combination. In at least on embodiment, computer system 1500 is formed with a processor 1502 that may include execution units to execute an instruction. In at least one embodiment, computer system 1500 may include, without limitation, a component, such as processor 1502 to employ execution units including logic to perform algorithms for processing data. In at least one embodiment, computer system 1500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1500 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1500 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 1500 may include, without limitation, processor 1502 that may include, without limitation, one or more execution units 1508 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1500 is a single processor desktop or server system. In at least one embodiment, computer system 1500 may be a multiprocessor system. In at least one embodiment, processor 1502 may include, without limitation, a CISC microprocessor, a RISC microprocessor, a VLIW microprocessor, a processor implementing a combination of instruction sets, or any other processor device, such as a digital signal processor, for example. In at least one embodiment, processor 1502 may be coupled to a processor bus 1510 that may transmit data signals between processor 1502 and other components in computer system 1500.

In at least one embodiment, processor 1502 may include, without limitation, a Level 1 ("L1") internal cache memory ("cache") 1504. In at least one embodiment, processor 1502 may have a single internal cache or multiple levels of internal cache. In at least one embodiment, cache memory may reside external to processor 1502. In at least one embodiment, processor 1502 may also include a combination of both internal and external caches. In at least one embodiment, a register file 1506 may store different types of data in various registers including, without limitation, integer registers, floating point registers, status registers, and instruction pointer register.

In at least one embodiment, execution unit 1508, including, without limitation, logic to perform integer and floating point operations, also resides in processor 1502. Processor 1502 may also include a microcode ("ucode") read only memory ("ROM") that stores microcode for certain macro instructions. In at least one embodiment, execution unit 1508 may include logic to handle a packed instruction set 1509. In at least one embodiment, by including packed instruction set 1509 in an instruction set of a general-purpose processor 1502, along with associated circuitry to execute instructions, operations used by many multimedia applications may be performed using packed data in a general-purpose processor 1502. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1508 may also be used in microcontrollers, embedded processors, graphics devices, DSPs, and other types of logic circuits. In at least one embodiment, computer system 1500 may include, without limitation, a memory 1520. In at least one embodiment, memory 1520 may be implemented as a DRAM device, an SRAM device, flash memory device, or other memory device. Memory 1520 may store instruction(s) 1519 and/or data 1521 represented by data signals that may be executed by processor 1502.

In at least one embodiment, a system logic chip may be coupled to processor bus 1510 and memory 1520. In at least one embodiment, the system logic chip may include, without limitation, a memory controller hub ("MCH") 1516, and processor 1502 may communicate with MCH 1516 via processor bus 1510. In at least one embodiment, MCH 1516 may provide a high bandwidth memory path 1518 to memory 1520 for instruction and data storage and for storage of graphics commands, data and textures. In at least one embodiment, MCH 1516 may direct data signals between processor 1502, memory 1520, and other components in computer system 1500 and to bridge data signals between processor bus 1510, memory 1520, and a system I/O 1522. In at least one embodiment, system logic chip may provide a graphics port for coupling to a graphics controller. In at least one embodiment, MCH 1516 may be coupled to memory 1520 through high bandwidth memory path 1518 and graphics/video card 1512 may be coupled to MCH 1516 through an Accelerated Graphics Port ("AGP") interconnect 1514.

In at least one embodiment, computer system 1500 may use system I/O 1522 that is a proprietary hub interface bus to couple MCH 1516 to I/O controller hub ("ICH") 1530. In at least one embodiment, ICH 1530 may provide direct connections to some I/O devices via a local I/O bus. In at least one embodiment, local I/O bus may include, without limitation, a high-speed I/O bus for connecting peripherals to memory 1520, a chipset, and processor 1502. Examples may include, without limitation, an audio controller 1529, a firmware hub ("flash BIOS") 1528, a wireless transceiver 1526, a data storage 1524, a legacy I/O controller 1523 containing a user input interface 1525 and a keyboard interface, a serial expansion port 1527, such as a USB, and a network controller 1534. Data storage 1524 may comprise a hard disk drive, a floppy disk drive, a CD-ROM device, a flash memory device, or other mass storage device.

In at least one embodiment, FIG. 15 illustrates a system, which includes interconnected hardware devices or "chips." In at least one embodiment, FIG. 15 may illustrate an exemplary SoC. In at least one embodiment, devices illustrated in FIG. 15 may be interconnected with proprietary interconnects, standardized interconnects (e.g., PCIe), or some combination thereof. In at least one embodiment, one or more components of system 1500 are interconnected using compute express link ("CXL") interconnects.

Figure 16:
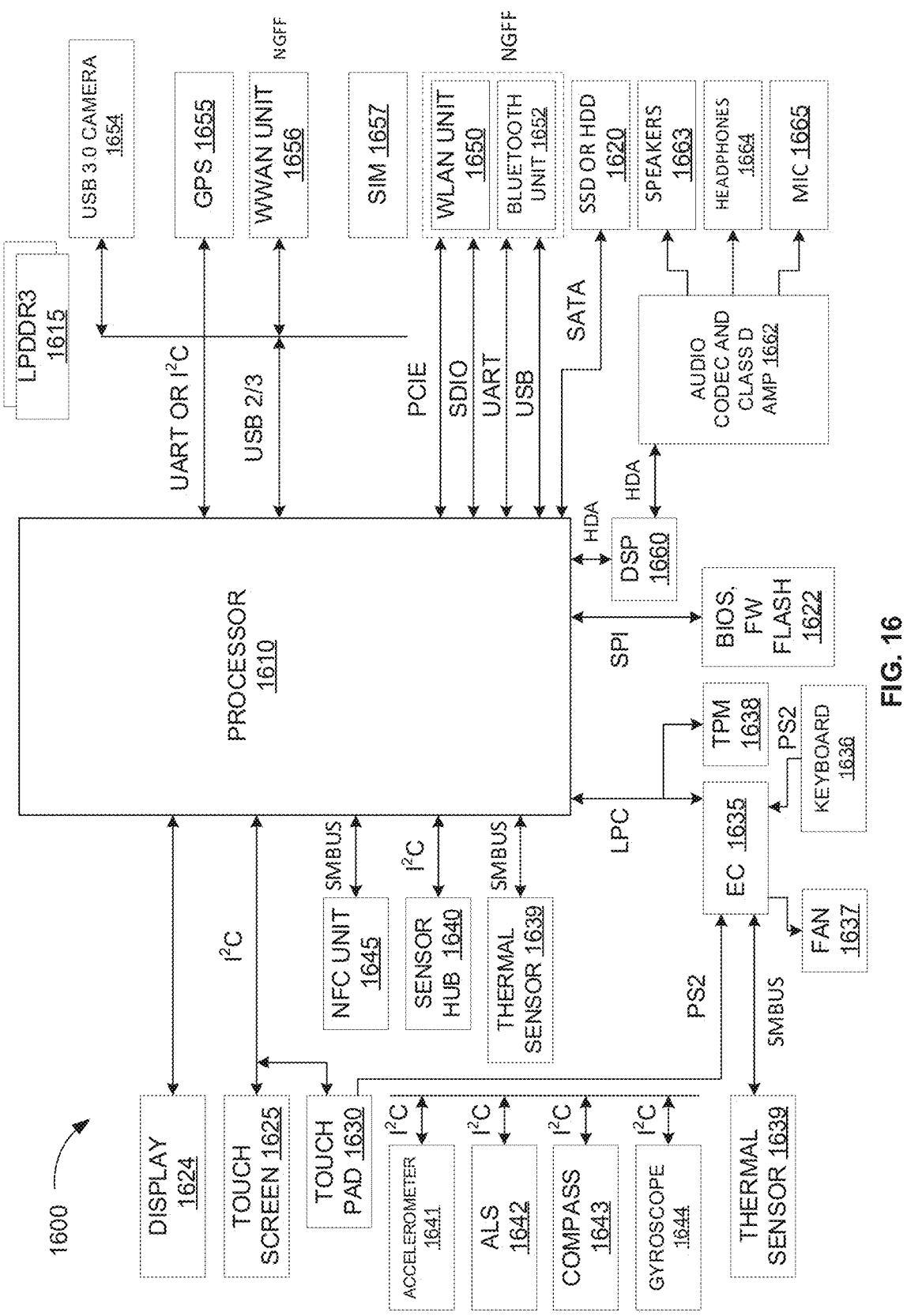
FIG. 16 illustrates a system, in accordance with at least one embodiment.

FIG. 16 illustrates a system 1600, in accordance with at least one embodiment. In at least one embodiment, system 1600 is an electronic device that utilizes a processor 1610. In at least one embodiment, system 1600 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 1600 may include, without limitation, processor 1610 communicatively coupled to any suitable number or kind of components, peripherals, modules, or devices. In at least one embodiment, processor 1610 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/ Transmitter ("UART") bus. In at least one embodiment, FIG. 16 illustrates a system which includes interconnected hardware devices or "chips." In at least one embodiment, FIG. 16 may illustrate an exemplary SoC. In at least one embodiment, devices illustrated in FIG. 16 may be interconnected with proprietary interconnects, standardized interconnects (e.g., PCIe) or some combination thereof. In at least one embodiment, one or more components of FIG. 16 are interconnected using CXL interconnects.

In at least one embodiment, FIG. 16 may include a display 1624, a touch screen 1625, a touch pad 1630, a Near Field Communications unit ("NFC") 1645, a sensor hub 1640, a thermal sensor 1646, an Express Chipset ("EC") 1635, a Trusted Platform Module ("TPM") 1638, BIOS/firmware/ flash memory ("BIOS, FW Flash") 1622, a DSP 1660, a Solid State Disk ("SSD") or Hard Disk Drive ("HDD") 1620, a wireless local area network unit ("WLAN") 1650, a Bluetooth unit 1652, a Wireless Wide Area Network unit ("WWAN") 1656, a Global Positioning System ("GPS") 1655, a camera ("USB 3.0 camera") 1654 such as a USB 3.0 camera, or a Low Power Double Data Rate ("LPDDR") memory unit ("LPDDR3") 1615 implemented in, for example, LPDDR3 standard. These components may each be implemented in any suitable manner.

In at least one embodiment, other components may be communicatively coupled to processor 1610 through components discussed above. In at least one embodiment, an accelerometer 1641, an Ambient Light Sensor ("ALS") 1642, a compass 1643, and a gyroscope 1644 may be communicatively coupled to sensor hub 1640. In at least one embodiment, a thermal sensor 1639, a fan 1637, a keyboard 1636, and a touch pad 1630 may be communicatively coupled to EC 1635. In at least one embodiment, a speaker 1663, a headphones 1664, and a microphone ("mic") 1665 may be communicatively coupled to an audio unit ("audio codec and class d amp") 1662, which may in turn be communicatively coupled to DSP 1660. In at least one embodiment, audio unit 1662 may include, for example and without limitation, an audio coder/decoder ("codec") and a class D amplifier. In at least one embodiment, a SIM card ("SIM") 1657 may be communicatively coupled to WWAN unit 1656. In at least one embodiment, components such as WLAN unit 1650 and Bluetooth unit 1652, as well as WWAN unit 1656 may be implemented in a Next Generation Form Factor ("NGFF").

Figure 17:
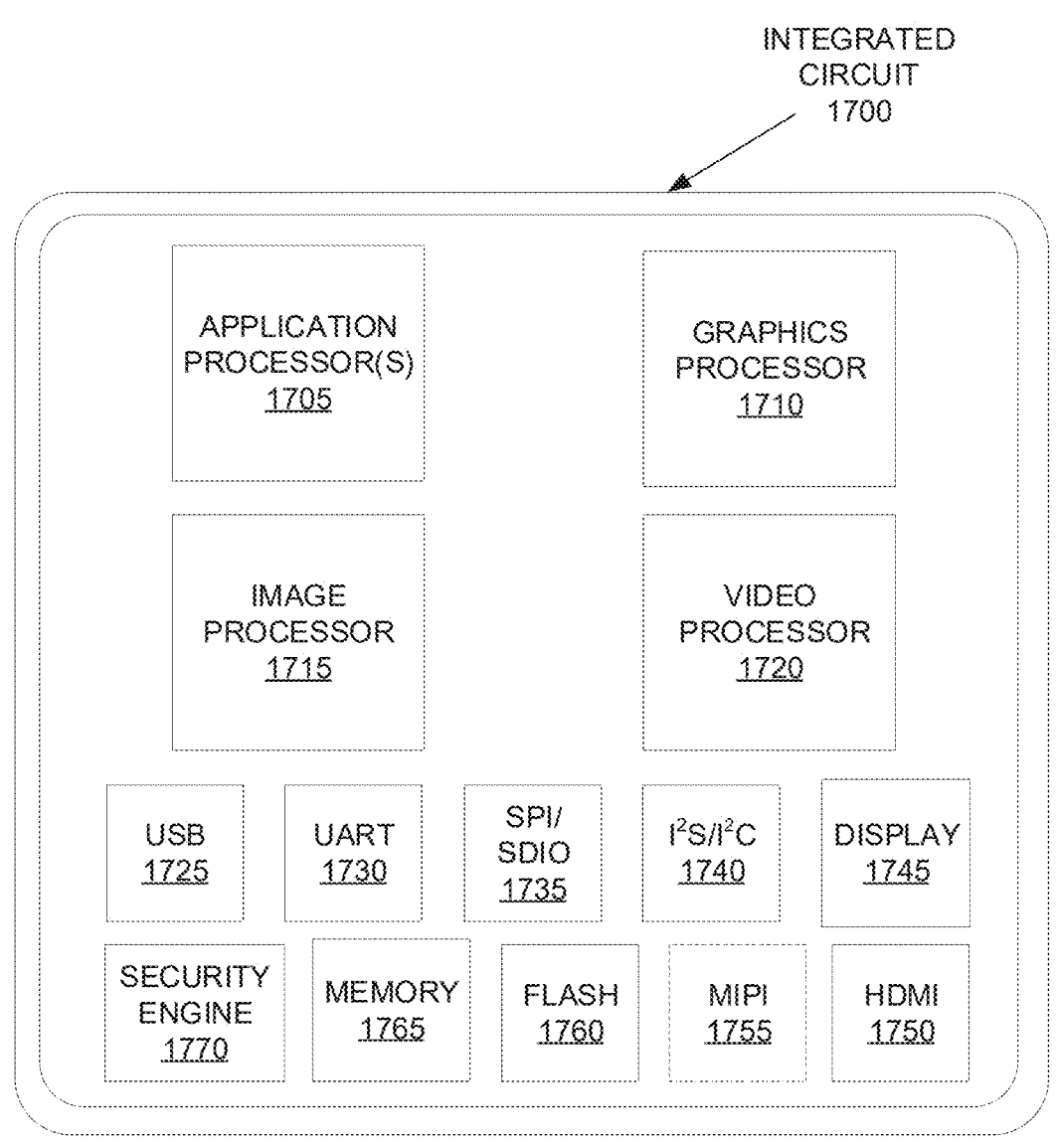
FIG. 17 illustrates an exemplary integrated circuit, in accordance with at least one embodiment.

FIG. 17 illustrates an exemplary integrated circuit 1700, in accordance with at least one embodiment. In at least one embodiment, exemplary integrated circuit 1700 is an SoC that may be fabricated using one or more IP cores. In at least one embodiment, integrated circuit 1700 includes one or more application processor(s) 1705 (e.g., CPUs, DPUs), at least one graphics processor 1710, and may additionally include an image processor 1715 and/or a video processor 1720, any of which may be a modular IP core. In at least one embodiment, integrated circuit 1700 includes peripheral or bus logic including a USB controller 1725, a UART controller 1730, an SPI/SDIO controller 1735, and an I²S/I²C controller 1740. In at least one embodiment, integrated circuit 1700 can include a display device 1745 coupled to one or more of a high-definition multimedia interface ("HDMI") controller 1750 and a mobile industry processor interface ("MIPI") display interface 1755. In at least one embodiment, storage may be provided by a flash memory subsystem 1760 including flash memory and a flash memory controller. In at least one embodiment, a memory interface may be provided via a memory controller 1765 for access to SDRAM or SRAM memory devices. In at least one embodiment, some integrated circuits additionally include an embedded security engine 1770.

Figure 18:
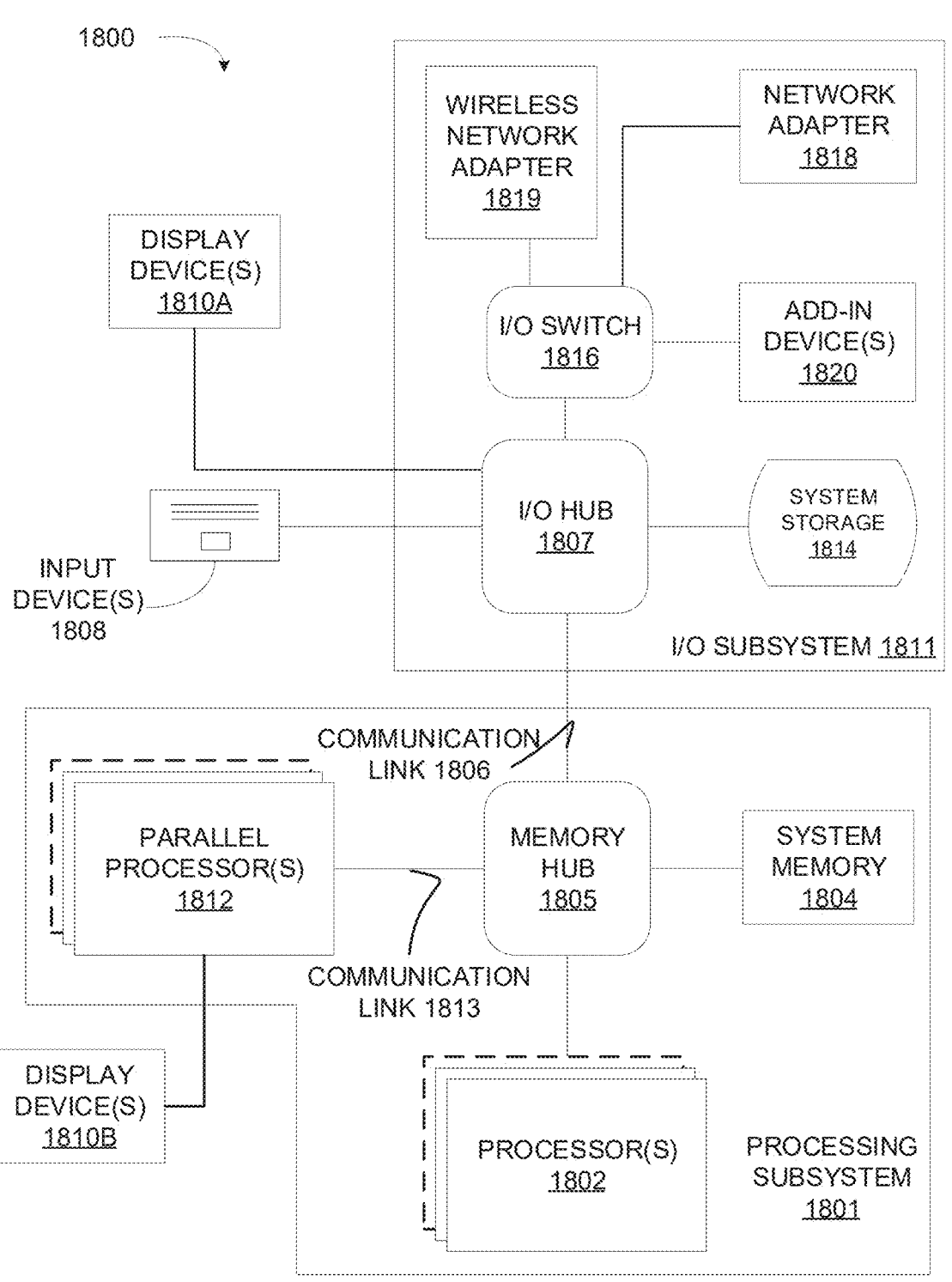
FIG. 18 illustrates a computing system, according to at least one embodiment.

FIG. 18 illustrates a computing system 1800, according to at least one embodiment; In at least one embodiment, computing system 1800 includes a processing subsystem 1801 having one or more processor(s) 1802 and a system memory 1804 communicating via an interconnection path that may include a memory hub 1805. In at least one embodiment, memory hub 1805 may be a separate component within a chipset component or may be integrated within one or more processor(s) 1802. In at least one embodiment, memory hub 1805 couples with an I/O subsystem 1811 via a communication link 1806. In at least one embodiment, I/O subsystem 1811 includes an I/O hub 1807 that can enable computing system 1800 to receive input from one or more input device(s) 1808. In at least one embodiment, I/O hub 1807 can enable a display controller, which may be included in one or more processor(s) 1802, to provide outputs to one or more display device(s) 1810A. In at least one embodiment, one or more display device(s) 1810A coupled with I/O hub 1807 can include a local, internal, or embedded display device.

In at least one embodiment, processing subsystem 1801 includes one or more parallel processor(s) 1812 coupled to memory hub 1805 via a bus or other communication link 1813. In at least one embodiment, communication link 1813 may be one of any number of standards based communication link technologies or protocols, such as, but not limited to PCIe, or may be a vendor specific communications interface or communications fabric. In at least one embodiment, one or more parallel processor(s) 1812 form a computationally focused parallel or vector processing system that can include a large number of processing cores and/or processing clusters, such as a many integrated core processor. In at least one embodiment, one or more parallel processor(s) 1812 form a graphics processing subsystem that can output pixels to one of one or more display device(s) 1810A coupled via I/O Hub 1807. In at least one embodiment, one or more parallel processor(s) 1812 can also include a display controller and display interface (not shown) to enable a direct connection to one or more display device(s) 1810B.

In at least one embodiment, a system storage unit 1814 can connect to I/O hub 1807 to provide a storage mechanism for computing system 1800. In at least one embodiment, an I/O switch 1816 can be used to provide an interface mechanism to enable connections between I/O hub 1807 and other components, such as a network adapter 1818 and/or wireless network adapter 1819 that may be integrated into a platform, and various other devices that can be added via one or more add-in device(s) 1820. In at least one embodiment, network adapter 1818 can be an Ethernet adapter or another wired network adapter. In at least one embodiment, wireless network adapter 1819 can include one or more of a Wi-Fi, Bluetooth, NFC, or other network device that includes one or more wireless radios.

In at least one embodiment, computing system 1800 can include other components not explicitly shown, including USB or other port connections, optical storage drives, video capture devices, and the like, that may also be connected to I/O hub 1807. In at least one embodiment, communication paths interconnecting various components in FIG. 18 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 1812 incorporate circuitry optimized for graphics and video processing, including, for example, video output circuitry, and constitutes a graphics processing unit ("GPU"). In at least one embodiment, one or more parallel processor(s) 1812 incorporate circuitry optimized for general purpose processing. In at least embodiment, components of computing system 1800 may be integrated with one or more other system elements on a single integrated circuit. For example, in at least one embodiment, one or more parallel processor(s) 1812, memory hub 1805, processor(s) 1802, and I/O hub 1807 can be integrated into an SoC integrated circuit. In at least one embodiment, components of computing system 1800 can be integrated into a single package to form a system in package ("SIP") configuration. In at least one embodiment, at least a portion of the components of computing system 1800 can be integrated into a multi-chip module ("MCM"), which can be interconnected with other multi-chip modules into a modular computing system. In at least one embodiment, I/O subsystem 1811 and display devices 1810B are omitted from computing system 1800.

Processing Systems

The following figures set forth, without limitation, exemplary processing systems that can be used to implement at least one embodiment. In at least one embodiment, one or more processing systems of following figures can implement one or more aspects of an embodiment described with respect to one or more of FIGS. 1-12. In at least one embodiment, one or more processing systems include one or more components of computer system 102 of FIG. 1 (e.g., processor 104, memory 106, GPU 110, first set of APIs 118, second set of APIs 120, defined graph 122, instantiated graph 136, kernel function code 142, code 144, semaphore 146, semaphore 148 and/or one or more components of set of nodes 150 of FIG. 1. In at least one embodiment, one or more processing systems perform one or more aspects with respect to graph 200 of FIG. 2. In at least one embodiment, one or more processing systems perform one or more aspects of one or more API calls and/or responses shown and/or described with respect to one or more of FIGS. 3-10. In at least one embodiment, one or more processing systems perform one or more aspects of technique 1100 of FIG. 11 and/or technique 1200 of FIG. 12.

Figure 19:
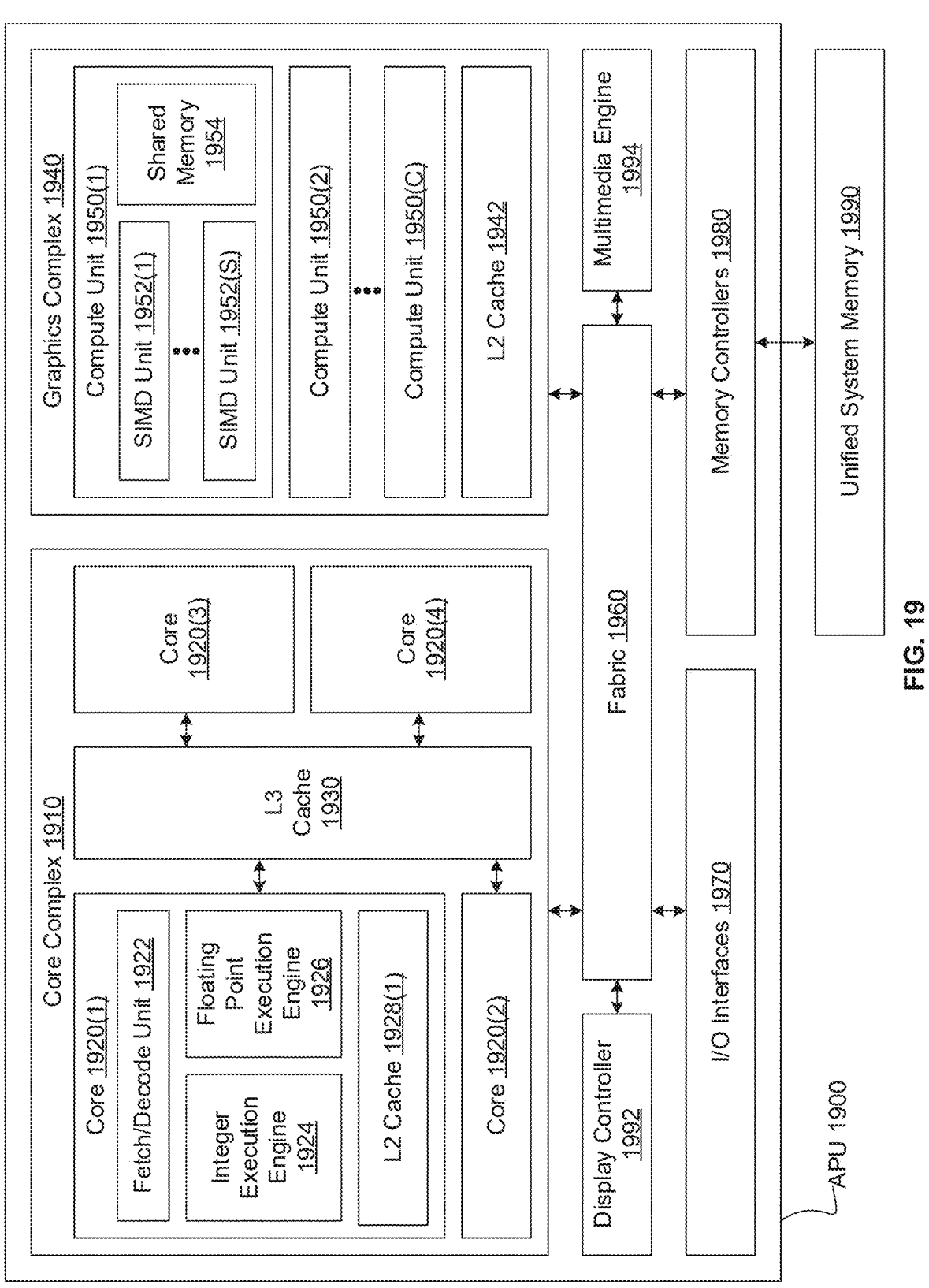
FIG. 19 illustrates an APU, in accordance with at least one embodiment.

FIG. 19 illustrates an accelerated processing unit ("APU") 1900, in accordance with at least one embodiment. In at least one embodiment, APU 1900 is developed by AMD Corporation of Santa Clara, CA. In at least one embodiment, APU 1900 can be configured to execute an application program, such as a CUDA program. In at least one embodiment, APU 1900 can be configured to perform an add external semaphore wait node application program interface (API), as previously described in some detail. In at least one embodiment, APU 1900 includes, without limitation, a core complex 1910, a graphics complex 1940, fabric 1960, I/O interfaces 1970, memory controllers 1980, a display controller 1992, and a multimedia engine 1994. In at least one embodiment, APU 1900 may include, without limitation, any number of core complexes 1910, any number of graphics complexes 1950, any number of display controllers 1992, and any number of multimedia engines 1994 in any combination. For explanatory purposes, multiple instances of like objects are denoted herein with reference numbers identifying the object and parenthetical numbers identifying the instance where needed.

In at least one embodiment, core complex 1910 is a CPU, graphics complex 1940 is a GPU, and APU 1900 is a processing unit that integrates, without limitation, 1910 and 1940 onto a single chip. In at least one embodiment, some tasks may be assigned to core complex 1910 and other tasks may be assigned to graphics complex 1940. In at least one embodiment, core complex 1910 is configured to execute main control software associated with APU 1900, such as an operating system. In at least one embodiment, core complex 1910 is the master processor of APU 1900, controlling and coordinating operations of other processors. In at least one embodiment, core complex 1910 issues commands that control the operation of graphics complex 1940. In at least one embodiment, core complex 1910 can be configured to execute host executable code derived from CUDA source code, and graphics complex 1940 can be configured to execute device executable code derived from CUDA source code.

In at least one embodiment, core complex 1910 includes, without limitation, cores 1920(1)-1920(4) and an L3 cache 1930. In at least one embodiment, core complex 1910 may include, without limitation, any number of cores 1920 and any number and type of caches in any combination. In at least one embodiment, cores 1920 are configured to execute instructions of a particular instruction set architecture ("ISA"). In at least one embodiment, each core 1920 is a CPU core.

In at least one embodiment, each core 1920 includes, without limitation, a fetch/decode unit 1922, an integer execution engine 1924, a floating point execution engine 1926, and an L2 cache 1928. In at least one embodiment, fetch/decode unit 1922 fetches instructions, decodes such instructions, generates micro-operations, and dispatches separate micro-instructions to integer execution engine 1924 and floating point execution engine 1926. In at least one embodiment, fetch/decode unit 1922 can concurrently dispatch one micro-instruction to integer execution engine 1924 and another micro-instruction to floating point execution engine 1926. In at least one embodiment, integer execution engine 1924 executes, without limitation, integer and memory operations. In at least one embodiment, floating point engine 1926 executes, without limitation, floating point and vector operations. In at least one embodiment, fetch-decode unit 1922 dispatches micro-instructions to a single execution engine that replaces both integer execution engine 1924 and floating point execution engine 1926.

In at least one embodiment, each core 1920(i), where i is an integer representing a particular instance of core 1920, may access L2 cache 1928(i) included in core 1920(i). In at least one embodiment, each core 1920 included in core complex 1910(j), where j is an integer representing a particular instance of core complex 1910, is connected to other cores 1920 included in core complex 1910(j) via L3 cache 1930(j) included in core complex 1910(j). In at least one embodiment, cores 1920 included in core complex 1910(j), where j is an integer representing a particular instance of core complex 1910, can access all of L3 cache 1930(j)

included in core complex 1910(j). In at least one embodiment, L3 cache 1930 may include, without limitation, any number of slices.

In at least one embodiment, graphics complex 1940 can be configured to perform compute operations in a highly-parallel fashion. In at least one embodiment, graphics complex 1940 is configured to execute graphics pipeline operations such as draw commands, pixel operations, geometric computations, and other operations associated with rendering an image to a display. In at least one embodiment, graphics complex 1940 is configured to execute operations unrelated to graphics. In at least one embodiment, graphics complex 1940 is configured to execute both operations related to graphics and operations unrelated to graphics.

In at least one embodiment, graphics complex 1940 includes, without limitation, any number of compute units 1950 and an L2 cache 1942. In at least one embodiment, compute units 1950 share L2 cache 1942. In at least one embodiment, L2 cache 1942 is partitioned. In at least one embodiment, graphics complex 1940 includes, without limitation, any number of compute units 1950 and any number (including zero) and type of caches. In at least one embodiment, graphics complex 1940 includes, without limitation, any amount of dedicated graphics hardware.

In at least one embodiment, each compute unit 1950 includes, without limitation, any number of SIMD units 1952 and a shared memory 1954. In at least one embodiment, each SIMD unit 1952 implements a SIMD architecture and is configured to perform operations in parallel. In at least one embodiment, each compute unit 1950 may execute any number of thread blocks, but each thread block executes on a single compute unit 1950. In at least one embodiment, a thread block includes, without limitation, any number of threads of execution. In at least one embodiment, a workgroup is a thread block. In at least one embodiment, each SIMD unit 1952 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 1954.

In at least one embodiment, fabric 1960 is a system interconnect that facilitates data and control transmissions across core complex 1910, graphics complex 1940, I/O interfaces 1970, memory controllers 1980, display controller 1992, and multimedia engine 1994. In at least one embodiment, APU 1900 may include, without limitation, any amount and type of system interconnect in addition to or instead of fabric 1960 that facilitates data and control transmissions across any number and type of directly or indirectly linked components that may be internal or external to APU 1900. In at least one embodiment, I/O interfaces 1970 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 1970. In at least one embodiment, peripheral devices that are coupled to I/O interfaces 1970 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 1994 includes, without limitation, any amount and type of circuitry that is related to multimedia, such as a video decoder, a video encoder, an image signal processor, etc. In at least one embodiment, memory controllers 1980 facilitate data transfers between APU 1900 and a unified system memory 1990. In at least one embodiment, core complex 1910 and graphics complex 1940 share unified system memory 1990.

In at least one embodiment, APU 1900 implements a memory subsystem that includes, without limitation, any amount and type of memory controllers 1980 and memory devices (e.g., shared memory 1954) that may be dedicated to one component or shared among multiple components. In at least one embodiment, APU 1900 implements a cache subsystem that includes, without limitation, one or more cache memories (e.g., L2 caches 2028, L3 cache 1930, and L2 cache 1942) that may each be private to or shared between any number of components (e.g., cores 1920, core complex 1910, SIMD units 1952, compute units 1950, and graphics complex 1940).

Figure 20:
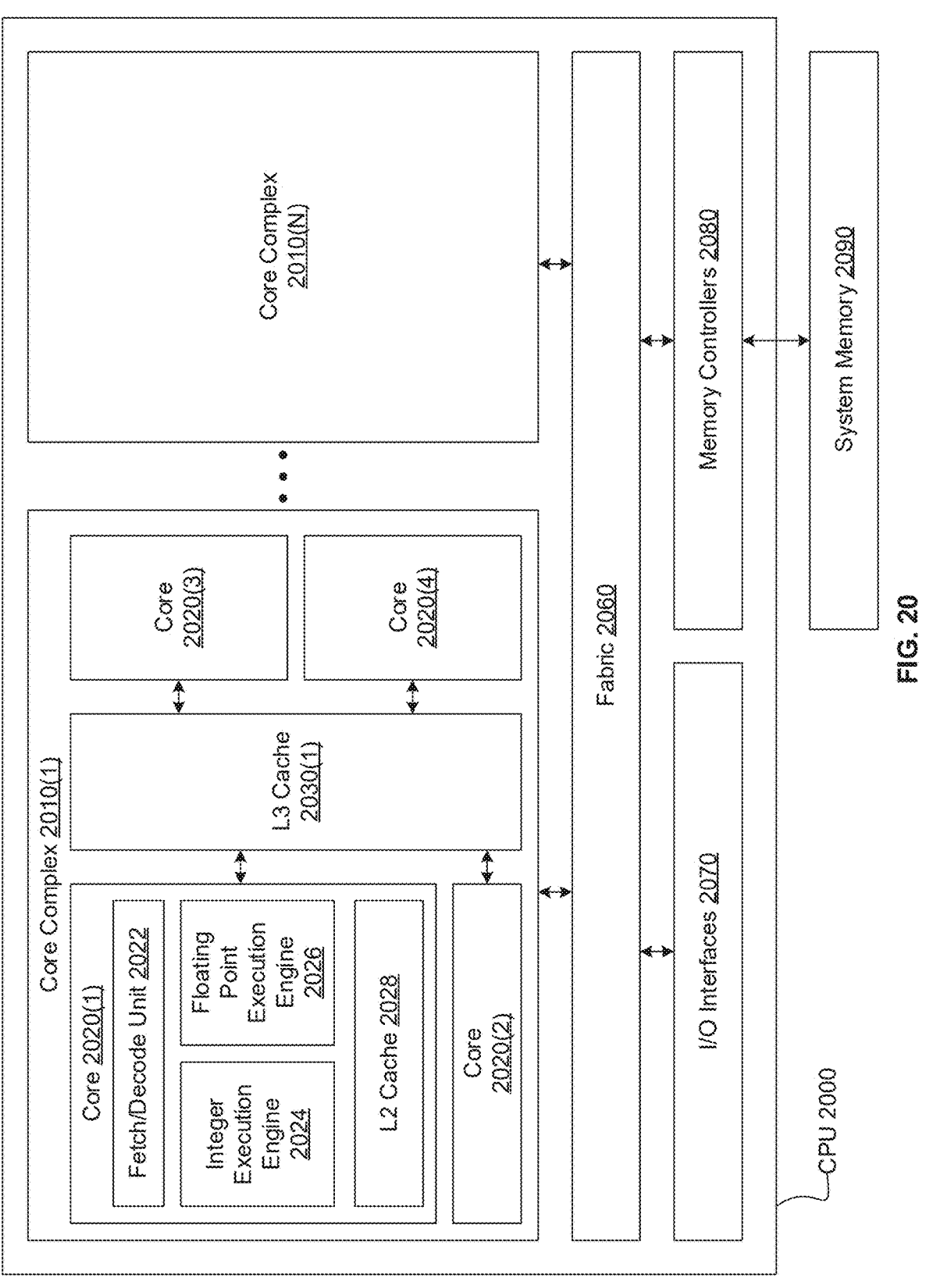
FIG. 20 illustrates a CPU, in accordance with at least one embodiment.

FIG. 20 illustrates a CPU 2000, in accordance with at least one embodiment. In at least one embodiment, CPU 2000 is developed by AMD Corporation of Santa Clara, CA. In at least one embodiment, CPU 2000 can be configured to execute an application program. In at least one embodiment, CPU 2000 is configured to execute main control software, such as an operating system. In at least one embodiment, CPU 2000 issues commands that control the operation of an external GPU (not shown). In at least one embodiment, CPU 2000 can be configured to execute host executable code derived from CUDA source code, and an external GPU can be configured to execute device executable code derived from such CUDA source code. In at least one embodiment, CPU 2000 includes, without limitation, any number of core complexes 2010, fabric 2060, I/O interfaces 2070, and memory controllers 2080.

In at least one embodiment, core complex 2010 includes, without limitation, cores 2020(1)-2020(4) and an L3 cache 2030. In at least one embodiment, core complex 2010 may include, without limitation, any number of cores 2020 and any number and type of caches in any combination. In at least one embodiment, cores 2020 are configured to execute instructions of a particular ISA. In at least one embodiment, each core 2020 is a CPU core.

In at least one embodiment, each core 2020 includes, without limitation, a fetch/decode unit 2022, an integer execution engine 2024, a floating point execution engine 2026, and an L2 cache 2028. In at least one embodiment, fetch/decode unit 2022 fetches instructions, decodes such instructions, generates micro-operations, and dispatches separate micro-instructions to integer execution engine 2024 and floating point execution engine 2026. In at least one embodiment, fetch/decode unit 2022 can concurrently dispatch one micro-instruction to integer execution engine 2024 and another micro-instruction to floating point execution engine 2026. In at least one embodiment, integer execution engine 2024 executes, without limitation, integer and memory operations. In at least one embodiment, floating point engine 2026 executes, without limitation, floating point and vector operations. In at least one embodiment, fetch-decode unit 2022 dispatches micro-instructions to a single execution engine that replaces both integer execution engine 2024 and floating point execution engine 2026.

In at least one embodiment, each core 2020($i$), where i is an integer representing a particular instance of core 2020, may access L2 cache 2028($i$) included in core 2020($i$). In at least one embodiment, each core 2020 included in core complex 2010($j$), where j is an integer representing a particular instance of core complex 2010, is connected to other cores 2020 in core complex 2010($j$) via L3 cache 2030($j$) included in core complex 2010($j$). In at least one embodiment, cores 2020 included in core complex 2010($j$), where j is an integer representing a particular instance of core complex 2010, can access all of L3 cache 2030($j$) included in core complex 2010($j$). In at least one embodiment, L3 cache 2030 may include, without limitation, any number of slices.

In at least one embodiment, fabric 2060 is a system interconnect that facilitates data and control transmissions across core complexes 2010(1)-2010(N) (where N is an integer greater than zero), I/O interfaces 2070, and memory controllers 2080. In at least one embodiment, CPU 2000 may include, without limitation, any amount and type of system interconnect in addition to or instead of fabric 2060 that facilitates data and control transmissions across any number and type of directly or indirectly linked components that may be internal or external to CPU 2000. In at least one embodiment, I/O interfaces 2070 are representative of any number and type of I/O interfaces (e.g., PCI, PCI-X, PCIe, GBE, USB, etc.). In at least one embodiment, various types of peripheral devices are coupled to I/O interfaces 2070 In at least one embodiment, peripheral devices that are coupled to I/O interfaces 2070 may include, without limitation, displays, keyboards, mice, printers, scanners, joysticks or other types of game controllers, media recording devices, external storage devices, network interface cards, and so forth.

In at least one embodiment, memory controllers 2080 facilitate data transfers between CPU 2000 and a system memory 2090. In at least one embodiment, core complex 2010 and graphics complex 2040 share system memory 2090. In at least one embodiment, CPU 2000 implements a memory subsystem that includes, without limitation, any amount and type of memory controllers 2080 and memory devices that may be dedicated to one component or shared among multiple components. In at least one embodiment, CPU 2000 implements a cache subsystem that includes, without limitation, one or more cache memories (e.g., L2 caches 2028 and L3 caches 2030) that may each be private to or shared between any number of components (e.g., cores 2020 and core complexes 2010).

Figure 21:
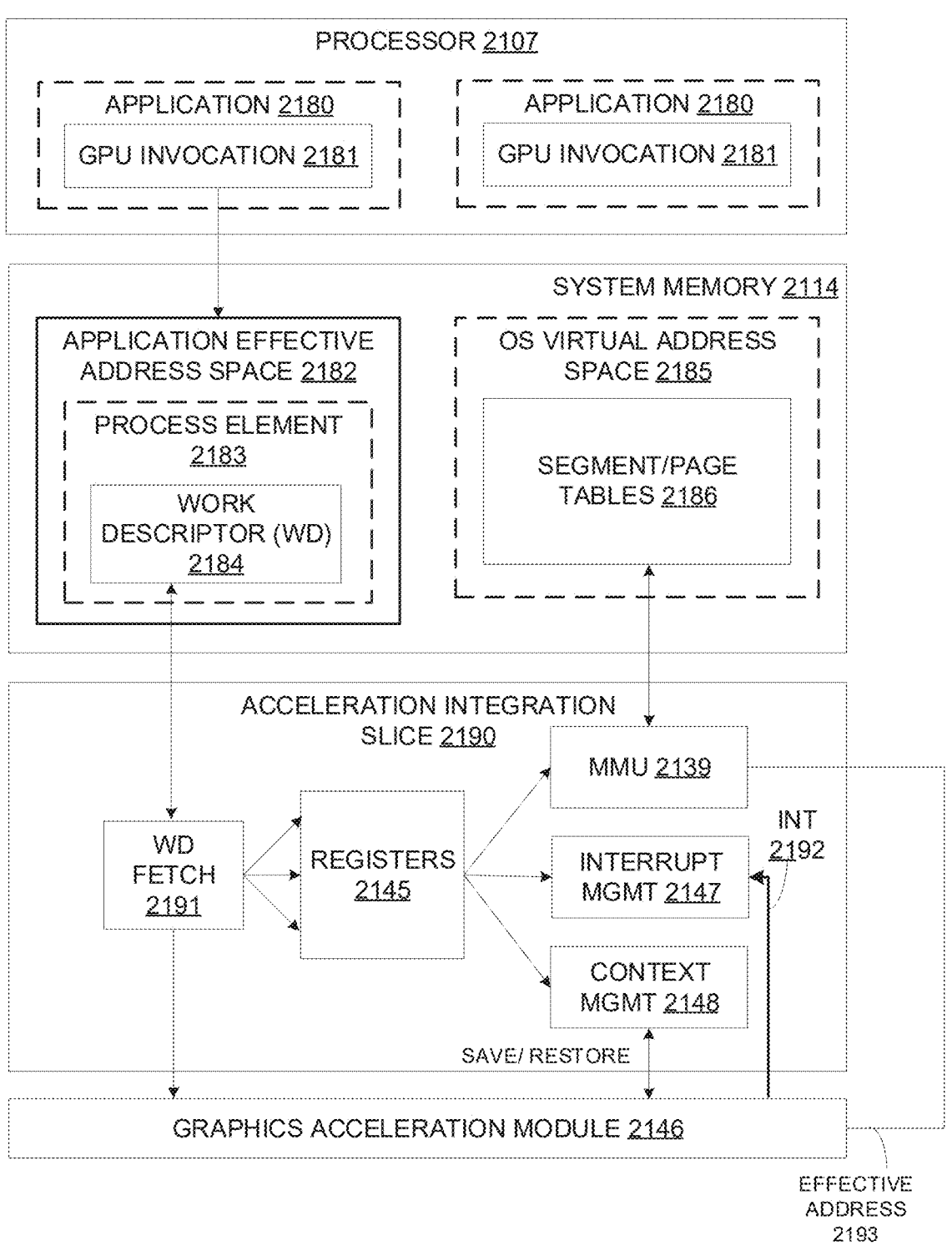
FIG. 21 illustrates an exemplary accelerator integration slice, in accordance with at least one embodiment.

FIG. 21 illustrates an exemplary accelerator integration slice 2190, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 2182 within system memory 2114 stores process elements 2183. In one embodiment, process elements 2183 are stored in response to GPU invocations 2181 from applications 2180 executed on processor 2107. A process element 2183 contains process state for corresponding application 2180. A work descriptor ("WD") 2184 contained in process element 2183 can be a single job requested by an application or may contain a pointer to a queue of jobs. In at least one embodiment, WD 2184 is a pointer to a job request queue in application effective address space 2182.

Graphics acceleration module 2146 and/or individual graphics processing engines can be shared by all or a subset of processes in a system. In at least one embodiment, an infrastructure for setting up process state and sending WD 2184 to graphics acceleration module 2146 to start a job in a virtualized environment may be included.

In at least one embodiment, a dedicated-process programming model is implementation-specific. In this model, a single process owns graphics acceleration module 2146 or an individual graphics processing engine. Because graphics acceleration module 2146 is owned by a single process, a hypervisor initializes an accelerator integration circuit for an owning partition and an operating system initializes accelerator integration circuit for an owning process when graphics acceleration module 2146 is assigned.

In operation, a WD fetch unit 2191 in accelerator integration slice 2190 fetches next WD 2184 which includes an indication of work to be done by one or more graphics processing engines of graphics acceleration module 2146. Data from WD 2184 may be stored in registers 2145 and used by a memory management unit ("MMU") 2139, interrupt management circuit 2147 and/or context management circuit 2148 as illustrated. For example, one embodiment of MMU 2139 includes segment/page walk circuitry for accessing segment/page tables 2186 within OS virtual address space 2185. Interrupt management circuit 2147 may process interrupt events ("INT") 2192 received from graphics acceleration module 2146. When performing graphics operations, an effective address 2193 generated by a graphics processing engine is translated to a real address by MMU 2139.

In one embodiment, a same set of registers 2145 are duplicated for each graphics processing engine and/or graphics acceleration module 2146 and may be initialized by a hypervisor or operating system. Each of these duplicated registers may be included in accelerator integration slice 2190. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2184 is specific to a particular graphics acceleration module 2146 and/or a particular graphics processing engine. It contains all information required by a graphics processing engine to do work or it can be a pointer to a memory location where an application has set up a command queue of work to be completed.

Figure 22A:
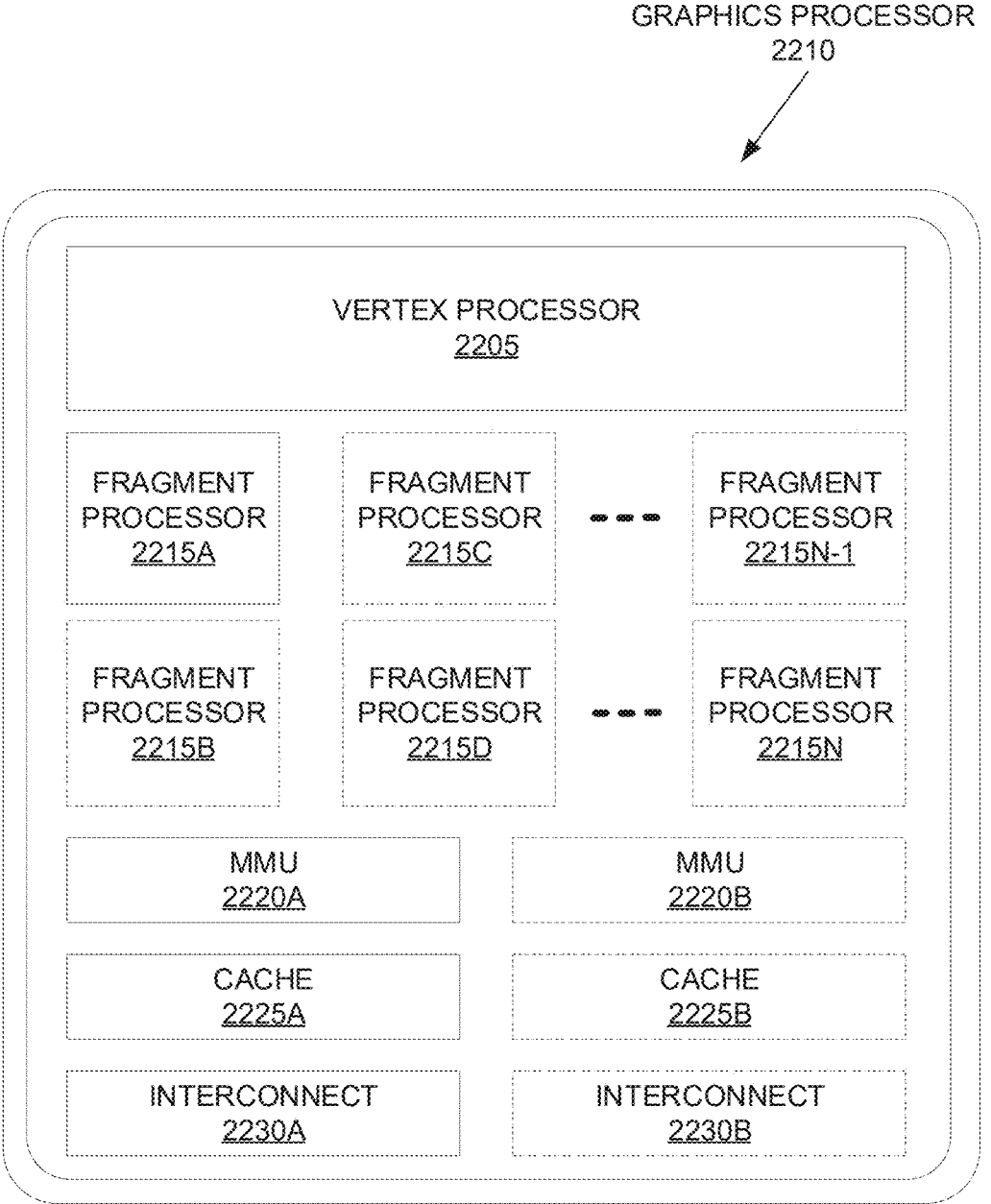
FIGS. 22A-22B illustrate exemplary graphics processors, in accordance with at least one embodiment.
Figure 22B:
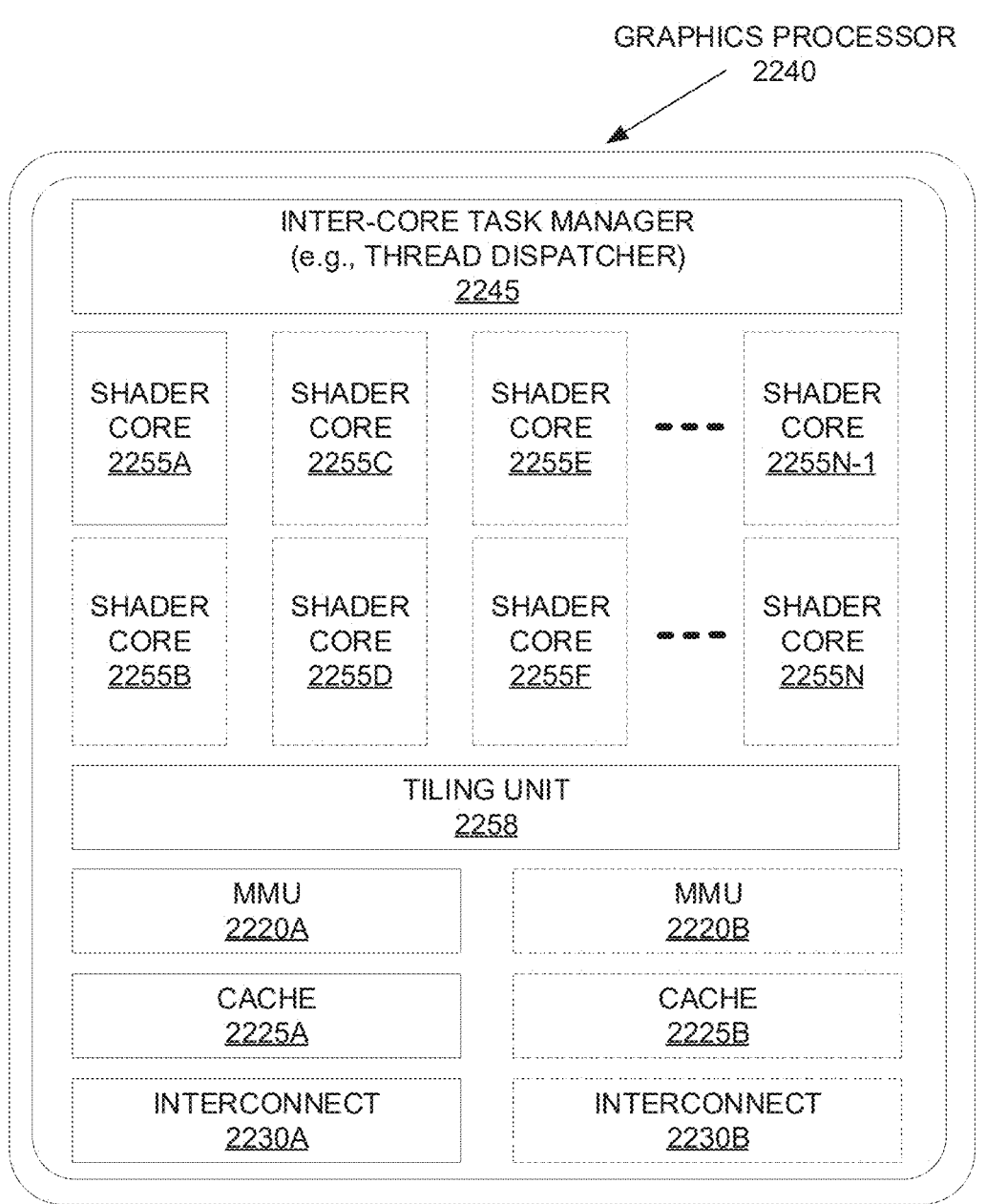

FIGS. 22A-22B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 22A illustrates an exemplary graphics processor 2210 of an SoC integrated circuit that may be fabricated using one or more IP cores, in accordance with at least one embodiment. FIG. 22B illustrates an additional exemplary graphics processor 2240 of an SoC integrated circuit that may be fabricated using one or more IP cores, in accordance with at least one embodiment. In at least one embodiment, graphics processor 2210 of FIG. 22A is a low power graphics processor core. In at least one embodiment, graphics processor 2240 of FIG. 22B is a higher performance graphics processor core. In at least one embodiment, each of graphics processors 2210, 2240 can be variants of graphics processor 1710 of FIG. 17.

In at least one embodiment, graphics processor 2210 includes a vertex processor 2205 and one or more fragment processor(s) 2215A-2215N (e.g., 2215A, 2215B, 2215C, 2215D, through 2215N–1, and 2215N). In at least one embodiment, graphics processor 2210 can execute different shader programs via separate logic, such that vertex processor 2205 is optimized to execute operations for vertex shader programs, while one or more fragment processor(s) 2215A-2215N execute fragment (e.g., pixel) shading operations for fragment or pixel shader programs. In at least one embodiment, vertex processor 2205 performs a vertex processing stage of a 3D graphics pipeline and generates primitives and vertex data. In at least one embodiment, fragment processor(s) 2215A-2215N use primitive and vertex data generated by vertex processor 2205 to produce a framebuffer that is displayed on a display device. In at least one embodiment, fragment processor(s) 2215A-2215N are optimized to execute fragment shader programs as provided for in an OpenGL API, which may be used to perform similar operations as a pixel shader program as provided for in a Direct 3D API.

In at least one embodiment, graphics processor 2210 additionally includes one or more MMU(s) 2220A-2220B, cache(s) 2225A-2225B, and circuit interconnect(s) 2230A-2230B. In at least one embodiment, one or more MMU(s) 2220A-2220B provide for virtual to physical address mapping for graphics processor 2210, including for vertex processor 2205 and/or fragment processor(s) 2215A-2215N, which may reference vertex or image/texture data stored in memory, in addition to vertex or image/texture data stored in one or more cache(s) 2225A-2225B. In at least one embodiment, one or more MMU(s) 2220A-2220B may be synchronized with other MMUs within a system, including one or more MMUs associated with one or more application processor(s) 1705, image processors 1715, and/or video processors 1720 of FIG. 17, such that each processor 1705-1720 can participate in a shared or unified virtual memory system. In at least one embodiment, one or more circuit interconnect(s) 2230A-2230B enable graphics processor 2210 to interface with other IP cores within an SoC, either via an internal bus of the SoC or via a direct connection.

In at least one embodiment, graphics processor 2240 includes one or more MMU(s) 2220A-2220B, caches 2225A-2225B, and circuit interconnects 2230A-2230B of graphics processor 2210 of FIG. 22A. In at least one embodiment, graphics processor 2240 includes one or more shader core(s) 2255A-2255N (e.g., 2255A, 2255B, 2255C, 2255D, 2255E, 2255F, through 2255N−1, and 2255N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2240 includes an inter-core task manager 2245, which acts as a thread dispatcher to dispatch execution threads to one or more shader cores 2255A-2255N and a tiling unit 2258 to accelerate tiling operations for tile-based rendering, in which rendering operations for a scene are subdivided in image space, for example to exploit local spatial coherence within a scene or to optimize use of internal caches.

Figure 23A:
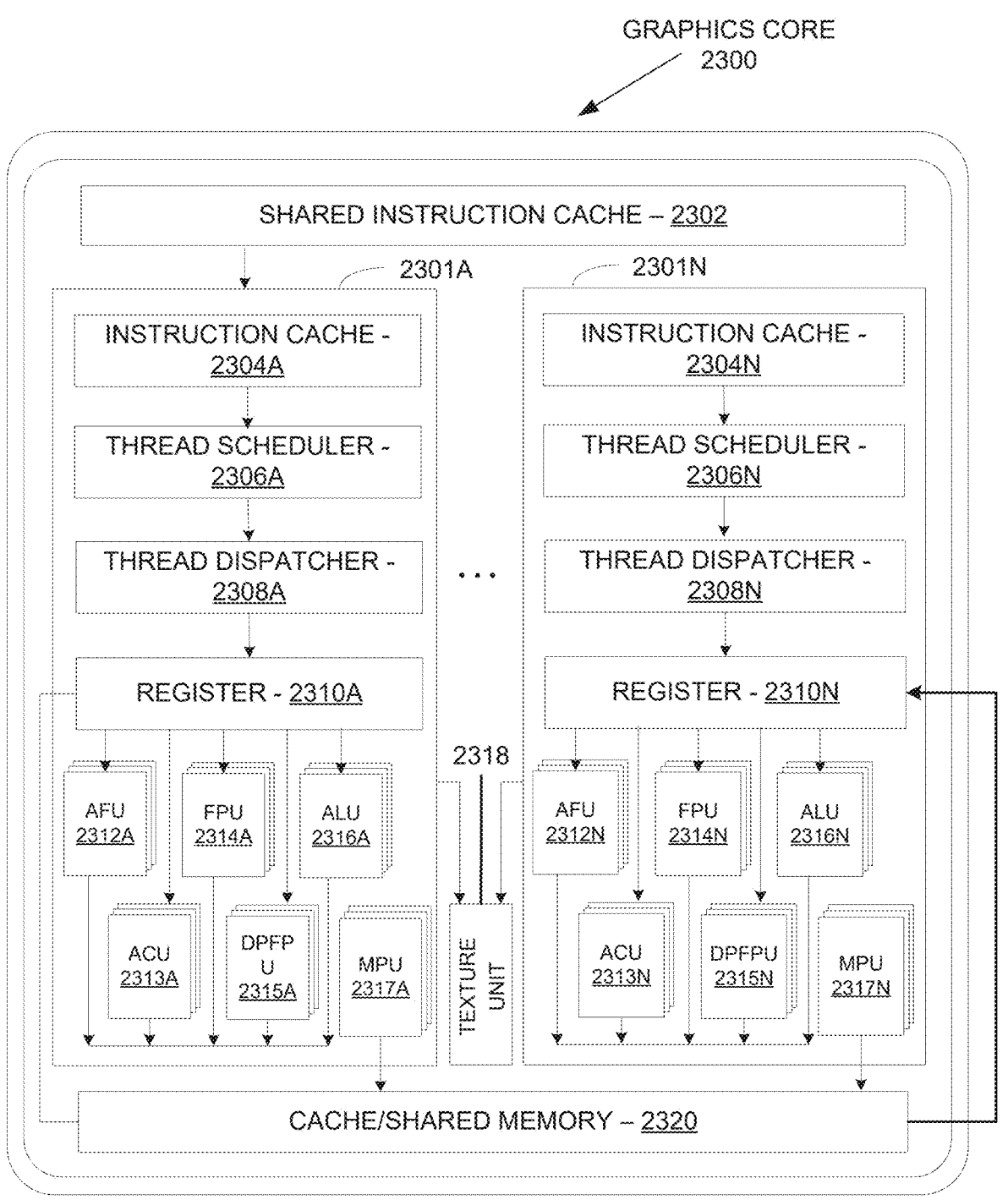
FIG. 23A illustrates a graphics core, in accordance with at least one embodiment.

FIG. 23A illustrates a graphics core 2300, in accordance with at least one embodiment. In at least one embodiment, graphics core 2300 may be included within graphics processor 1710 of FIG. 17. In at least one embodiment, graphics core 2300 may be a unified shader core 2255A-2255N as in FIG. 22B. In at least one embodiment, graphics core 2300 includes a shared instruction cache 2302, a texture unit 2318, and a cache/shared memory 2320 that are common to execution resources within graphics core 2300. In at least one embodiment, graphics core 2300 can include multiple slices 2301A-2301N or partition for each core, and a graphics processor can include multiple instances of graphics core 2300. Slices 2301A-2301N can include support logic including a local instruction cache 2304A-2304N, a thread scheduler 2306A-2306N, a thread dispatcher 2308A-2308N, and a set of registers 2310A-2310N. In at least one embodiment, slices 2301A-2301N can include a set of additional function units ("AFUs") 2312A-2312N, floating-point units ("FPUs") 2314A-2314N, integer arithmetic logic units ("ALUs") 2316-2316N, address computational units ("ACUs") 2313A-2313N, double-precision floating-point units ("DPFPUs") 2315A-2315N, and matrix processing units ("MPUs") 2317A-2317N.

In at least one embodiment, FPUs 2314A-2314N can perform single-precision (32-bit) and half-precision (16-bit) floating point operations, while DPFPUs 2315A-2315N perform double precision (64-bit) floating point operations. In at least one embodiment, ALUs 2316A-2316N can perform variable precision integer operations at 8-bit, 16-bit, and 32-bit precision, and can be configured for mixed precision operations. In at least one embodiment, MPUs 2317A-2317N can also be configured for mixed precision matrix operations, including half-precision floating point and 8-bit integer operations. In at least one embodiment, MPUs 2317-2317N can perform a variety of matrix operations to accelerate CUDA programs, including enabling support for accelerated general matrix to matrix multiplication ("GEMM"). In at least one embodiment, AFUs 2312A-2312N can perform additional logic operations not supported by floating-point or integer units, including trigonometric operations (e.g., Sine, Cosine, etc.).

Figure 23B:
FIG. 23B illustrates a GPGPU, in accordance with at least one embodiment.

FIG. 23B illustrates a general-purpose graphics processing unit ("GPGPU") 2330, in accordance with at least one embodiment. In at least one embodiment, GPGPU 2330 is highly-parallel and suitable for deployment on a multi-chip module. In at least one embodiment, GPGPU 2330 can be configured to enable highly-parallel compute operations to be performed by an array of GPUs. In at least one embodiment, GPGPU 2330 can be linked directly to other instances of GPGPU 2330 to create a multi-GPU cluster to improve execution time for CUDA programs. In at least one embodiment, GPGPU 2330 includes a host interface 2332 to enable a connection with a host processor. In at least one embodiment, host interface 2332 is a PCIe interface. In at least one embodiment, host interface 2332 can be a vendor specific communications interface or communications fabric. In at least one embodiment, GPGPU 2330 receives commands from a host processor and uses a global scheduler 2334 to distribute execution threads associated with those commands to a set of compute clusters 2336A-2336H. In at least one embodiment, compute clusters 2336A-2336H share a cache memory 2338. In at least one embodiment, cache memory 2338 can serve as a higher-level cache for cache memories within compute clusters 2336A-2336H.

In at least one embodiment, GPGPU 2330 includes memory 2344A-2344B coupled with compute clusters 2336A-2336H via a set of memory controllers 2342A-2342B. In at least one embodiment, memory 2344A-2344B can include various types of memory devices including DRAM or graphics random access memory, such as synchronous graphics random access memory ("SGRAM"), including graphics double data rate ("GDDR") memory.

In at least one embodiment, compute clusters 2336A-2336H each include a set of graphics cores, such as graphics core 2300 of FIG. 23A, which can include multiple types of integer and floating point logic units that can perform computational operations at a range of precisions including suited for computations associated with CUDA programs. For example, in at least one embodiment, at least a subset of floating point units in each of compute clusters 2336A-2336H can be configured to perform 16-bit or 32-bit floating point operations, while a different subset of floating point units can be configured to perform 64-bit floating point operations.

In at least one embodiment, multiple instances of GPGPU 2330 can be configured to operate as a compute cluster. Compute clusters 2336A-2336H may implement any technically feasible communication techniques for synchronization and data exchange. In at least one embodiment, multiple instances of GPGPU 2330 communicate over host interface 2332. In at least one embodiment, GPGPU 2330 includes an I/O hub 2339 that couples GPGPU 2330 with a GPU link 2340 that enables a direct connection to other instances of GPGPU 2330. In at least one embodiment, GPU link 2340 is coupled to a dedicated GPU-to-GPU bridge that enables communication and synchronization between multiple instances of GPGPU 2330. In at least one embodiment GPU link 2340 couples with a high speed interconnect to transmit and receive data to other GPGPUs 2330 or parallel processors. In at least one embodiment, multiple instances of GPGPU 2330 are located in separate data processing systems and communicate via a network device that is accessible via host interface 2332. In at least one embodiment GPU link 2340 can be configured to enable a connection to a host processor in addition to or as an alternative to host interface 2332. In at least one embodiment, GPGPU 2330 can be configured to execute a CUDA program.

Figure 24A:
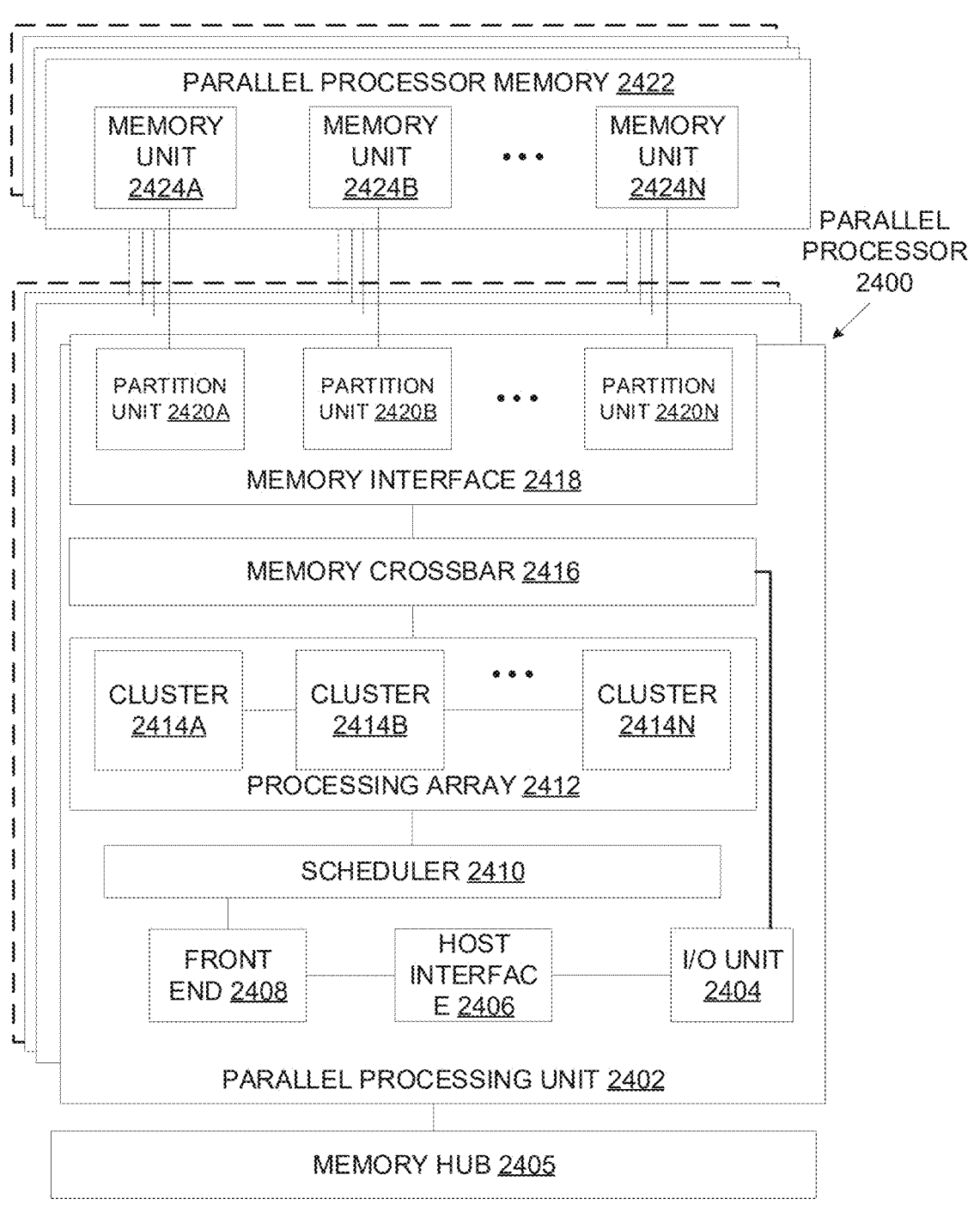
FIG. 24A illustrates a parallel processor, in accordance with at least one embodiment.

FIG. 24A illustrates a parallel processor 2400, in accordance with at least one embodiment. In at least one embodiment, various components of parallel processor 2400 may be implemented using one or more integrated circuit devices, such as programmable processors, application specific integrated circuits ("ASICs"), or FPGAs.

In at least one embodiment, parallel processor 2400 includes a parallel processing unit 2402. In at least one embodiment, parallel processing unit 2402 includes an I/O unit 2404 that enables communication with other devices, including other instances of parallel processing unit 2402. In at least one embodiment, I/O unit 2404 may be directly connected to other devices. In at least one embodiment, I/O unit 2404 connects with other devices via use of a hub or switch interface, such as memory hub 2405. In at least one embodiment, connections between memory hub 2405 and I/O unit 2404 form a communication link. In at least one embodiment, I/O unit 2404 connects with a host interface 2406 and a memory crossbar 2416, where host interface 2406 receives commands directed to performing processing operations and memory crossbar 2416 receives commands directed to performing memory operations.

In at least one embodiment, when host interface 2406 receives a command buffer via I/O unit 2404, host interface 2406 can direct work operations to perform those commands to a front end 2408. In at least one embodiment, front end 2408 couples with a scheduler 2410, which is configured to distribute commands or other work items to a processing array 2412. In at least one embodiment, scheduler 2410 ensures that processing array 2412 is properly configured and in a valid state before tasks are distributed to processing array 2412. In at least one embodiment, scheduler 2410 is implemented via firmware logic executing on a microcontroller. In at least one embodiment, microcontroller implemented scheduler 2410 is configurable to perform complex scheduling and work distribution operations at coarse and fine granularity, enabling rapid preemption and context switching of threads executing on processing array 2412. In at least one embodiment, host software can prove workloads for scheduling on processing array 2412 via one of multiple graphics processing doorbells. In at least one embodiment, workloads can then be automatically distributed across processing array 2412 by scheduler 2410 logic within a microcontroller including scheduler 2410.

In at least one embodiment, processing array 2412 can include up to "N" clusters (e.g., cluster 2414A, cluster 2414B, through cluster 2414N). In at least one embodiment, each cluster 2414A-2414N of processing array 2412 can execute a large number of concurrent threads. In at least one embodiment, scheduler 2410 can allocate work to clusters 2414A-2414N of processing array 2412 using various scheduling and/or work distribution algorithms, which may vary depending on the workload arising for each type of program or computation. In at least one embodiment, scheduling can be handled dynamically by scheduler 2410, or can be assisted in part by compiler logic during compilation of program logic configured for execution by processing array 2412. In at least one embodiment, different clusters 2414A-

2414N of processing array 2412 can be allocated for processing different types of programs or for performing different types of computations.

In at least one embodiment, processing array 2412 can be configured to perform various types of parallel processing operations. In at least one embodiment, processing array 2412 is configured to perform general-purpose parallel compute operations. For example, in at least one embodiment, processing array 2412 can include logic to execute processing tasks including filtering of video and/or audio data, performing modeling operations, including physics operations, and performing data transformations.

In at least one embodiment, processing array 2412 is configured to perform parallel graphics processing operations. In at least one embodiment, processing array 2412 can include additional logic to support execution of such graphics processing operations, including, but not limited to texture sampling logic to perform texture operations, as well as tessellation logic and other vertex processing logic. In at least one embodiment, processing array 2412 can be configured to execute graphics processing related shader programs such as, but not limited to vertex shaders, tessellation shaders, geometry shaders, and pixel shaders. In at least one embodiment, parallel processing unit 2402 can transfer data from system memory via I/O unit 2404 for processing. In at least one embodiment, during processing, transferred data can be stored to on-chip memory (e.g., a parallel processor memory 2422) during processing, then written back to system memory.

In at least one embodiment, when parallel processing unit 2402 is used to perform graphics processing, scheduler 2410 can be configured to divide a processing workload into approximately equal sized tasks, to better enable distribution of graphics processing operations to multiple clusters 2414A-2414N of processing array 2412. In at least one embodiment, portions of processing array 2412 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2414A-2414N may be stored in buffers to allow intermediate data to be transmitted between clusters 2414A-2414N for further processing.

In at least one embodiment, processing array 2412 can receive processing tasks to be executed via scheduler 2410, which receives commands defining processing tasks from front end 2408. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2410 may be configured to fetch indices corresponding to tasks or may receive indices from front end 2408. In at least one embodiment, front end 2408 can be configured to ensure processing array 2412 is configured to a valid state before a workload specified by incoming command buffers (e.g., batch-buffers, push buffers, etc.) is initiated.

In at least one embodiment, each of one or more instances of parallel processing unit 2402 can couple with parallel processor memory 2422. In at least one embodiment, parallel processor memory 2422 can be accessed via memory crossbar 2416, which can receive memory requests from processing array 2412 as well as I/O unit 2404. In at least one embodiment, memory crossbar 2416 can access parallel processor memory 2422 via a memory interface 2418. In at least one embodiment, memory interface 2418 can include multiple partition units (e.g., a partition unit 2420A, partition unit 2420B, through partition unit 2420N) that can each couple to a portion (e.g., memory unit) of parallel processor memory 2422. In at least one embodiment, a number of partition units 2420A-2420N is configured to be equal to a number of memory units, such that a first partition unit 2420A has a corresponding first memory unit 2424A, a second partition unit 2420B has a corresponding memory unit 2424B, and an Nth partition unit 2420N has a corresponding Nth memory unit 2424N. In at least one embodiment, a number of partition units 2420A-2420N may not be equal to a number of memory devices.

In at least one embodiment, memory units 2424A-2424N can include various types of memory devices, including DRAM or graphics random access memory, such as SGRAM, including GDDR memory. In at least one embodiment, memory units 2424A-2424N may also include 3D stacked memory, including but not limited to high bandwidth memory ("HBM"). In at least one embodiment, render targets, such as frame buffers or texture maps may be stored across memory units 2424A-2424N, allowing partition units 2420A-2420N to write portions of each render target in parallel to efficiently use available bandwidth of parallel processor memory 2422. In at least one embodiment, a local instance of parallel processor memory 2422 may be excluded in favor of a unified memory design that utilizes system memory in conjunction with local cache memory.

In at least one embodiment, any one of clusters 2414A-2414N of processing array 2412 can process data that will be written to any of memory units 2424A-2424N within parallel processor memory 2422. In at least one embodiment, memory crossbar 2416 can be configured to transfer an output of each cluster 2414A-2414N to any partition unit 2420A-2420N or to another cluster 2414A-2414N, which can perform additional processing operations on an output. In at least one embodiment, each cluster 2414A-2414N can communicate with memory interface 2418 through memory crossbar 2416 to read from or write to various external memory devices. In at least one embodiment, memory crossbar 2416 has a connection to memory interface 2418 to communicate with I/O unit 2404, as well as a connection to a local instance of parallel processor memory 2422, enabling processing units within different clusters 2414A-2414N to communicate with system memory or other memory that is not local to parallel processing unit 2402. In at least one embodiment, memory crossbar 2416 can use virtual channels to separate traffic streams between clusters 2414A-2414N and partition units 2420A-2420N.

In at least one embodiment, multiple instances of parallel processing unit 2402 can be provided on a single add-in card, or multiple add-in cards can be interconnected. In at least one embodiment, different instances of parallel processing unit 2402 can be configured to inter-operate even if different instances have different numbers of processing cores, different amounts of local parallel processor memory, and/or other configuration differences. For example, in at least one embodiment, some instances of parallel processing unit 2402 can include higher precision floating point units relative to other instances. In at least one embodiment, systems incorporating one or more instances of parallel processing unit 2402 or parallel processor 2400 can be implemented in a variety of configurations and form factors, including but not limited to desktop, laptop, or handheld personal computers, servers, workstations, game consoles, and/or embedded systems.

Figure 24B:
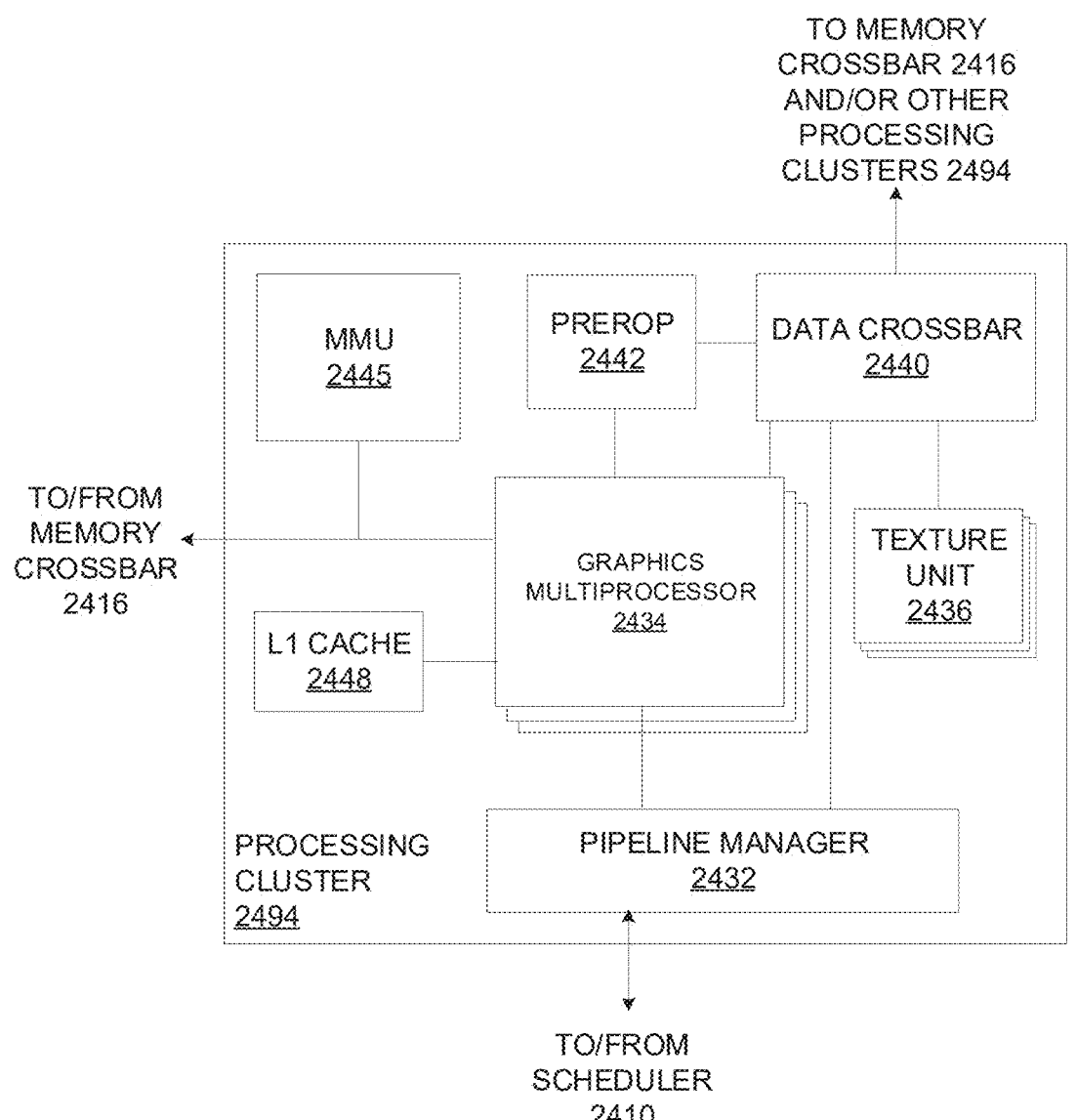
FIG. 24B illustrates a processing cluster, in accordance with at least one embodiment.

FIG. 24B illustrates a processing cluster 2494, in accordance with at least one embodiment. In at least one embodiment, processing cluster 2494 is included within a parallel processing unit. In at least one embodiment, processing cluster 2494 is one of processing clusters 2414A-2414N of FIG. 24. In at least one embodiment, processing cluster 2494 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2494.

In at least one embodiment, operation of processing cluster 2494 can be controlled via a pipeline manager 2432 that distributes processing tasks to SIMT parallel processors. In at least one embodiment, pipeline manager 2432 receives instructions from scheduler 2410 of FIG. 24 and manages execution of those instructions via a graphics multiprocessor 2434 and/or a texture unit 2436. In at least one embodiment, graphics multiprocessor 2434 is an exemplary instance of a SIMT parallel processor. However, in at least one embodiment, various types of SIMT parallel processors of differing architectures may be included within processing cluster 2494. In at least one embodiment, one or more instances of graphics multiprocessor 2434 can be included within processing cluster 2494. In at least one embodiment, graphics multiprocessor 2434 can process data and a data crossbar 2440 can be used to distribute processed data to one of multiple possible destinations, including other shader units. In at least one embodiment, pipeline manager 2432 can facilitate distribution of processed data by specifying destinations for processed data to be distributed via data crossbar 2440.

In at least one embodiment, each graphics multiprocessor 2434 within processing cluster 2494 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2494 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2434. In at least one embodiment, a thread group may include fewer threads than a number of processing engines within graphics multiprocessor 2434. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2434. In at least one embodiment, when a thread group includes more threads than the number of processing engines within graphics multiprocessor 2434, processing can be performed over consecutive clock cycles. In at least one embodiment, multiple thread groups can be executed concurrently on graphics multiprocessor 2434.

In at least one embodiment, graphics multiprocessor 2434 includes an internal cache memory to perform load and store operations. In at least one embodiment, graphics multiprocessor 2434 can forego an internal cache and use a cache memory (e.g., L1 cache 2448) within processing cluster 2494. In at least one embodiment, each graphics multiprocessor 2434 also has access to Level 2 ("L2") caches within partition units (e.g., partition units 2420A-2420N of FIG. 24A) that are shared among all processing clusters 2494 and may be used to transfer data between threads. In at least one embodiment, graphics multiprocessor 2434 may also access off-chip global memory, which can include one or more of local parallel processor memory and/or system memory. In at least one embodiment, any memory external to parallel processing unit 2402 may be used as global memory. In at least one embodiment, processing cluster 2494 includes multiple instances of graphics multiprocessor 2434 that can share common instructions and data, which may be stored in L1 cache 2448.

In at least one embodiment, each processing cluster 2494 may include an MMU 2445 that is configured to map virtual addresses into physical addresses. In at least one embodiment, one or more instances of MMU 2445 may reside within memory interface 2418 of FIG. 24. In at least one embodiment, MMU 2445 includes a set of page table entries ("PTEs") used to map a virtual address to a physical address of a tile and optionally a cache line index. In at least one embodiment, MMU 2445 may include address translation lookaside buffers ("TLBs") or caches that may reside within graphics multiprocessor 2434 or L1 cache 2448 or processing cluster 2494. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2494 may be configured such that each graphics multiprocessor 2434 is coupled to a texture unit 2436 for performing texture mapping operations, e.g., determining texture sample positions, reading texture data, and filtering texture data. In at least one embodiment, texture data is read from an internal texture L1 cache (not shown) or from an L1 cache within graphics multiprocessor 2434 and is fetched from an L2 cache, local parallel processor memory, or system memory, as needed. In at least one embodiment, each graphics multiprocessor 2434 outputs a processed task to data crossbar 2440 to provide the processed task to another processing cluster 2494 for further processing or to store the processed task in an L2 cache, a local parallel processor memory, or a system memory via memory crossbar 2416. In at least one embodiment, a pre-raster operations unit ("preROP") 2442 is configured to receive data from graphics multiprocessor 2434, direct data to ROP units, which may be located with partition units as described herein (e.g., partition units

2420A-2420N of FIG. 24). In at least one embodiment, PreROP 2442 can perform optimizations for color blending, organize pixel color data, and perform address translations.

Figure 24C:
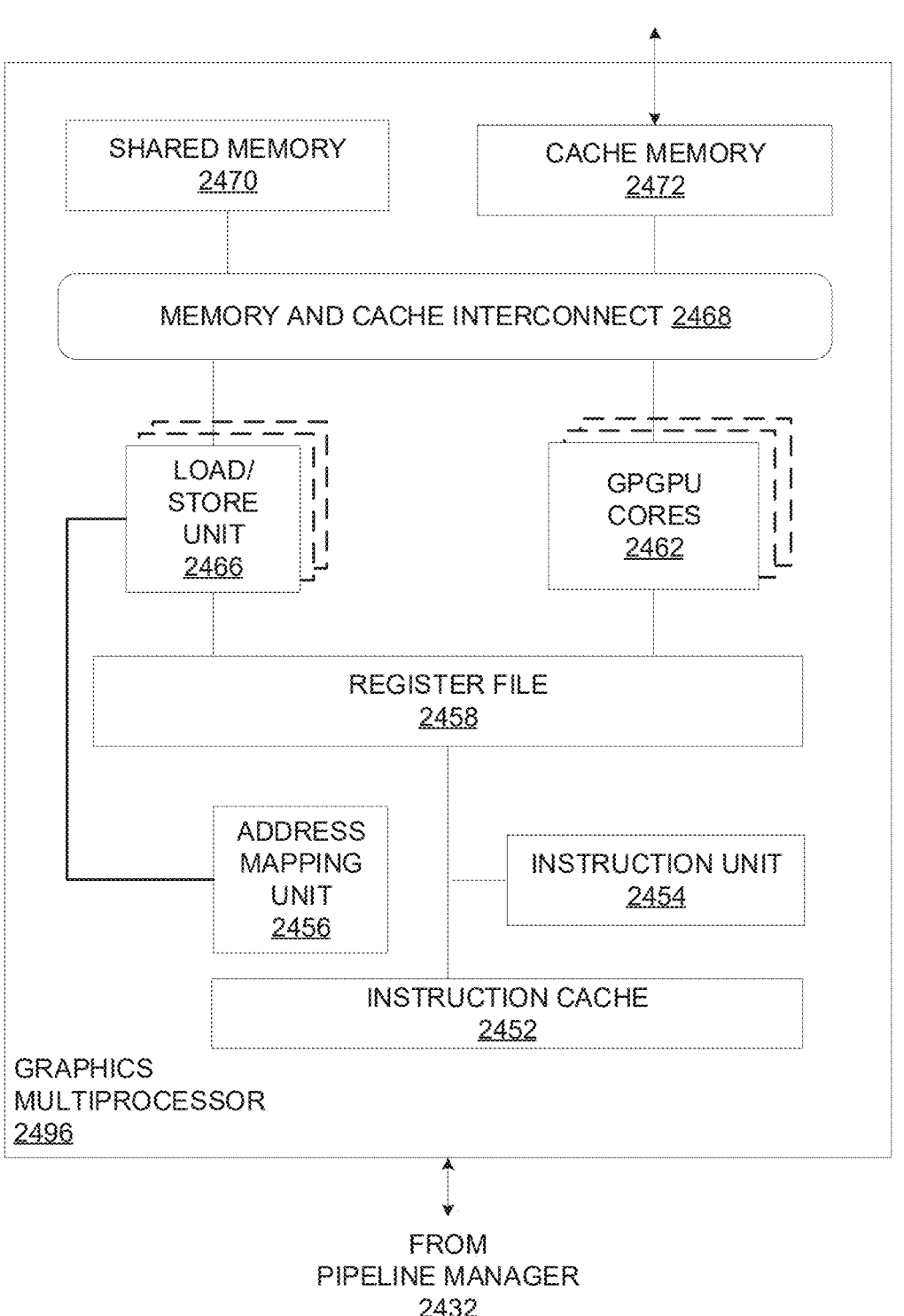
FIG. 24C illustrates a graphics multiprocessor, in accordance with at least one embodiment.

FIG. 24C illustrates a graphics multiprocessor 2496, in accordance with at least one embodiment. In at least one embodiment, graphics multiprocessor 2496 is graphics multiprocessor 2434 of FIG. 24B. In at least one embodiment, graphics multiprocessor 2496 couples with pipeline manager 2432 of processing cluster 2494. In at least one embodiment, graphics multiprocessor 2496 has an execution pipeline including but not limited to an instruction cache 2452, an instruction unit 2454, an address mapping unit 2456, a register file 2458, one or more GPGPU cores 2462, and one or more LSUs 2466. GPGPU cores 2462 and LSUs 2466 are coupled with cache memory 2472 and shared memory 2470 via a memory and cache interconnect 2468.

In at least one embodiment, instruction cache 2452 receives a stream of instructions to execute from pipeline manager 2432. In at least one embodiment, instructions are cached in instruction cache 2452 and dispatched for execution by instruction unit 2454. In at least one embodiment, instruction unit 2454 can dispatch instructions as thread groups (e.g., warps), with each thread of a thread group assigned to a different execution unit within GPGPU core 2462. In at least one embodiment, an instruction can access any of a local, shared, or global address space by specifying an address within a unified address space. In at least one embodiment, address mapping unit 2456 can be used to translate addresses in a unified address space into a distinct memory address that can be accessed by LSUs 2466.

In at least one embodiment, register file 2458 provides a set of registers for functional units of graphics multiprocessor 2496. In at least one embodiment, register file 2458 provides temporary storage for operands connected to data paths of functional units (e.g., GPGPU cores 2462, LSUs 2466) of graphics multiprocessor 2496. In at least one embodiment, register file 2458 is divided between each of functional units such that each functional unit is allocated a dedicated portion of register file 2458. In at least one embodiment, register file 2458 is divided between different thread groups being executed by graphics multiprocessor 2496.

In at least one embodiment, GPGPU cores 2462 can each include FPUs and/or integer ALUs that are used to execute instructions of graphics multiprocessor 2496. GPGPU cores 2462 can be similar in architecture or can differ in architecture. In at least one embodiment, a first portion of GPGPU cores 2462 include a single precision FPU and an integer ALU while a second portion of GPGPU cores 2462 include a double precision FPU. In at least one embodiment, FPUs can implement IEEE 754-2008 standard for floating point arithmetic or enable variable precision floating point arithmetic. In at least one embodiment, graphics multiprocessor 2496 can additionally include one or more fixed function or special function units to perform specific functions such as copy rectangle or pixel blending operations. In at least one embodiment one or more of GPGPU cores 2462 can also include fixed or special function logic.

In at least one embodiment, GPGPU cores 2462 include SIMD logic capable of performing a single instruction on multiple sets of data. In at least one embodiment GPGPU cores 2462 can physically execute SIMD4, SIMD8, and SIMD16 instructions and logically execute SIMD1, SIMD2, and SIMD32 instructions. In at least one embodiment, SIMD instructions for GPGPU cores 2462 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2468 is an interconnect network that connects each functional unit of graphics multiprocessor 2496 to register file 2458 and to shared memory 2470. In at least one embodiment, memory and cache interconnect 2468 is a crossbar interconnect that allows LSU 2466 to implement load and store operations between shared memory 2470 and register file 2458. In at least one embodiment, register file 2458 can operate at a same frequency as GPGPU cores 2462, thus data transfer between GPGPU cores 2462 and register file 2458 is very low latency. In at least one embodiment, shared memory 2470 can be used to enable communication between threads that execute on functional units within graphics multiprocessor 2496. In at least one embodiment, cache memory 2472 can be used as a data cache for example, to cache texture data communicated between functional units and texture unit 2436. In at least one embodiment, shared memory 2470 can also be used as a program managed cached. In at least one embodiment, threads executing on GPGPU cores 2462 can programmatically store data within shared memory in addition to automatically cached data that is stored within cache memory 2472.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 25:
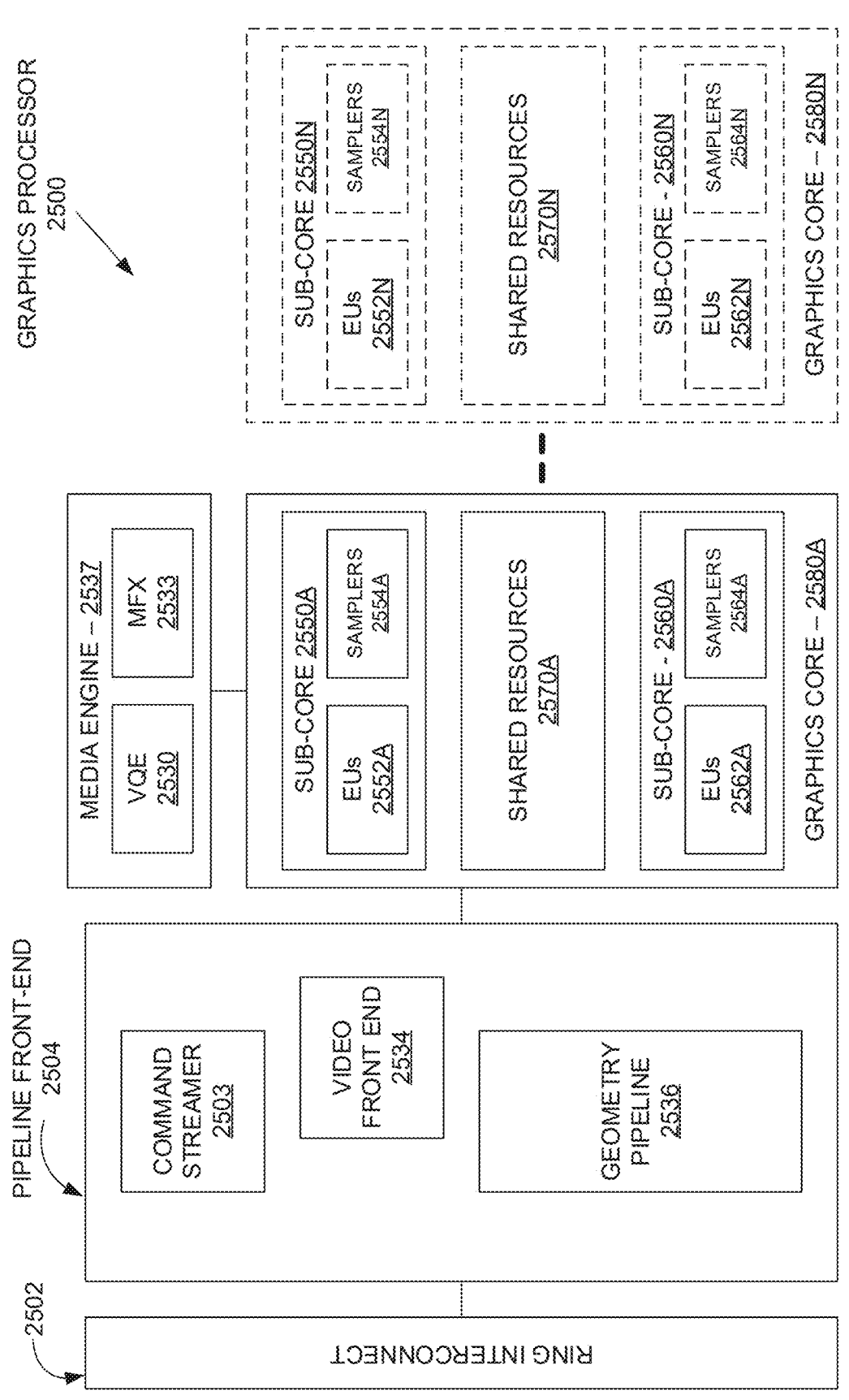
FIG. 25 illustrates a graphics processor, in accordance with at least one embodiment.

FIG. 25 illustrates a graphics processor 2500, in accordance with at least one embodiment. In at least one embodiment, graphics processor 2500 includes a ring interconnect 2502, a pipeline front-end 2504, a media engine 2537, and graphics cores 2580A-2580N. In at least one embodiment, ring interconnect 2502 couples graphics processor 2500 to other processing units, including other graphics processors or one or more general-purpose processor cores. In at least one embodiment, graphics processor 2500 is one of many processors integrated within a multi-core processing system.

In at least one embodiment, graphics processor 2500 receives batches of commands via ring interconnect 2502. In at least one embodiment, incoming commands are interpreted by a command streamer 2503 in pipeline front-end 2504. In at least one embodiment, graphics processor 2500 includes scalable execution logic to perform 3D geometry processing and media processing via graphics core(s) 2580A-2580N. In at least one embodiment, for 3D geometry processing commands, command streamer 2503 supplies commands to geometry pipeline 2536. In at least one embodiment, for at least some media processing commands, command streamer 2503 supplies commands to a video front end 2534, which couples with a media engine 2537. In at least one embodiment, media engine 2537 includes a Video Quality Engine ("VQE") 2530 for video and image post-processing and a multi-format encode/decode ("MFX") engine 2533 to provide hardware-accelerated media data encode and decode. In at least one embodiment, geometry pipeline 2536 and media engine 2537 each generate execution threads for thread execution resources provided by at least one graphics core 2580A.

In at least one embodiment, graphics processor 2500 includes scalable thread execution resources featuring modular graphics cores 2580A-2580N (sometimes referred to as core slices), each having multiple sub-cores 2550A-550N, 2560A-2560N (sometimes referred to as core sub-slices). In at least one embodiment, graphics processor 2500 can have any number of graphics cores 2580A through 2580N. In at least one embodiment, graphics processor 2500 includes a graphics core 2580A having at least a first sub-core 2550A and a second sub-core 2560A. In at least one embodiment, graphics processor 2500 is a low power processor with a single sub-core (e.g., sub-core 2550A). In at least one embodiment, graphics processor 2500 includes multiple graphics cores 2580A-2580N, each including a set of first sub-cores 2550A-2550N and a set of second sub-cores 2560A-2560N. In at least one embodiment, each sub-core in first sub-cores 2550A-2550N includes at least a first set of execution units ("EUs") 2552A-2552N and media/texture samplers 2554A-2554N. In at least one embodiment, each sub-core in second sub-cores 2560A-2560N includes at least a second set of execution units 2562A-2562N and samplers 2564A-2564N. In at least one embodiment, each sub-core 2550A-2550N, 2560A-2560N shares a set of shared resources 2570A-2570N. In at least one embodiment, shared resources 2570 include shared cache memory and pixel operation logic.

Figure 26:
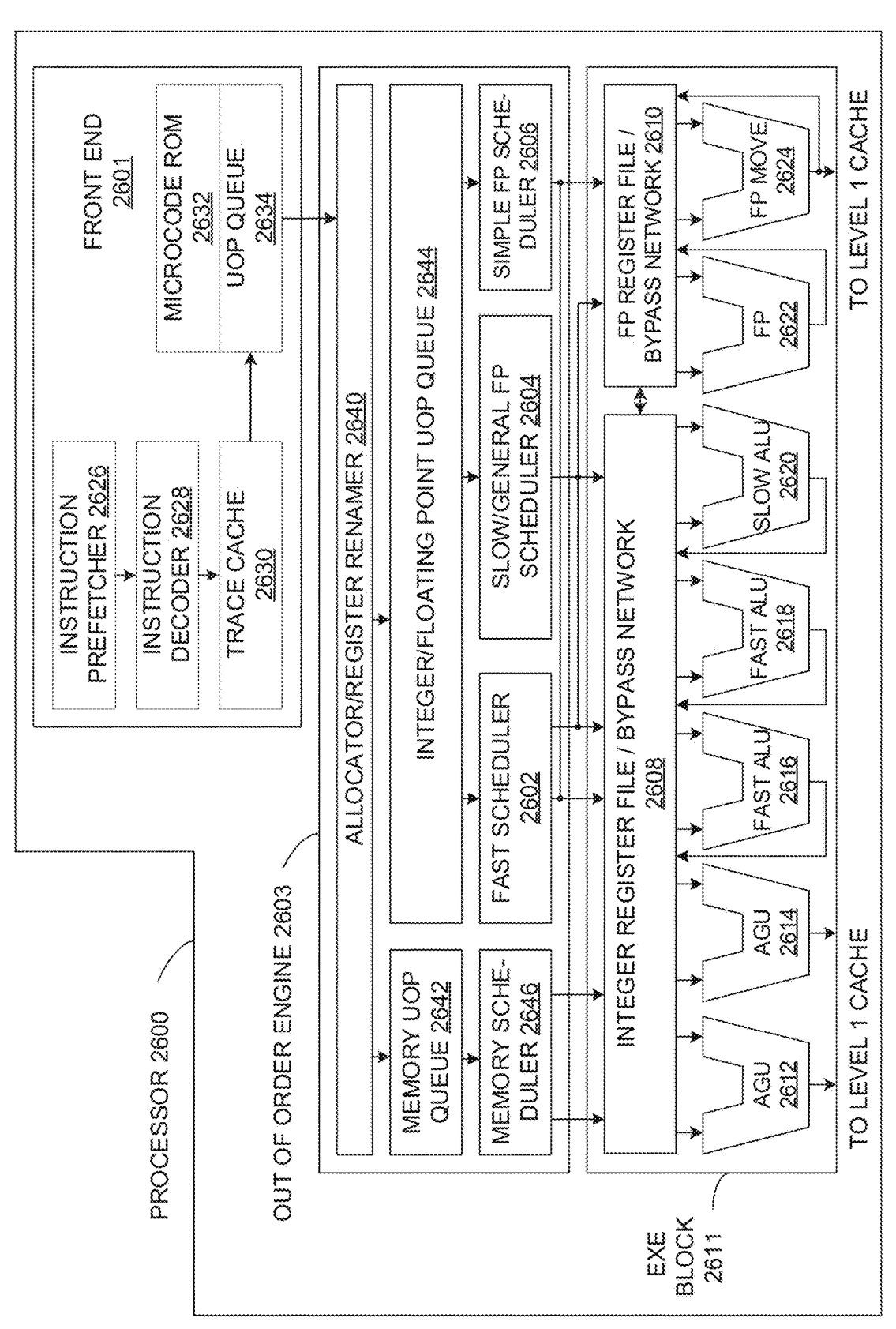
FIG. 26 illustrates a processor, in accordance with at least one embodiment.

FIG. 26 illustrates a processor 2600, in accordance with at least one embodiment. In at least one embodiment, processor 2600 may include, without limitation, logic circuits to perform instructions. In at least one embodiment, processor 2600 may perform instructions, including x86 instructions, ARM instructions, specialized instructions for ASICs, etc. In at least one embodiment, processor 2610 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2610 may perform instructions to accelerate CUDA programs.

In at least one embodiment, processor 2600 includes an in-order front end ("front end") 2601 to fetch instructions to be executed and prepare instructions to be used later in processor pipeline. In at least one embodiment, front end 2601 may include several units. In at least one embodiment, an instruction prefetcher 2626 fetches instructions from memory and feeds instructions to an instruction decoder 2628 which in turn decodes or interprets instructions. For example, in at least one embodiment, instruction decoder 2628 decodes a received instruction into one or more operations called "micro-instructions" or "micro-operations" (also called "micro ops" or "uops") for execution. In at least one embodiment, instruction decoder 2628 parses instruction into an opcode and corresponding data and control fields that may be used by micro-architecture to perform operations. In at least one embodiment, a trace cache 2630 may assemble decoded uops into program ordered sequences or traces in a uop queue 2634 for execution. In at least one embodiment, when trace cache 2630 encounters a complex instruction, a microcode ROM 2632 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2628 may access microcode ROM 2632 to perform instruction. In at least one embodiment, an instruction may be decoded into a small number of micro-ops for processing at instruction decoder 2628. In at least one embodiment, an instruction may be stored within microcode ROM 2632 should a number of micro-ops be needed to accomplish operation. In at least one embodiment, trace cache 2630 refers to an entry point programmable logic array ("PLA") to determine a correct micro-instruction pointer for reading microcode sequences to complete one or more instructions from microcode ROM 2632. In at least one embodiment, after microcode ROM 2632 finishes sequencing micro-ops for an instruction, front end 2601 of machine may resume fetching micro-ops from trace cache 2630.

In at least one embodiment, out-of-order execution engine ("out of order engine") 2603 may prepare instructions for execution. In at least one embodiment, out-of-order execution logic has a number of buffers to smooth out and re-order the flow of instructions to optimize performance as they go down a pipeline and get scheduled for execution. Out-of-order execution engine 2603 includes, without limitation, an allocator/register renamer 2640, a memory uop queue 2642, an integer/floating point uop queue 2644, a memory scheduler 2646, a fast scheduler 2602, a slow/general floating point scheduler ("slow/general FP scheduler") 2604, and a simple floating point scheduler ("simple FP scheduler") 2606. In at least one embodiment, fast schedule 2602, slow/general floating point scheduler 2604, and simple floating point scheduler 2606 are also collectively referred to herein as "uop schedulers 2602, 2604, 2606." Allocator/register renamer 2640 allocates machine buffers and resources that each uop needs in order to execute. In at least one embodiment, allocator/register renamer 2640 renames logic registers onto entries in a register file. In at least one embodiment, allocator/register renamer 2640 also allocates an entry for each uop in one of two uop queues, memory uop queue 2642 for memory operations and integer/floating point uop queue 2644 for non-memory operations, in front of memory scheduler 2646 and uop schedulers 2602, 2604, 2606. In at least one embodiment, uop schedulers 2602, 2604, 2606, determine when a uop is ready to execute based on readiness of their dependent input register operand sources and availability of execution resources uops need to complete their operation. In at least one embodiment, fast scheduler 2602 of at least one embodiment may schedule on each half of main clock cycle while slow/general floating point scheduler 2604 and simple floating point scheduler 2606 may schedule once per main processor clock cycle. In at least one embodiment, uop schedulers 2602, 2604, 2606 arbitrate for dispatch ports to schedule uops for execution.

In at least one embodiment, execution block 2611 includes, without limitation, an integer register file/bypass network 2608, a floating point register file/bypass network ("FP register file/bypass network") 2610, address generation units ("AGUs") 2612 and 2614, fast ALUs 2616 and 2618, a slow ALU 2620, a floating point ALU ("FP") 2622, and a floating point move unit ("FP move") 2624. In at least one embodiment, integer register file/bypass network 2608 and floating point register file/bypass network 2610 are also referred to herein as "register files 2608, 2610." In at least one embodiment, AGUSs 2612 and 2614, fast ALUs 2616 and 2618, slow ALU 2620, floating point ALU 2622, and floating point move unit 2624 are also referred to herein as "execution units 2612, 2614, 2616, 2618, 2620, 2622, and 2624." In at least one embodiment, an execution block may include, without limitation, any number (including zero) and type of register files, bypass networks, address generation units, and execution units, in any combination.

In at least one embodiment, register files 2608, 2610 may be arranged between uop schedulers 2602, 2604, 2606, and execution units 2612, 2614, 2616, 2618, 2620, 2622, and 2624. In at least one embodiment, integer register file/bypass network 2608 performs integer operations. In at least one embodiment, floating point register file/bypass network 2610 performs floating point operations. In at least one embodiment, each of register files 2608, 2610 may include, without limitation, a bypass network that may bypass or forward just completed results that have not yet been written into register file to new dependent uops. In at least one embodiment, register files 2608, 2610 may communicate data with each other. In at least one embodiment, integer register file/bypass network 2608 may include, without limitation, two separate register files, one register file for low-order thirty-two bits of data and a second register file for high order thirty-two bits of data. In at least one embodiment, floating point register file/bypass network 2610 may include, without limitation, 128-bit wide entries because floating point instructions typically have operands from 64 to 128 bits in width.

In at least one embodiment, execution units 2612, 2614, 2616, 2618, 2620, 2622, 2624 may execute instructions. In at least one embodiment, register files 2608, 2610 store integer and floating point data operand values that microinstructions need to execute. In at least one embodiment, processor 2600 may include, without limitation, any number and combination of execution units 2612, 2614, 2616, 2618, 2620, 2622, 2624. In at least one embodiment, floating point ALU 2622 and floating point move unit 2624 may execute floating point, MMX, SIMD, AVX and SSE, or other operations. In at least one embodiment, floating point ALU 2622 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2616, 2618. In at least one embodiment, fast ALUS 2616, 2618 may execute fast operations with an effective latency of half a clock cycle. In at least one embodiment, most complex integer operations go to slow ALU 2620 as slow ALU 2620 may include, without limitation, integer execution hardware for long-latency type of operations, such as a multiplier, shifts, flag logic, and branch processing. In at least one embodiment, memory load/store operations may be executed by AGUs 2612, 2614. In at least one embodiment, fast ALU 2616, fast ALU 2618, and slow ALU 2620 may perform integer operations on 64-bit data operands. In at least one embodiment, fast ALU 2616, fast ALU 2618, and slow ALU 2620 may be implemented to support a variety of data bit sizes including sixteen, thirty-two, 128, 256, etc. In at least one embodiment, floating point ALU 2622 and floating point move unit 2624 may be implemented to support a range of operands having bits of various widths. In at least one embodiment, floating point ALU 2622 and floating point move unit 2624 may operate on 128-bit wide packed data operands in conjunction with SIMD and multimedia instructions.

In at least one embodiment, uop schedulers 2602, 2604, 2606 dispatch dependent operations before parent load has finished executing. In at least one embodiment, as uops may be speculatively scheduled and executed in processor 2600, processor 2600 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 27:
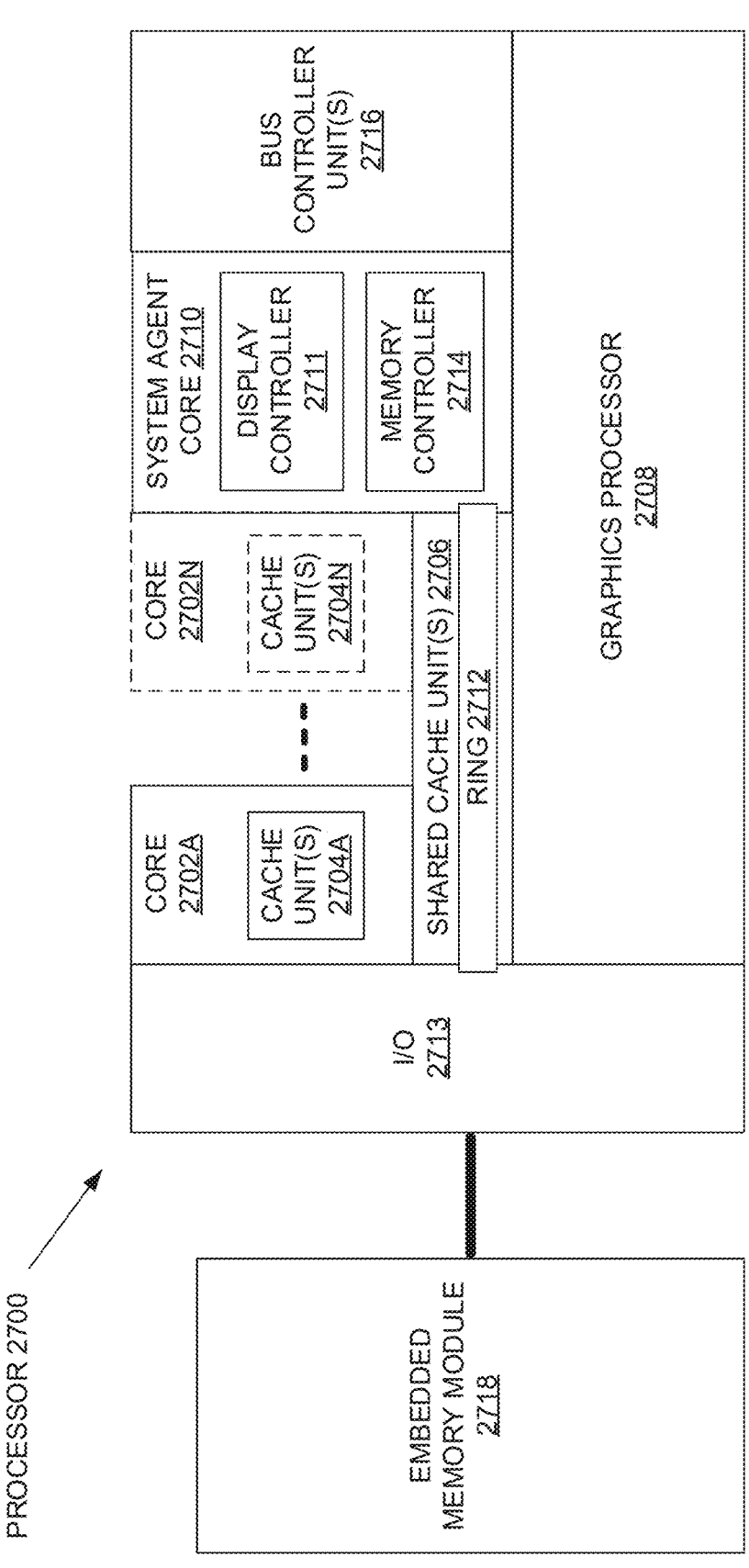
FIG. 27 illustrates a processor, in accordance with at least one embodiment.

FIG. 27 illustrates a processor 2700, in accordance with at least one embodiment. In at least one embodiment, processor 2700 includes, without limitation, one or more processor cores ("cores") 2702A-2702N, an integrated memory controller 2714, and an integrated graphics processor 2708. In at least one embodiment, processor 2700 can include additional cores up to and including additional processor core 2702N represented by dashed lined boxes. In at least one embodiment, each of processor cores 2702A-2702N includes one or more internal cache units 2704A-2704N. In at least one embodiment, each processor core also has access to one or more shared cached units 2706.

In at least one embodiment, internal cache units 2704A-2704N and shared cache units 2706 represent a cache memory hierarchy within processor 2700. In at least one embodiment, cache memory units 2704A-2704N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 2706 and 2704A-2704N.

In at least one embodiment, processor 2700 may also include a set of one or more bus controller units 2716 and a system agent core 2710. In at least one embodiment, one or more bus controller units 2716 manage a set of peripheral buses, such as one or more PCI or PCI express buses. In at least one embodiment, system agent core 2710 provides management functionality for various processor components. In at least one embodiment, system agent core 2710 includes one or more integrated memory controllers 2714 to manage access to various external memory devices (not shown).

In at least one embodiment, one or more of processor cores 2702A-2702N include support for simultaneous multithreading. In at least one embodiment, system agent core 2710 includes components for coordinating and operating processor cores 2702A-2702N during multi-threaded processing. In at least one embodiment, system agent core 2710 may additionally include a power control unit ("PCU"), which includes logic and components to regulate one or more power states of processor cores 2702A-2702N and graphics processor 2708.

In at least one embodiment, processor 2700 additionally includes graphics processor 2708 to execute graphics processing operations. In at least one embodiment, graphics processor 2708 couples with shared cache units 2706, and system agent core 2710, including one or more integrated memory controllers 2714. In at least one embodiment, system agent core 2710 also includes a display controller 2711 to drive graphics processor output to one or more coupled displays. In at least one embodiment, display controller 2711 may also be a separate module coupled with graphics processor 2708 via at least one interconnect, or may be integrated within graphics processor 2708.

In at least one embodiment, a ring based interconnect unit 2712 is used to couple internal components of processor 2700. In at least one embodiment, an alternative interconnect unit may be used, such as a point-to-point interconnect, a switched interconnect, or other techniques. In at least one embodiment, graphics processor 2708 couples with ring interconnect 2712 via an I/O link 2713.

In at least one embodiment, I/O link 2713 represents at least one of multiple varieties of I/O interconnects, including an on package I/O interconnect which facilitates communication between various processor components and a high-performance embedded memory module 2718, such as an eDRAM module. In at least one embodiment, each of processor cores 2702A-2702N and graphics processor 2708 use embedded memory modules 2718 as a shared LLC.

In at least one embodiment, processor cores 2702A-2702N are homogeneous cores executing a common instruction set architecture. In at least one embodiment, processor cores 2702A-2702N are heterogeneous in terms of ISA, where one or more of processor cores 2702A-2702N execute a common instruction set, while one or more other cores of processor cores 2702A-27-02N executes a subset of a common instruction set or a different instruction set. In at least one embodiment, processor cores 2702A-2702N are heterogeneous in terms of microarchitecture, where one or more cores having a relatively higher power consumption couple with one or more cores having a lower power consumption. In at least one embodiment, processor 2700 can be implemented on one or more chips or as an SoC integrated circuit.

Figure 28:
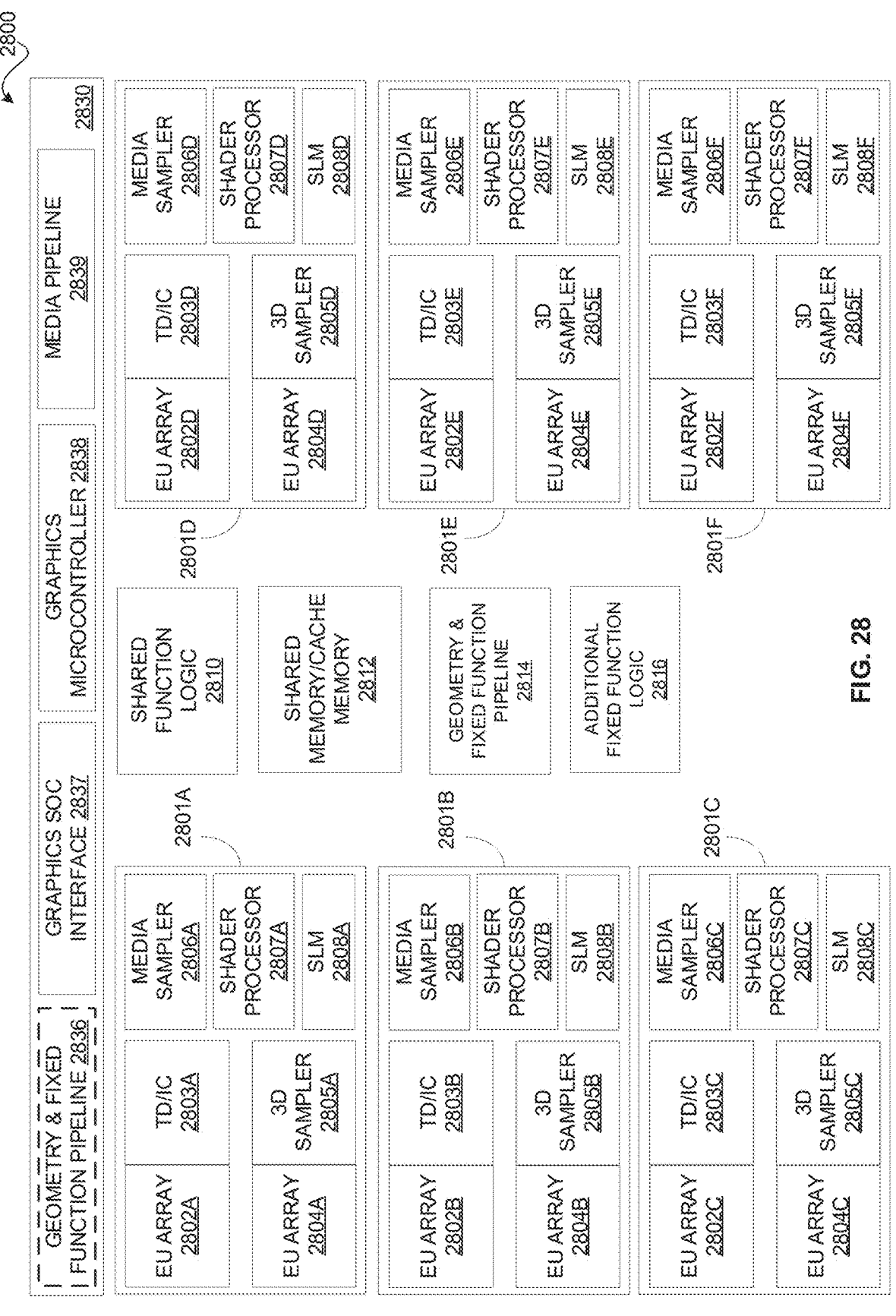
FIG. 28 illustrates a graphics processor core, in accordance with at least one embodiment.

FIG. 28 illustrates a graphics processor core 2800, in accordance with at least one embodiment described. In at least one embodiment, graphics processor core 2800 is included within a graphics core array. In at least one embodiment, graphics processor core 2800, sometimes referred to as a core slice, can be one or multiple graphics cores within a modular graphics processor. In at least one embodiment, graphics processor core 2800 is exemplary of one graphics core slice, and a graphics processor as described herein may include multiple graphics core slices based on target power and performance envelopes. In at least one embodiment, each graphics core 2800 can include a fixed function block 2830 coupled with multiple sub-cores 2801A-2801F, also referred to as sub-slices, that include modular blocks of general-purpose and fixed function logic.

In at least one embodiment, fixed function block 2830 includes a geometry/fixed function pipeline 2836 that can be shared by all sub-cores in graphics processor 2800, for example, in lower performance and/or lower power graphics processor implementations. In at least one embodiment, geometry/fixed function pipeline 2836 includes a 3D fixed function pipeline, a video front-end unit, a thread spawner and thread dispatcher, and a unified return buffer manager, which manages unified return buffers.

In at least one embodiment, fixed function block 2830 also includes a graphics SoC interface 2837, a graphics microcontroller 2838, and a media pipeline 2839. Graphics SoC interface 2837 provides an interface between graphics core 2800 and other processor cores within an SoC integrated circuit. In at least one embodiment, graphics microcontroller 2838 is a programmable sub-processor that is configurable to manage various functions of graphics processor 2800, including thread dispatch, scheduling, and pre-emption. In at least one embodiment, media pipeline 2839 includes logic to facilitate decoding, encoding, pre-processing, and/or post-processing of multimedia data, including image and video data. In at least one embodiment, media pipeline 2839 implements media operations via requests to compute or sampling logic within sub-cores 2801-2801F.

In at least one embodiment, SoC interface 2837 enables graphics core 2800 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 2837 can also enable communication with fixed function devices within an SoC, such as camera imaging pipelines, and enables use of and/or implements global memory atomics that may be shared between graphics core 2800 and CPUs within an SoC. In at least one embodiment, SoC interface 2837 can also implement power management controls for graphics core 2800 and enable an interface between a clock domain of graphic core 2800 and other clock domains within an SoC. In at least one embodiment, SoC interface 2837 enables receipt of command buffers from a command streamer and global thread dispatcher that are configured to provide commands and instructions to each of one or more graphics cores within a graphics processor. In at least one embodiment, commands and instructions can be dispatched to media pipeline 2839, when media operations are to be performed, or a geometry and fixed function pipeline (e.g., geometry and fixed function pipeline 2836, geometry and fixed function pipeline 2814) when graphics processing operations are to be performed.

In at least one embodiment, graphics microcontroller 2838 can be configured to perform various scheduling and management tasks for graphics core 2800. In at least one embodiment, graphics microcontroller 2838 can perform graphics and/or compute workload scheduling on various graphics parallel engines within execution unit (EU) arrays 2802A-2802F, 2804A-2804F within sub-cores 2801A-2801F. In at least one embodiment, host software executing on a CPU core of an SoC including graphics core 2800 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 2838 can also facilitate low-power or idle states for graphics core 2800, providing graphics core 2800 with an ability to save and restore registers within graphics core 2800 across low-power state transitions independently from an operating system and/or graphics driver software on a system.

In at least one embodiment, graphics core 2800 may have greater than or fewer than illustrated sub-cores 2801A-2801F, up to N modular sub-cores. For each set of N sub-cores, in at least one embodiment, graphics core 2800 can also include shared function logic 2810, shared and/or cache memory 2812, a geometry/fixed function pipeline 2814, as well as additional fixed function logic 2816 to accelerate various graphics and compute processing operations. In at least one embodiment, shared function logic 2810 can include logic units (e.g., sampler, math, and/or inter-thread communication logic) that can be shared by each N sub-cores within graphics core 2800. Shared and/or cache memory 2812 can be an LLC for N sub-cores 2801A-2801F within graphics core 2800 and can also serve as shared memory that is accessible by multiple sub-cores. In at least one embodiment, geometry/fixed function pipeline 2814 can be included instead of geometry/fixed function pipeline 2836 within fixed function block 2830 and can include same or similar logic units.

In at least one embodiment, graphics core 2800 includes additional fixed function logic 2816 that can include various fixed function acceleration logic for use by graphics core 2800. In at least one embodiment, additional fixed function logic 2816 includes an additional geometry pipeline for use in position only shading. In position-only shading, at least two geometry pipelines exist, whereas in a full geometry pipeline within geometry/fixed function pipeline 2816, 2836, and a cull pipeline, which is an additional geometry pipeline which may be included within additional fixed function logic 2816. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2816 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 2816 can also include general purpose processing acceleration logic, such as fixed function matrix multiplication logic, for accelerating CUDA programs.

In at least one embodiment, each graphics sub-core 2801A-2801F includes a set of execution resources that may be used to perform graphics, media, and compute operations in response to requests by graphics pipeline, media pipeline, or shader programs. In at least one embodiment, graphics sub-cores 2801A-2801F include multiple EU arrays 2802A-2802F, 2804A-2804F, thread dispatch and inter-thread communication ("TD/IC") logic 2803A-2803F, a 3D (e.g., texture) sampler 2805A-2805F, a media sampler 2806A-2806F, a shader processor 2807A-2807F, and shared local memory ("SLM") 2808A-2808F. EU arrays 2802A-2802F, 2804A-2804F each include multiple execution units, which are GPGPUs capable of performing floating-point and integer/fixed-point logic operations in service of a graphics, media, or compute operation, including graphics, media, or compute shader programs. In at least one embodiment, TD/IC logic 2803A-2803F performs local thread dispatch and thread control operations for execution units within a sub-core and facilitate communication between threads executing on execution units of a sub-core. In at least one embodiment, 3D sampler 2805A-2805F can read texture or other 3D graphics related data into memory. In at least one embodiment, 3D sampler can read texture data differently based on a configured sample state and texture format associated with a given texture. In at least one embodiment, media sampler 2806A-2806F can perform similar read operations based on a type and format associated with media data. In at least one embodiment, each graphics sub-core 2801A-2801F can alternately include a unified 3D and media sampler. In at least one embodiment, threads executing on execution units within each of sub-cores 2801A-2801F can make use of shared local memory 2808A-2808F within each sub-core, to enable threads executing within a thread group to execute using a common pool of on-chip memory.

Figure 29:
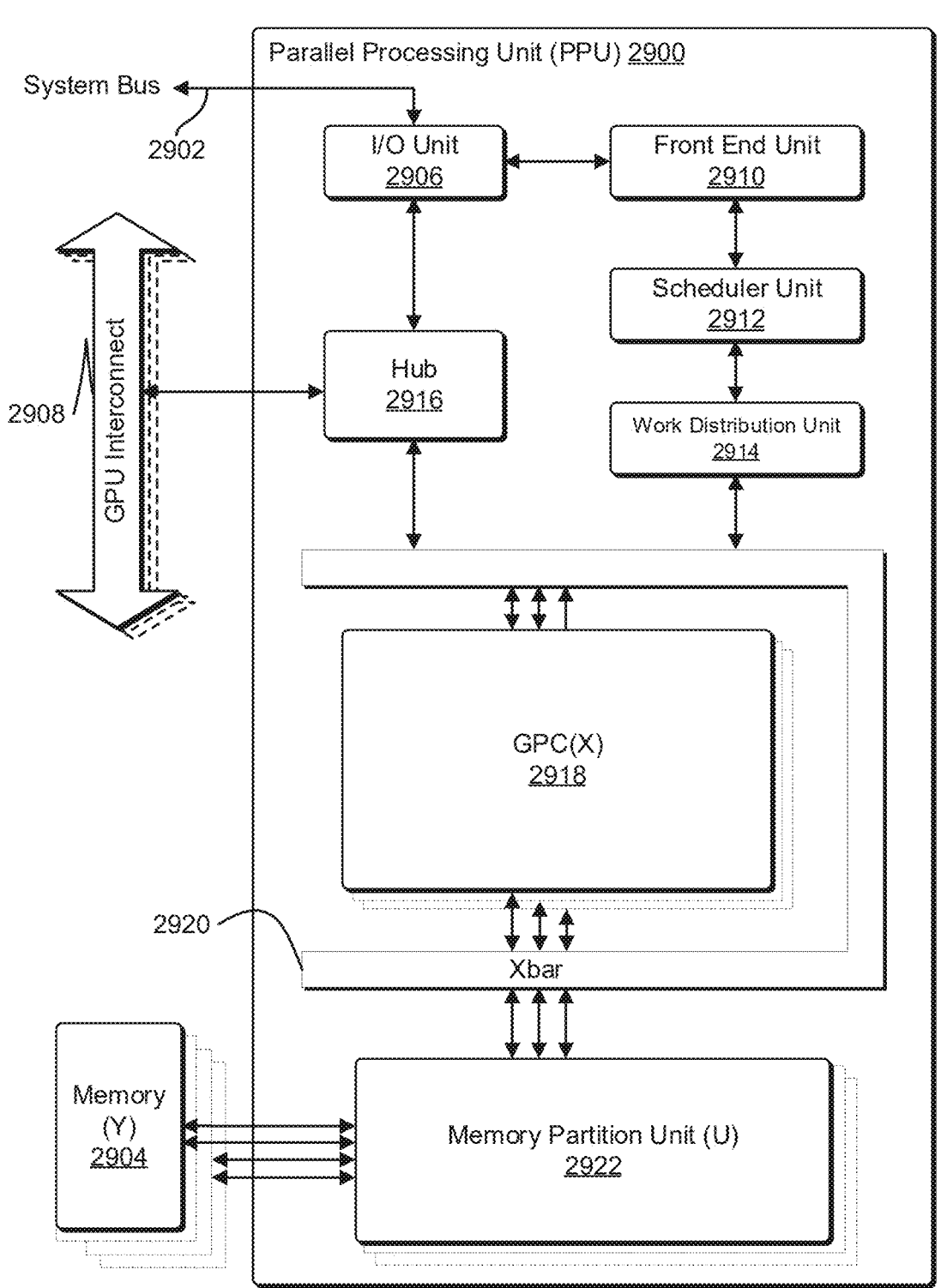
FIG. 29 illustrates a PPU, in accordance with at least one embodiment.

FIG. 29 illustrates a parallel processing unit ("PPU") 2900, in accordance with at least one embodiment. In at least one embodiment, PPU 2900 is configured with machine-readable code that, if executed by PPU 2900, causes PPU 2900 to perform some or all of processes and techniques described herein. In at least one embodiment, PPU 2900 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2900. In at least one embodiment, PPU 2900 is a GPU configured to implement a graphics rendering pipeline for processing three-dimensional ("3D") graphics data in order to generate two-dimensional ("2D") image data for display on a display device such as an LCD device. In at least one embodiment, PPU 2900 is utilized to perform computations such as linear algebra operations and machine-learning operations. FIG. 29 illustrates an example parallel processor for illustrative purposes only and should be construed as a non-limiting example of a processor architecture that may be implemented in at least one embodiment.

In at least one embodiment, one or more PPUs 2900 are configured to accelerate High Performance Computing ("HPC"), data center, and machine learning applications. In at least one embodiment, one or more PPUs 2900 are configured to accelerate CUDA programs. In at least one embodiment, PPU 2900 includes, without limitation, an I/O unit 2906, a front-end unit 2910, a scheduler unit 2912, a work distribution unit 2914, a hub 2916, a crossbar ("Xbar") 2920, one or more general processing clusters ("GPCs") 2918, and one or more partition units ("memory partition units") 2922. In at least one embodiment, PPU 2900 is connected to a host processor or other PPUs 2900 via one or more high-speed GPU interconnects ("GPU interconnects") 2908. In at least one embodiment, PPU 2900 is connected to a host processor or other peripheral devices via a system bus or interconnect 2902. In at least one embodiment, PPU 2900 is connected to a local memory comprising one or more memory devices ("memory") 2904. In at least one embodiment, memory devices 2904 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2908 may refer to a wire-based multi-lane communications link that is used by systems to scale and include one or more PPUs 2900 combined with one or more CPUs, supports cache coherence between PPUs 2900 and CPUs, and CPU mastering. In at least one embodiment, data and/or commands are transmitted by high-speed GPU interconnect 2908 through hub 2916 to/from other units of PPU 2900 such as one or more copy engines, video encoders, video decoders, power management units, and other components which may not be explicitly illustrated in FIG. 29.

In at least one embodiment, I/O unit 2906 is configured to transmit and receive communications (e.g., commands, data) from a host processor (not illustrated in FIG. 29) over system bus 2902. In at least one embodiment, I/O unit 2906 communicates with host processor directly via system bus 2902 or through one or more intermediate devices such as a memory bridge. In at least one embodiment, I/O unit 2906 may communicate with one or more other processors, such as one or more of PPUs 2900 via system bus 2902. In at least one embodiment, I/O unit 2906 implements a PCIe interface for communications over a PCIe bus. In at least one embodiment, I/O unit 2906 implements interfaces for communicating with external devices.

In at least one embodiment, I/O unit 2906 decodes packets received via system bus 2902. In at least one embodiment, at least some packets represent commands configured to cause PPU 2900 to perform various operations. In at least one embodiment, I/O unit 2906 transmits decoded commands to various other units of PPU 2900 as specified by commands. In at least one embodiment, commands are transmitted to front-end unit 2910 and/or transmitted to hub 2916 or other units of PPU 2900 such as one or more copy engines, a video encoder, a video decoder, a power management unit, etc. (not explicitly illustrated in FIG. 29). In at least one embodiment, I/O unit 2906 is configured to route communications between and among various logical units of PPU 2900.

In at least one embodiment, a program executed by host processor encodes a command stream in a buffer that provides workloads to PPU 2900 for processing. In at least one embodiment, a workload comprises instructions and data to be processed by those instructions. In at least one embodiment, buffer is a region in a memory that is accessible (e.g., read/write) by both a host processor and PPU 2900—a host interface unit may be configured to access buffer in a system memory connected to system bus 2902 via memory requests transmitted over system bus 2902 by I/O unit 2906. In at least one embodiment, a host processor writes a command stream to a buffer and then transmits a pointer to the start of the command stream to PPU 2900 such that front-end unit 2910 receives pointers to one or more command streams and manages one or more command streams, reading commands from command streams and forwarding commands to various units of PPU 2900.

In at least one embodiment, front-end unit 2910 is coupled to scheduler unit 2912 that configures various GPCs 2918 to process tasks defined by one or more command streams. In at least one embodiment, scheduler unit 2912 is configured to track state information related to various tasks managed by scheduler unit 2912 where state information may indicate which of GPCs 2918 a task is assigned to, whether task is active or inactive, a priority level associated with task, and so forth. In at least one embodiment, scheduler unit 2912 manages execution of a plurality of tasks on one or more of GPCs 2918.

In at least one embodiment, scheduler unit 2912 is coupled to work distribution unit 2914 that is configured to dispatch tasks for execution on GPCs 2918. In at least one embodiment, work distribution unit 2914 tracks a number of scheduled tasks received from scheduler unit 2912 and work distribution unit 2914 manages a pending task pool and an active task pool for each of GPCs 2918. In at least one embodiment, pending task pool comprises a number of slots (e.g., 32 slots) that contain tasks assigned to be processed by a particular GPC 2918; active task pool may comprise a number of slots (e.g., 4 slots) for tasks that are actively being processed by GPCs 2918 such that as one of GPCs 2918 completes execution of a task, that task is evicted from active task pool for GPC 2918 and one of other tasks from pending task pool is selected and scheduled for execution on GPC 2918. In at least one embodiment, if an active task is idle on GPC 2918, such as while waiting for a data dependency to be resolved, then the active task is evicted from GPC 2918 and returned to a pending task pool while another task in the pending task pool is selected and scheduled for execution on GPC 2918.

In at least one embodiment, work distribution unit 2914 communicates with one or more GPCs 2918 via XBar 2920. In at least one embodiment, XBar 2920 is an interconnect network that couples many units of PPU 2900 to other units of PPU 2900 and can be configured to couple work distribution unit 2914 to a particular GPC 2918. In at least one embodiment, one or more other units of PPU 2900 may also be connected to XBar 2920 via hub 2916.

In at least one embodiment, tasks are managed by scheduler unit 2912 and dispatched to one of GPCs 2918 by work distribution unit 2914. GPC 2918 is configured to process task and generate results. In at least one embodiment, results may be consumed by other tasks within GPC 2918, routed to a different GPC 2918 via XBar 2920, or stored in memory 2904. In at least one embodiment, results can be written to memory 2904 via partition units 2922, which implement a memory interface for reading and writing data to/from memory 2904. In at least one embodiment, results can be transmitted to another PPU 2904 or CPU via high-speed GPU interconnect 2908. In at least one embodiment, PPU 2900 includes, without limitation, a number U of partition units 2922 that is equal to number of separate and distinct memory devices 2904 coupled to PPU 2900.

In at least one embodiment, a host processor executes a driver kernel that implements an application programming interface ("API") that enables one or more applications executing on host processor to schedule operations for execution on PPU 2900. In at least one embodiment, multiple compute applications are simultaneously executed by PPU 2900 and PPU 2900 provides isolation, quality of service ("QoS"), and independent address spaces for multiple compute applications. In at least one embodiment, an application generates instructions (e.g., in the form of API calls) that cause a driver kernel to generate one or more tasks for execution by PPU 2900 and the driver kernel outputs tasks to one or more streams being processed by PPU 2900. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 30:
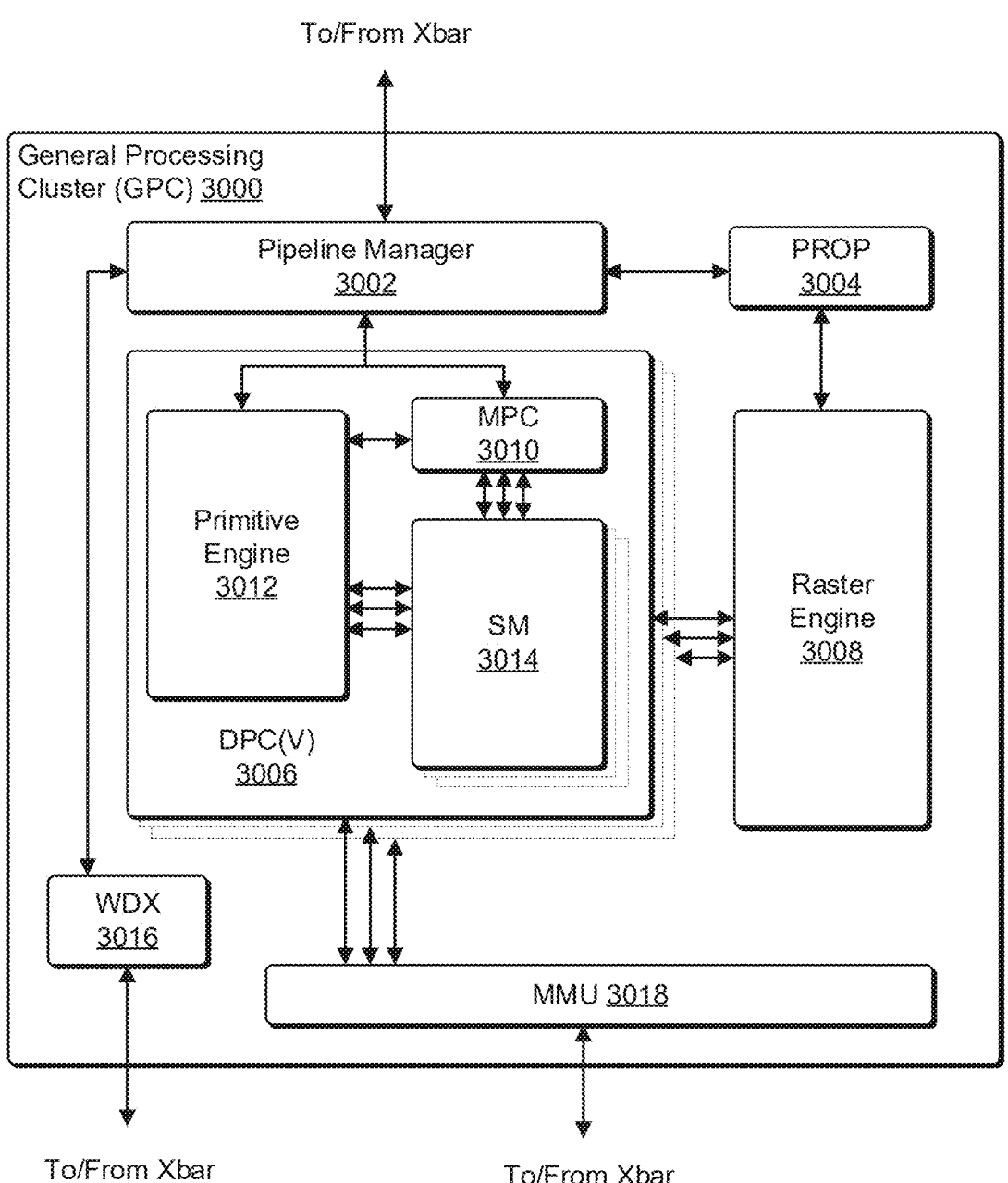
FIG. 30 illustrates a GPC, in accordance with at least one embodiment.

FIG. 30 illustrates a GPC 3000, in accordance with at least one embodiment. In at least one embodiment, GPC 3000 is GPC 2918 of FIG. 29. In at least one embodiment, each GPC 3000 includes, without limitation, a number of hardware units for processing tasks and each GPC 3000 includes, without limitation, a pipeline manager 3002, a pre-raster operations unit ("PROP") 3004, a raster engine 3008, a work distribution crossbar ("WDX") 3016, an MMU 3018, one or more Data Processing Clusters ("DPCs") 3006, and any suitable combination of parts.

In at least one embodiment, operation of GPC 3000 is controlled by pipeline manager 3002. In at least one embodiment, pipeline manager 3002 manages configuration of one or more DPCs 3006 for processing tasks allocated to GPC 3000. In at least one embodiment, pipeline manager 3002 configures at least one of one or more DPCs 3006 to implement at least a portion of a graphics rendering pipeline. In at least one embodiment, DPC 3006 is configured to execute a vertex shader program on a programmable streaming multiprocessor ("SM") 3014. In at least one embodiment, pipeline manager 3002 is configured to route packets received from a work distribution unit to appropriate logical units within GPC 3000 and, in at least one embodiment, some packets may be routed to fixed function hardware units in PROP 3004 and/or raster engine 3008 while other packets may be routed to DPCs 3006 for processing by a primitive engine 3012 or SM 3014. In at least one embodiment, pipeline manager 3002 configures at least one of DPCs 3006 to implement a computing pipeline. In at least one embodiment, pipeline manager 3002 configures at least one of DPCs 3006 to execute at least a portion of a CUDA program.

In at least one embodiment, PROP unit 3004 is configured to route data generated by raster engine 3008 and DPCs 3006 to a Raster Operations ("ROP") unit in a partition unit, such as memory partition unit 2922 described in more detail above in conjunction with FIG. 29. In at least one embodiment, PROP unit 3004 is configured to perform optimizations for color blending, organize pixel data, perform address translations, and more. In at least one embodiment, raster engine 3008 includes, without limitation, a number of fixed function hardware units configured to perform various raster operations and, in at least one embodiment, raster engine 3008 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 3008 comprises fragments to be processed by any suitable entity such as by a fragment shader implemented within DPC 3006.

In at least one embodiment, each DPC 3006 included in GPC 3000 comprise, without limitation, an M-Pipe Controller ("MPC") 3010; primitive engine 3012; one or more SMs 3014; and any suitable combination thereof. In at least one embodiment, MPC 3010 controls operation of DPC 3006, routing packets received from pipeline manager 3002 to appropriate units in DPC 3006. In at least one embodiment, packets associated with a vertex are routed to primitive engine 3012, which is configured to fetch vertex attributes associated with vertex from memory; in contrast, packets associated with a shader program may be transmitted to SM 3014.

In at least one embodiment, SM 3014 comprises, without limitation, a programmable streaming processor that is configured to process tasks represented by a number of threads. In at least one embodiment, SM 3014 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 3014 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 3014 is described in more detail in conjunction with FIG. 31.

In at least one embodiment, MMU 3018 provides an interface between GPC 3000 and a memory partition unit (e.g., partition unit 2922 of FIG. 29) and MMU 3018 provides translation of virtual addresses into physical addresses, memory protection, and arbitration of memory requests. In at least one embodiment, MMU 3018 provides one or more translation lookaside buffers (TLBs) for performing translation of virtual addresses into physical addresses in memory.

Figure 31:
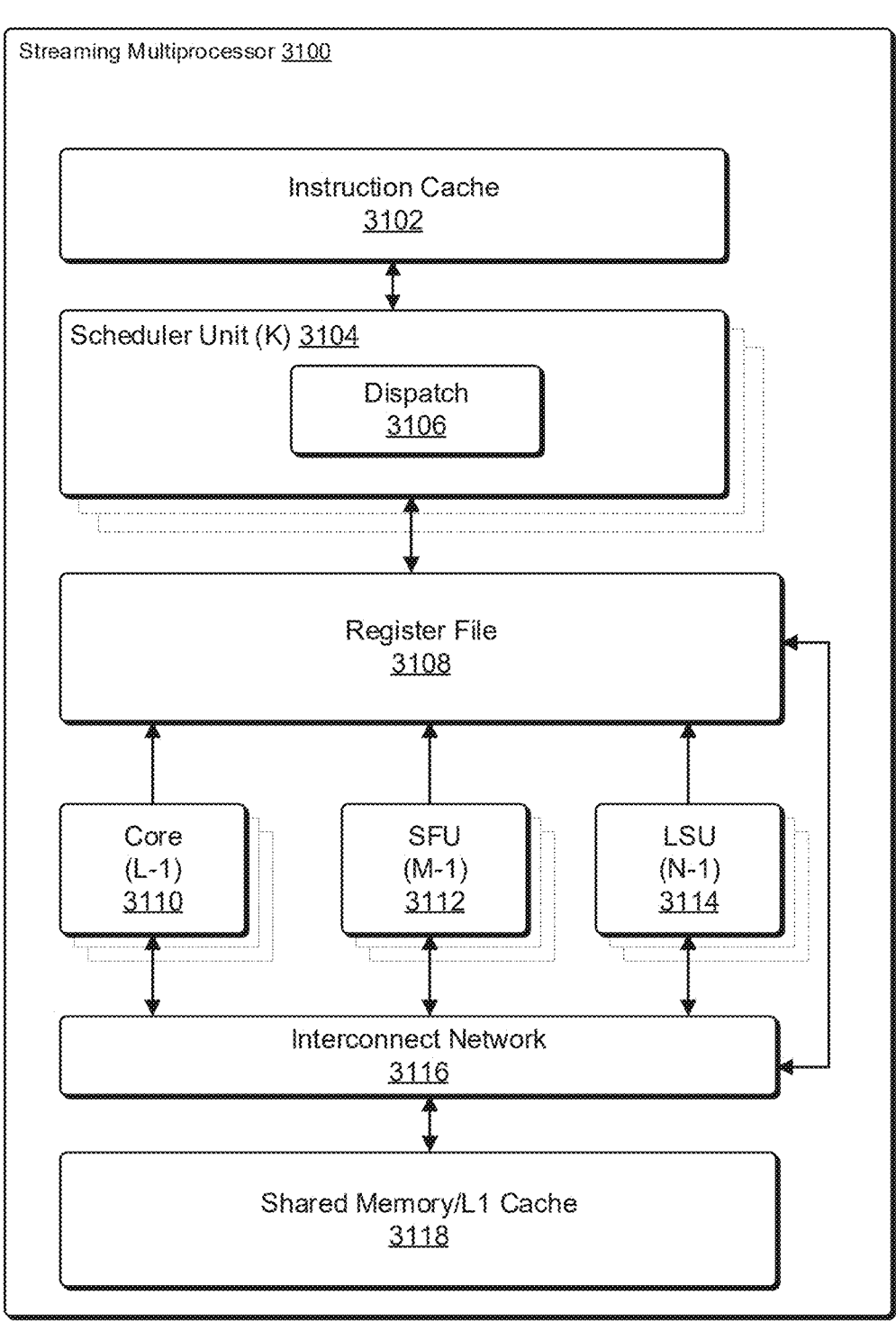
FIG. 31 illustrates a streaming multiprocessor, in accordance with at least one embodiment.

FIG. 31 illustrates a streaming multiprocessor ("SM") 3100, in accordance with at least one embodiment. In at least one embodiment, SM 3100 is SM 3014 of FIG. 30. In at least one embodiment, SM 3100 includes, without limitation, an instruction cache 3102; one or more scheduler units 3104; a register file 3108; one or more processing cores ("cores") 3110; one or more special function units ("SFUs") 3112; one or more LSUs 3114; an interconnect network 3116; a shared memory/L1 cache 3118; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 3100. In at least one embodiment, scheduler unit 3104 receives tasks from a work distribution unit and manages instruction scheduling for one or more thread blocks assigned to SM 3100. In at least one embodiment, scheduler unit 3104 schedules thread blocks for execution as warps of parallel threads, wherein each thread block is allocated at least one warp. In at least one embodiment, each warp executes threads. In at least one embodiment, scheduler unit 3104 manages a plurality of different thread blocks, allocating warps to different thread blocks and then dispatching instructions from a plurality of different cooperative groups to various functional units (e.g., processing cores 3110, SFUs 3112, and LSUs 3114) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 3106 is configured to transmit instructions to one or more of functional units and scheduler unit 3104 includes, without limitation, two dispatch units 3106 that enable two different instructions from same warp to be dispatched during each clock cycle. In at least one embodiment, each scheduler unit 3104 includes a single dispatch unit 3106 or additional dispatch units 3106.

In at least one embodiment, each SM 3100, in at least one embodiment, includes, without limitation, register file 3108 that provides a set of registers for functional units of SM 3100. In at least one embodiment, register file 3108 is divided between each of the functional units such that each functional unit is allocated a dedicated portion of register file 3108. In at least one embodiment, register file 3108 is divided between different warps being executed by SM 3100 and register file 3108 provides temporary storage for operands connected to data paths of functional units. In at least one embodiment, each SM 3100 comprises, without limitation, a plurality of L processing cores 3110. In at least one embodiment, SM 3100 includes, without limitation, a large number (e.g., 128 or more) of distinct processing cores 3110. In at least one embodiment, each processing core 3110 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3110 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 3110. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 3100 comprises, without limitation, M SFUs 3112 that perform special functions (e.g., attribute evaluation, reciprocal square root, and like). In at least one embodiment, SFUs 3112 include, without limitation, a tree traversal unit configured to traverse a hierarchical tree data structure. In at least one embodiment, SFUs 3112 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3100. In at least one embodiment, texture maps are stored in shared memory/L1 cache 3118. In at least one embodiment, texture units implement texture operations such as filtering operations using mip-maps (e.g., texture maps of varying levels of detail). In at least one embodiment, each SM 3100 includes, without limitation, two texture units.

In at least one embodiment, each SM 3100 comprises, without limitation, N LSUs 3114 that implement load and store operations between shared memory/L1 cache 3118 and register file 3108. In at least one embodiment, each SM 3100 includes, without limitation, interconnect network 3116 that connects each of the functional units to register file 3108 and LSU 3114 to register file 3108 and shared memory/L1 cache 3118. In at least one embodiment, interconnect network 3116 is a crossbar that can be configured to connect any of the functional units to any of the registers in register file 3108 and connect LSUs 3114 to register file 3108 and memory locations in shared memory/L1 cache 3118.

In at least one embodiment, shared memory/L1 cache 3118 is an array of on-chip memory that allows for data storage and communication between SM 3100 and a primitive engine and between threads in SM 3100. In at least one embodiment, shared memory/L1 cache 3118 comprises, without limitation, 128 KB of storage capacity and is in a path from SM 3100 to a partition unit. In at least one embodiment, shared memory/L1 cache 3118 is used to cache reads and writes. In at least one embodiment, one or more of shared memory/L1 cache 3118, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 3118 enables shared memory/L1 cache 3118 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 3100 to execute a program and perform calculations, shared memory/L1 cache 3118 to communicate between threads, and LSU 3114 to read and write global memory through shared memory/L1 cache 3118 and a memory partition unit. In at least one embodiment, when configured for general purpose parallel computation, SM 3100 writes commands that scheduler unit 3104 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructs for General-Purpose Computing

The following figures set forth, without limitation, exemplary software constructs for implementing at least one embodiment.

Figure 32:
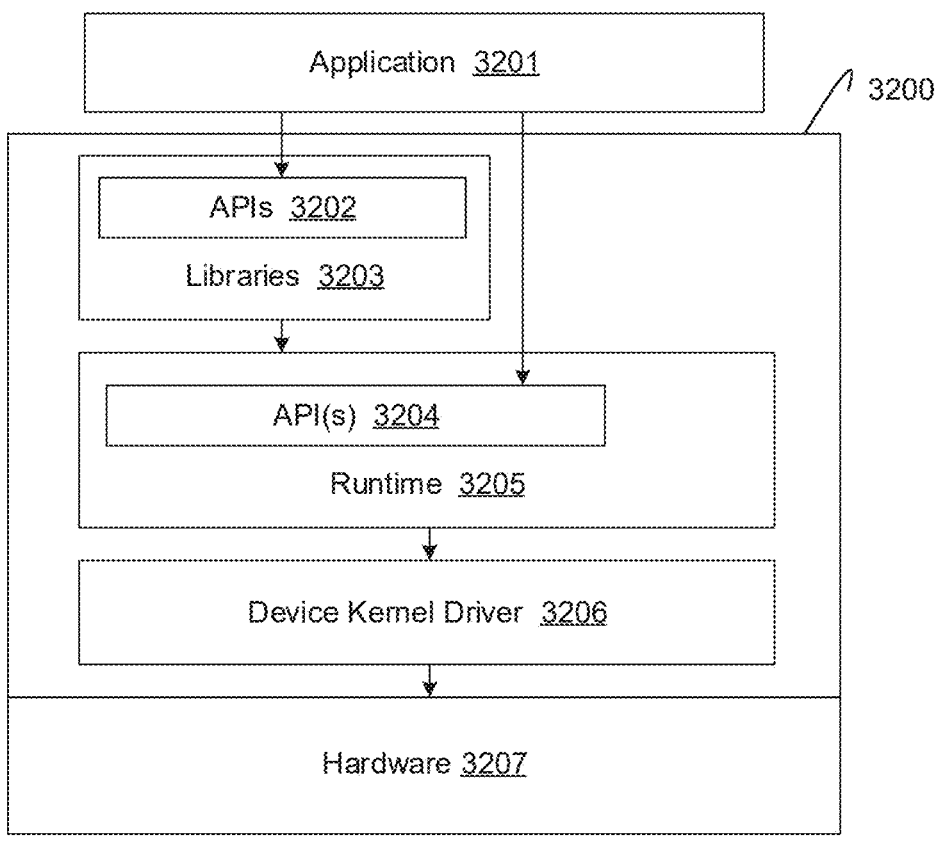
FIG. 32 illustrates a software stack of a programming platform, in accordance with at least one embodiment.

FIG. 32 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 3200 of a programming platform provides an execution environment for an application 3201. In at least one embodiment, application 3201 may include any computer software capable of being launched on software stack 3200. In at least one embodiment, application 3201 may include, but is not limited to, an artificial intelligence ("AI")/machine learning ("ML") application, a high performance computing ("HPC") application, a virtual desktop infrastructure ("VDI"), or a data center workload.

In at least one embodiment, application 3201 and software stack 3200 run on hardware 3207. Hardware 3207 may include one or more GPUs, CPUs, FPGAs, AI engines, and/or other types of compute devices that support a programming platform, in at least one embodiment. In at least one embodiment, such as with CUDA, software stack 3200 may be vendor specific and compatible with only devices from particular vendor(s). In at least one embodiment, such as in with OpenCL, software stack 3200 may be used with devices from different vendors. In at least one embodiment, hardware 3207 includes a host connected to one more devices that can be accessed to perform computational tasks via application programming interface ("API") calls. A device within hardware 3207 may include, but is not limited to, a GPU, FPGA, AI engine, or other compute device (but may also include a CPU) and its memory, as opposed to a host within hardware 3207 that may include, but is not limited to, a CPU (but may also include a compute device) and its memory, in at least one embodiment.

In at least one embodiment, software stack 3200 of a programming platform includes, without limitation, a number of libraries 3203, a runtime 3205, and a device kernel driver 3206. Each of libraries 3203 may include data and programming code that can be used by computer programs and leveraged during software development, in at least one embodiment. In at least one embodiment, libraries 3203 may include, but are not limited to, pre-written code and subroutines, classes, values, type specifications, configuration data, documentation, help data, and/or message templates. In at least one embodiment, libraries 3203 include functions that are optimized for execution on one or more types of devices. In at least one embodiment, libraries 3203 may include, but are not limited to, functions for performing mathematical, deep learning, and/or other types of operations on devices. In at least one embodiment, libraries 3203 are associated with corresponding APIs 3202, which may include one or more APIs, that expose functions implemented in libraries 3203.

In at least one embodiment, application 3201 is written as source code that is compiled into executable code, as discussed in greater detail below in conjunction with FIGS. 37-39. Executable code of application 3201 may run, at least in part, on an execution environment provided by software stack 3200, in at least one embodiment. In at least one embodiment, during execution of application 3201, code may be reached that needs to run on a device, as opposed to a host. In such a case, runtime 3205 may be called to load and launch requisite code on the device, in at least one embodiment. In at least one embodiment, runtime 3205 may include any technically feasible runtime system that is able to support execution of application S01.

In at least one embodiment, runtime 3205 is implemented as one or more runtime libraries associated with corresponding APIs, which are shown as API(s) 3204. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3204 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3206 is configured to facilitate communication with an underlying device. In at least one embodiment, device kernel driver 3206 may provide low-level functionalities upon which APIs, such as API(s) 3204, and/or other software relies. In at least one embodiment, device kernel driver 3206 may be configured to compile intermediate representation ("IR") code into binary code at runtime. For CUDA, device kernel driver 3206 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3206 to compile IR code at runtime.

Figure 33:
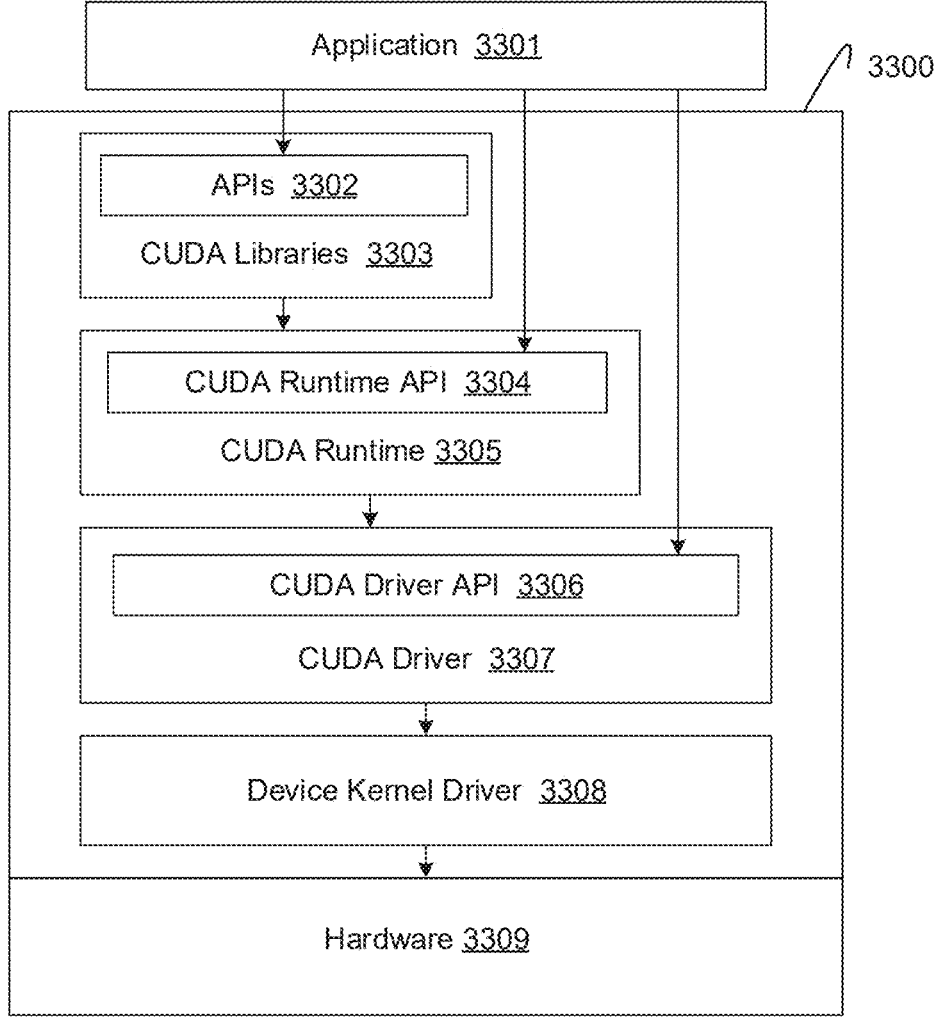
FIG. 33 illustrates a CUDA implementation of a software stack of FIG. 32, in accordance with at least one embodiment.

FIG. 33 illustrates a CUDA implementation of software stack 3200 of FIG. 32, in accordance with at least one embodiment. In at least one embodiment, a CUDA software stack 3300, on which an application 3301 may be launched, includes CUDA libraries 3303, a CUDA runtime 3305, a CUDA driver 3307, and a device kernel driver 3308. In at least one embodiment, CUDA software stack 3300 executes on hardware 3309, which may include a GPU that supports CUDA and is developed by NVIDIA Corporation of Santa Clara, CA.

In at least one embodiment, application 3301, CUDA runtime 3305, and device kernel driver 3308 may perform similar functionalities as application 3201, runtime 3205, and device kernel driver 3206, respectively, which are described above in conjunction with FIG. 32. In at least one embodiment, CUDA driver 3307 includes a library (libcuda.so) that implements a CUDA driver API 3306. Similar to a CUDA runtime API 3304 implemented by a CUDA runtime library (cudart), CUDA driver API 3306 may, without limitation, expose functions for memory management, execution control, device management, error handling, synchronization, and/or graphics interoperability, among other things, in at least one embodiment. In at least one embodiment, CUDA driver API 3306 differs from CUDA runtime API 3304 in that CUDA runtime API 3304 simplifies device code management by providing implicit initialization, context (analogous to a process) management, and module (analogous to dynamically loaded libraries) management. In contrast to high-level CUDA runtime API 3304, CUDA driver API 3306 is a low-level API providing more fine-grained control of the device, particularly with respect to contexts and module loading, in at least one embodiment. In at least one embodiment, CUDA driver API 3306 may expose functions for context management that are not exposed by CUDA runtime API 3304. In at least one embodiment, CUDA driver API 3306 is also language-independent and supports, e.g., OpenCL in addition to CUDA runtime API 3304. Further, in at least one embodiment, development libraries, including CUDA runtime 3305, may be considered as separate from driver components, including user-mode CUDA driver 3307 and kernel-mode device driver 3308 (also sometimes referred to as a "display" driver).

In at least one embodiment, CUDA libraries 3303 may include, but are not limited to, mathematical libraries, deep learning libraries, parallel algorithm libraries, and/or signal/image/video processing libraries, which parallel computing applications such as application 3301 may utilize. In at least one embodiment, CUDA libraries 3303 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 3303 may include deep learning libraries such as a cuDNN library of primitives for deep neural networks and a TensorRT platform for high-performance deep learning inference, among others. In at least one embodiment, CUDA libraries 3303 are associated with corresponding APIs 3302, which my include one or more APIs, that expose functions implemented in CUDA libraries 3303.

Figure 34:
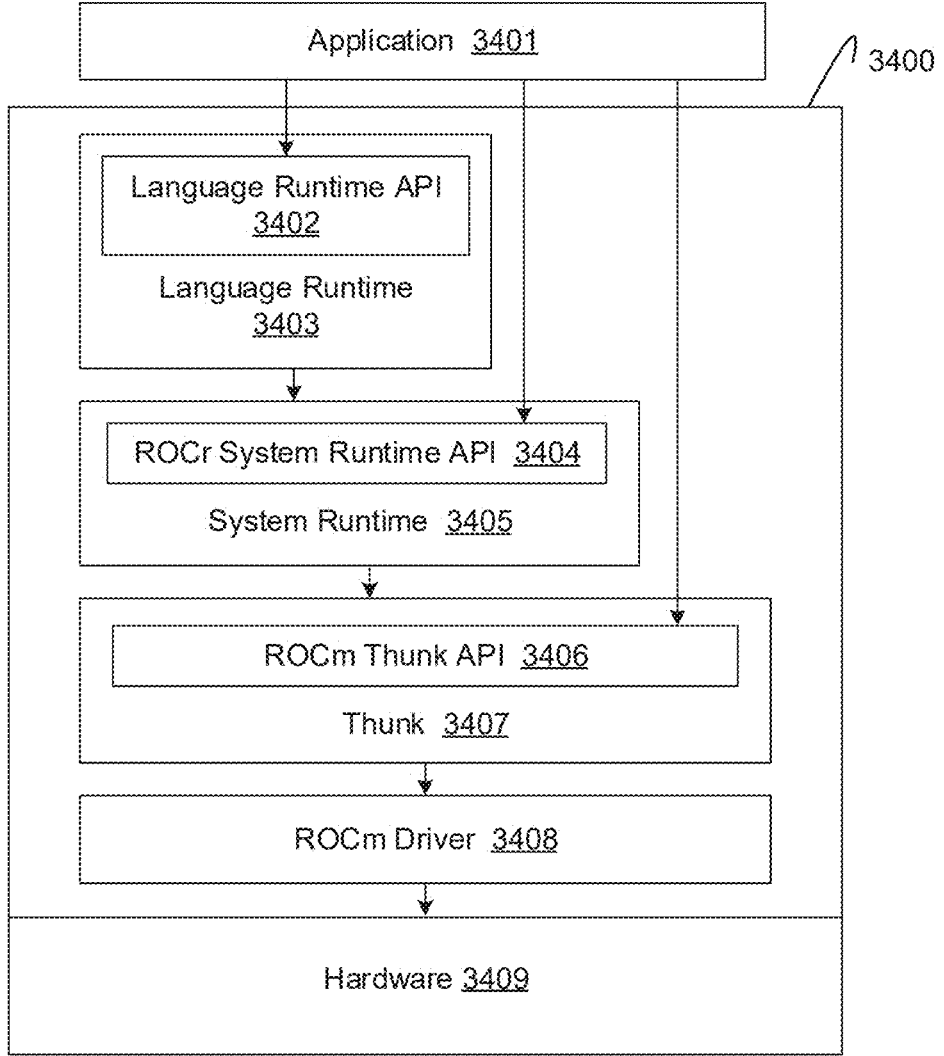
FIG. 34 illustrates a ROCm implementation of a software stack of FIG. 32, in accordance with at least one embodiment.

FIG. 34 illustrates a ROCm implementation of software stack 3200 of FIG. 32, in accordance with at least one embodiment. In at least one embodiment, a ROCm software stack 3400, on which an application 3401 may be launched, includes a language runtime 3403, a system runtime 3405, a thunk 3407, and a ROCm kernel driver 3408. In at least one embodiment, ROCm software stack 3400 executes on hardware 3409, which may include a GPU that supports ROCm and is developed by AMD Corporation of Santa Clara, CA.

In at least one embodiment, application 3401 may perform similar functionalities as application 3201 discussed above in conjunction with FIG. 32. In addition, language runtime 3403 and system runtime 3405 may perform similar functionalities as runtime 3205 discussed above in conjunction with FIG. 32, in at least one embodiment. In at least one embodiment, language runtime 3403 and system runtime 3405 differ in that system runtime 3405 is a language-independent runtime that implements a ROCr system runtime API 3404 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3405, language runtime 3403 is an implementation of a language-specific runtime API 3402 layered on top of ROCr system runtime API 3404, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 3304 discussed above in conjunction with FIG. 33, such as functions for memory management, execution control, device management, error handling, and synchronization, among other things.

In at least one embodiment, thunk (ROCt) 3407 is an interface 3406 that can be used to interact with underlying ROCm driver 3408. In at least one embodiment, ROCm driver 3408 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 3206 discussed above in conjunction with FIG. 32. In at least one embodiment, HSA kernel driver is a driver permitting different types of processors to share system resources more effectively via hardware features.

In at least one embodiment, various libraries (not shown) may be included in ROCm software stack 3400 above language runtime 3403 and provide functionality similarity to CUDA libraries 3303, discussed above in conjunction with FIG. 33. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 35:
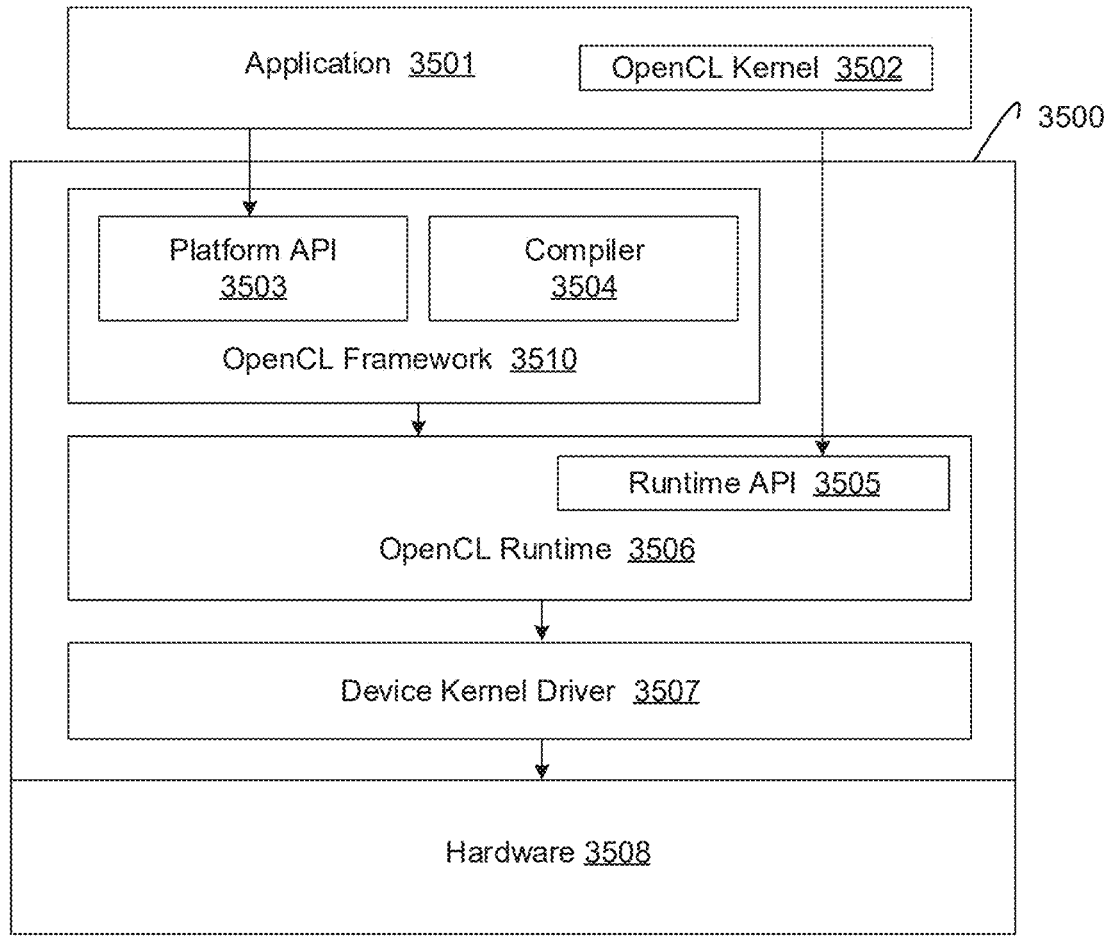
FIG. 35 illustrates an OpenCL implementation of a software stack of FIG. 32, in accordance with at least one embodiment.

FIG. 35 illustrates an OpenCL implementation of software stack 3200 of FIG. 32, in accordance with at least one embodiment. In at least one embodiment, an OpenCL software stack 3500, on which an application 3501 may be launched, includes an OpenCL framework 3510, an OpenCL runtime 3506, and a driver 3507. In at least one embodiment, OpenCL software stack 3500 executes on hardware 3309 that is not vendor-specific. As OpenCL is supported by devices developed by different vendors, specific OpenCL drivers may be required to interoperate with hardware from such vendors, in at least one embodiment.

In at least one embodiment, application 3501, OpenCL runtime 3506, device kernel driver 3507, and hardware 3508 may perform similar functionalities as application 3201, runtime 3205, device kernel driver 3206, and hardware 3207, respectively, that are discussed above in conjunction with FIG. 32. In at least one embodiment, application 3501 further includes an OpenCL kernel 3502 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3503 and runtime API 3505. In at least one embodiment, runtime API 3505 uses contexts to manage execution of kernels on devices. In at least one embodiment, each identified device may be associated with a respective context, which runtime API 3505 may use to manage command queues, program objects, and kernel objects, share memory objects, among other things, for that device. In at least one embodiment, platform API 3503 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3504 is also included in OpenCL frame-work 3510. Source code may be compiled offline prior to executing an application or online during execution of an application, in at least one embodiment. In contrast to CUDA and ROCm, OpenCL applications in at least one embodiment may be compiled online by compiler 3504, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 36:
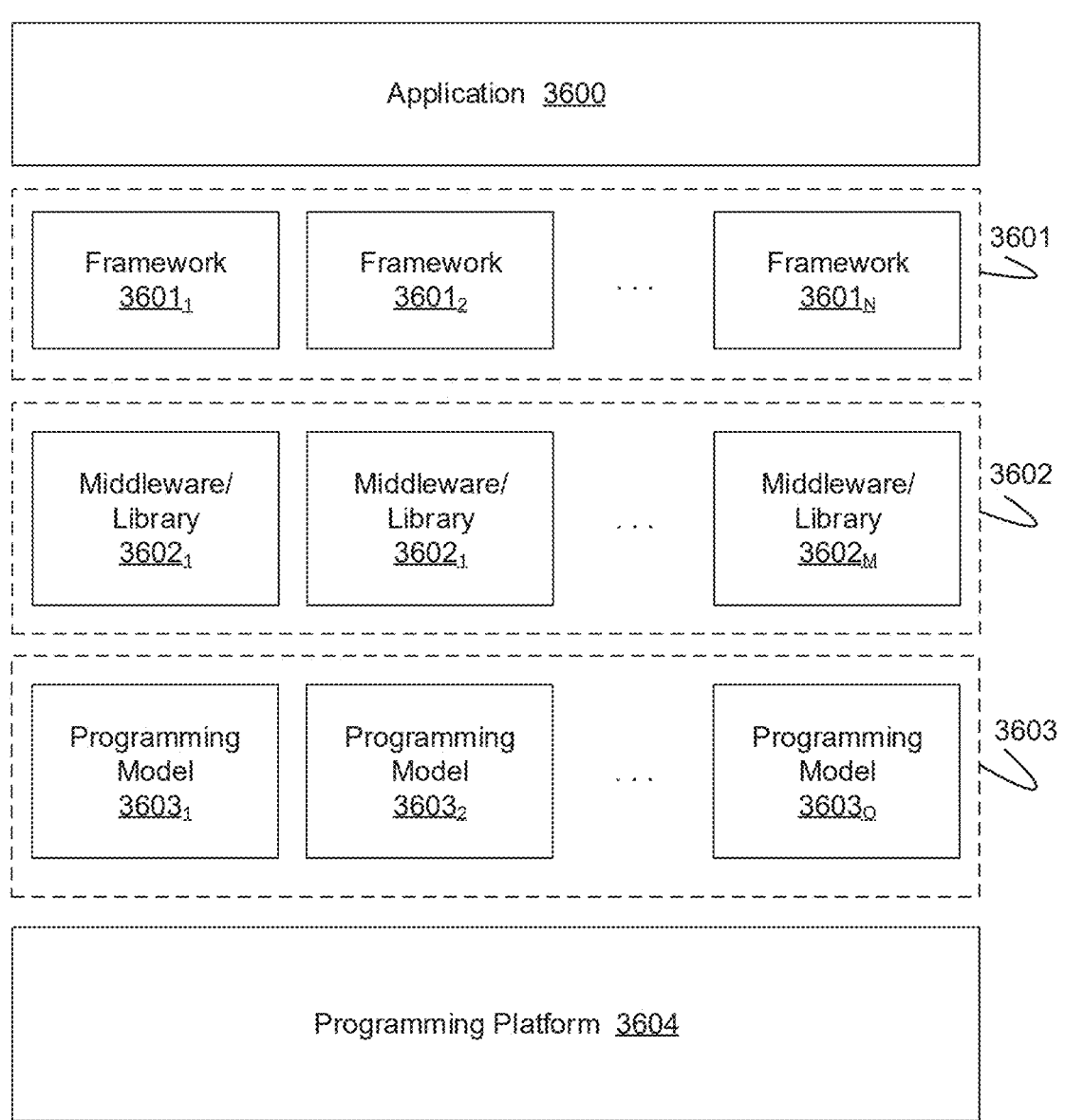
FIG. 36 illustrates software that is supported by a programming platform, in accordance with at least one embodiment.

FIG. 36 illustrates software that is supported by a programming platform, in accordance with at least one embodiment. In at least one embodiment, a programming platform 3604 is configured to support various programming models 3603, middlewares and/or libraries 3602, and frameworks 3601 that an application 3600 may rely upon. In at least one embodiment, application 3600 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 3604 may be one of a CUDA, ROCm, or OpenCL platform described above in conjunction with FIG. 33, FIG. 34, and FIG. 35, respectively. In at least one embodiment, programming platform 3604 supports multiple programming models 3603, which are abstractions of an underlying computing system permitting expressions of algorithms and data structures. Programming models 3603 may expose features of underlying hardware in order to improve performance, in at least one embodiment. In at least one embodiment, programming models 3603 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulkan Compute.

In at least one embodiment, libraries and/or middlewares 3602 provide implementations of abstractions of programming models 3604. In at least one embodiment, such libraries include data and programming code that may be used by computer programs and leveraged during software development. In at least one embodiment, such middlewares include software that provides services to applications beyond those available from programming platform 3604. In at least one embodiment, libraries and/or middlewares 3602 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 3602 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 3601 depend on libraries and/or middlewares 3602. In at least one embodiment, each of application frameworks 3601 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 37:
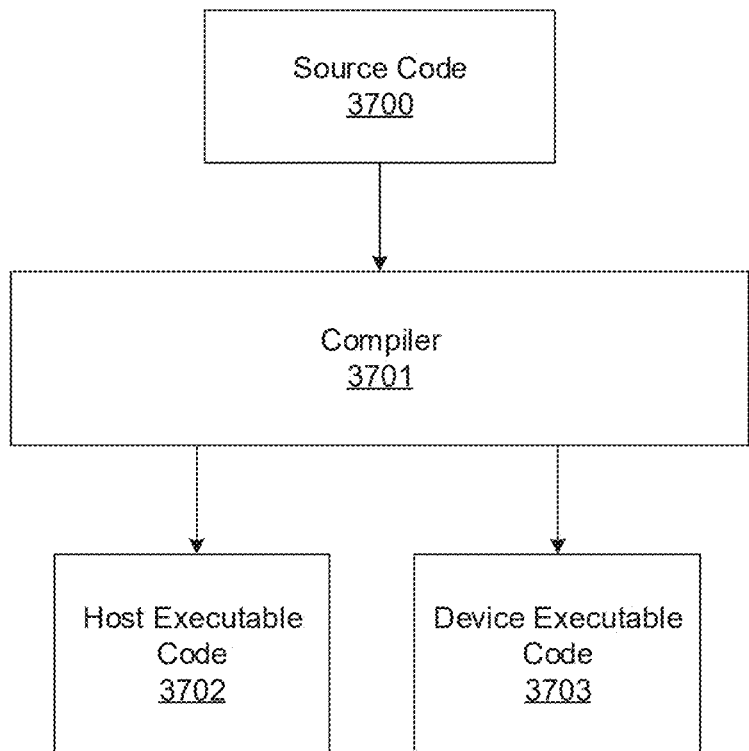
FIG. 37 illustrates compiling code to execute on programming platforms of FIGS. 32-35, in accordance with at least one embodiment.

FIG. 37 illustrates compiling code to execute on one of programming platforms of FIGS. 32-35, in accordance with at least one embodiment. In at least one embodiment, a compiler 3701 receives source code 3700 that includes both host code as well as device code. In at least one embodiment, complier 3701 is configured to convert source code 3700 into host executable code 3702 for execution on a host and device executable code 3703 for execution on a device. In at least one embodiment, source code 3700 may either be compiled offline prior to execution of an application, or online during execution of an application.

In at least one embodiment, source code 3700 may include code in any programming language supported by compiler 3701, such as C++, C, Fortran, etc. In at least one embodiment, source code 3700 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 3700 may include multiple source code files, rather than a single-source file, into which host code and device code are separated.

In at least one embodiment, compiler 3701 is configured to compile source code 3700 into host executable code 3702 for execution on a host and device executable code 3703 for execution on a device. In at least one embodiment, compiler 3701 performs operations including parsing source code 3700 into an abstract system tree (AST), performing optimizations, and generating executable code. In at least one embodiment in which source code 3700 includes a single-source file, compiler 3701 may separate device code from host code in such a single-source file, compile device code and host code into device executable code 3703 and host executable code 3702, respectively, and link device executable code 3703 and host executable code 3702 together in a single file, as discussed in greater detail below with respect to FIG. 38.

In at least one embodiment, host executable code 3702 and device executable code 3703 may be in any suitable format, such as binary code and/or IR code. In the case of CUDA, host executable code 3702 may include native object code and device executable code 3703 may include code in PTX intermediate representation, in at least one embodiment. In the case of ROCm, both host executable code 3702 and device executable code 3703 may include target binary code, in at least one embodiment.

Figure 38:
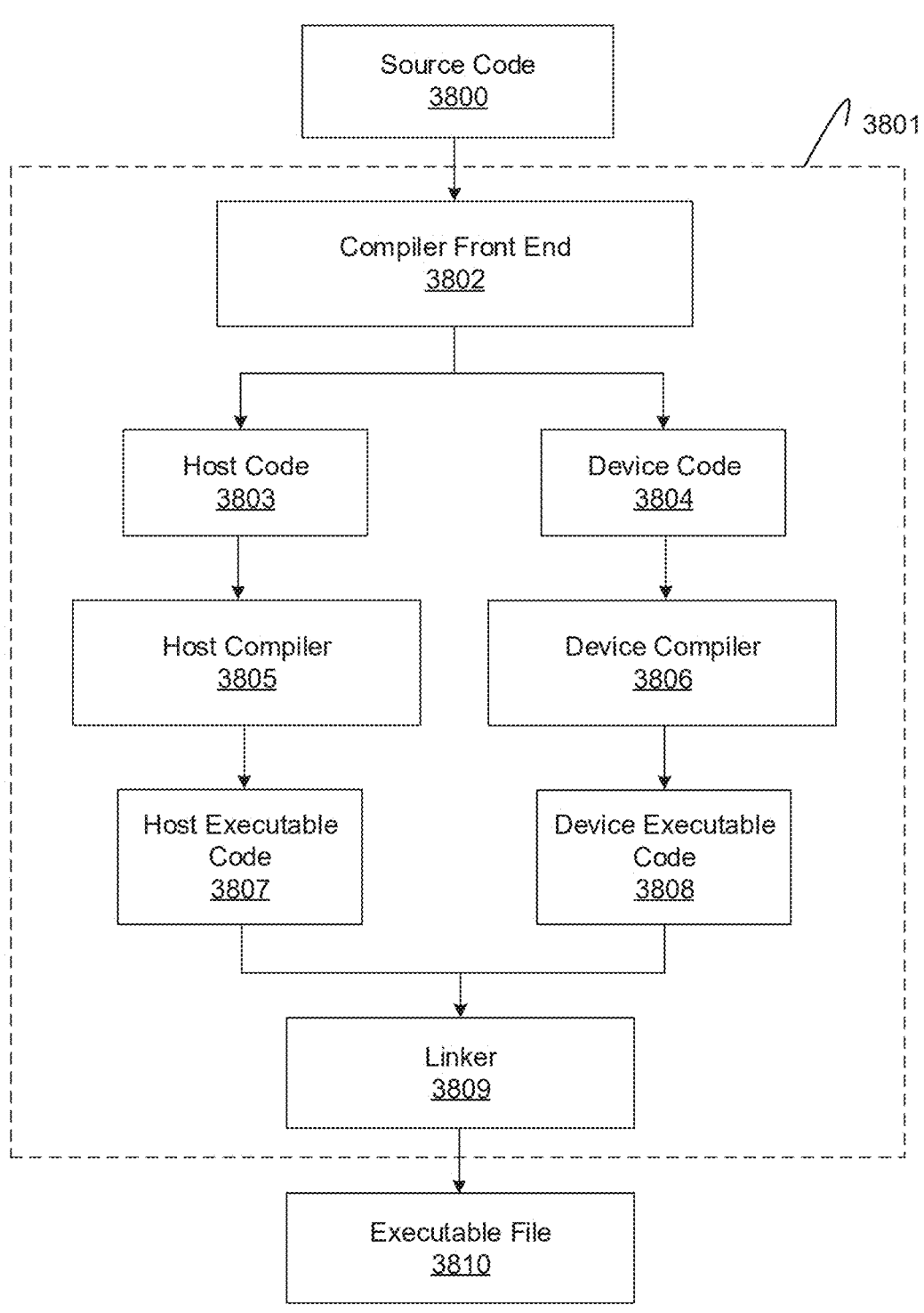
FIG. 38 illustrates in greater detail compiling code to execute on programming platforms of FIGS. 32-35, in accordance with at least one embodiment.

FIG. 38 is a more detailed illustration of compiling code to execute on one of programming platforms of FIGS. 32-35, in accordance with at least one embodiment. In at least one embodiment, a compiler 3801 is configured to receive source code 3800, compile source code 3800, and output an executable file 3810. In at least one embodiment, source code 3800 is a single-source file, such as a .cu file, a .hip.cpp file, or a file in another format, that includes both host and device code. In at least one embodiment, compiler 3801 may be, but is not limited to, an NVIDIA CUDA compiler ("NVCC") for compiling CUDA code in .cu files, or a HCC compiler for compiling HIP code in .hip.cpp files.

In at least one embodiment, compiler 3801 includes a compiler front end 3802, a host compiler 3805, a device compiler 3806, and a linker 3809. In at least one embodiment, compiler front end 3802 is configured to separate device code 3804 from host code 3803 in source code 3800. Device code 3804 is compiled by device compiler 3806 into device executable code 3808, which as described may include binary code or IR code, in at least one embodiment. Separately, host code 3803 is compiled by host compiler 3805 into host executable code 3807, in at least one embodiment. For NVCC, host compiler 3805 may be, but is not limited to, a general purpose C/C++ compiler that outputs native object code, while device compiler 3806 may be, but is not limited to, a Low Level Virtual Machine ("LLVM")-based compiler that forks a LLVM compiler infrastructure and outputs PTX code or binary code, in at least one embodiment. For HCC, both host compiler 3805 and device compiler 3806 may be, but are not limited to, LLVM-based compilers that output target binary code, in at least one embodiment.

Subsequent to compiling source code 3800 into host executable code 3807 and device executable code 3808, linker 3809 links host and device executable code 3807 and 3808 together in executable file 3810, in at least one embodiment. In at least one embodiment, native object code for a host and PTX or binary code for a device may be linked together in an Executable and Linkable Format ("ELF") file, which is a container format used to store object code.

Figure 39:
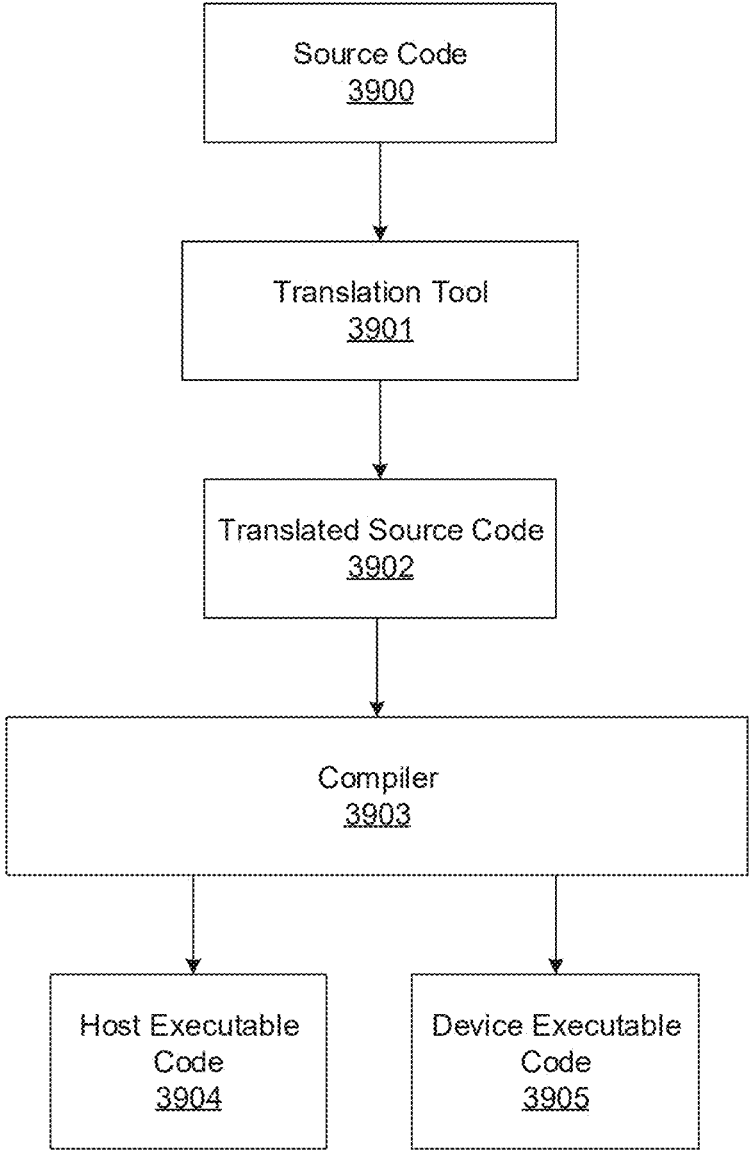
FIG. 39 illustrates translating source code prior to compiling source code, in accordance with at least one embodiment.

FIG. 39 illustrates translating source code prior to compiling source code, in accordance with at least one embodiment. In at least one embodiment, source code 3900 is passed through a translation tool 3901, which translates source code 3900 into translated source code 3902. In at least one embodiment, a compiler 3903 is used to compile translated source code 3902 into host executable code 3904 and device executable code 3905 in a process that is similar to compilation of source code 3700 by compiler 3701 into host executable code 3702 and device executable code 3703, as discussed above in conjunction with FIG. 37.

In at least one embodiment, a translation performed by translation tool 3901 is used to port source 3900 for execution in a different environment than that in which it was originally intended to run. In at least one embodiment, translation tool 3901 may include, but is not limited to, a HIP translator that is used to "hipify" CUDA code intended for a CUDA platform into HIP code that can be compiled and executed on a ROCm platform. In at least one embodiment, translation of source code 3900 may include parsing source code 3900 and converting calls to API(s) provided by one programming model (e.g., CUDA) into corresponding calls to API(s) provided by another programming model (e.g., HIP), as discussed in greater detail below in conjunction with FIGS. 40A-41. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 3901 may sometimes be incomplete, requiring additional, manual effort to fully port source code 3900.

Configuring GPUS for General-Purpose Computing

The following figures set forth, without limitation, exemplary architectures for compiling and executing compute source code, in accordance with at least one embodiment.

Figure 40A:
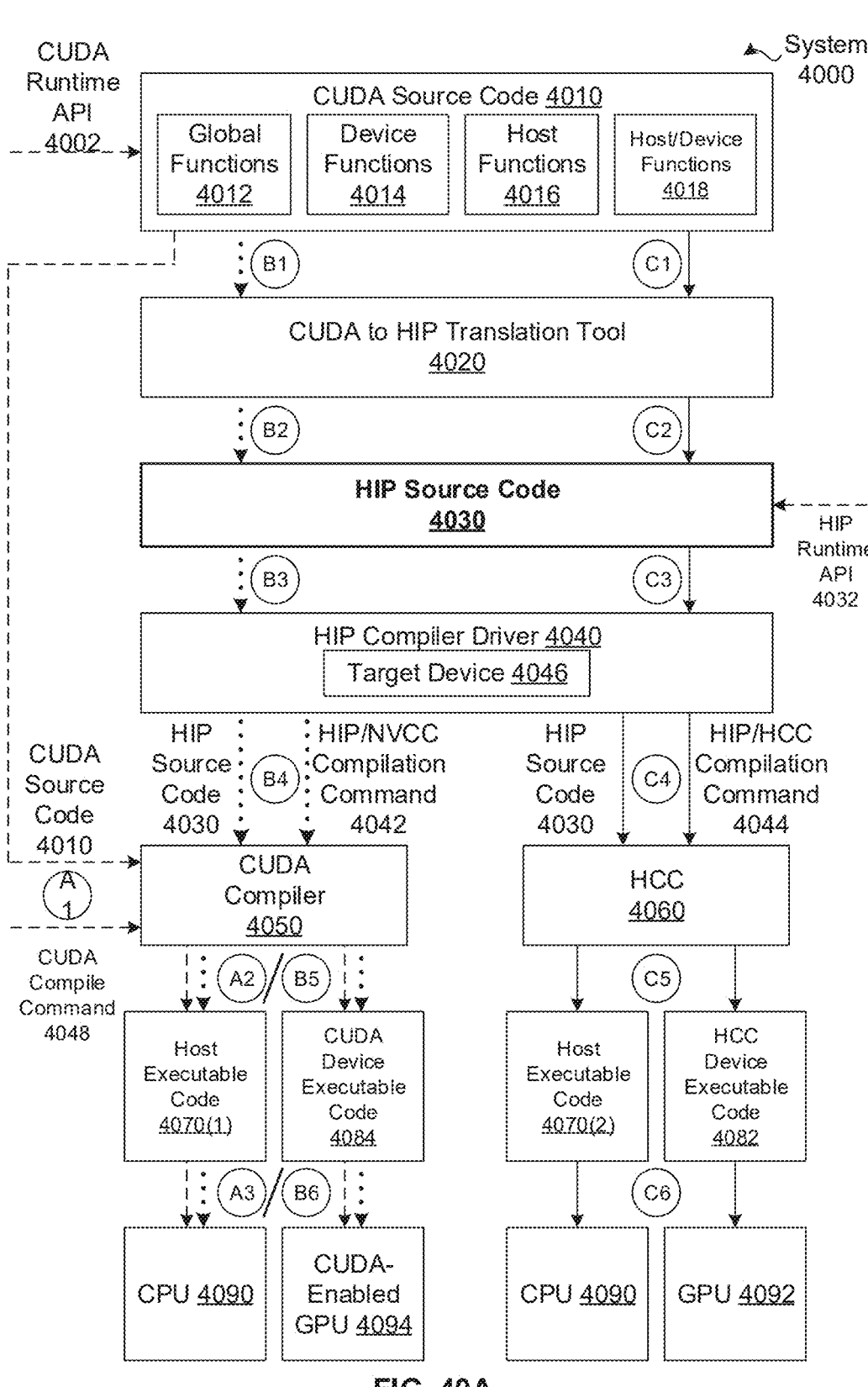
FIG. 40A illustrates a system configured to compile and execute CUDA source code using different types of processing units, in accordance with at least one embodiment.

FIG. 40A illustrates a system 4000 configured to compile and execute CUDA source code 4010 using different types of processing units, in accordance with at least one embodiment. In at least one embodiment, system 40A00 includes, without limitation, CUDA source code 4010, a CUDA compiler 4050, host executable code 4070(1), host executable code 4070(2), CUDA device executable code 4084, a CPU 4090, a CUDA-enabled GPU 4094, a GPU 4092, a CUDA to HIP translation tool 4020, HIP source code 4030, a HIP compiler driver 4040, an HCC 4060, and HCC device executable code 4082.

In at least one embodiment, CUDA source code 4010 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 4090, GPU 40192, or another GPGPU, etc. In at least one embodiment, host code is source code that, after compilation, is executable on a host. In at least one embodiment, a host is a processor that is optimized for sequential instruction processing, such as CPU 4090.

In at least one embodiment, CUDA source code 4010 includes, without limitation, any number (including zero) of global functions 4012, any number (including zero) of device functions 4014, any number (including zero) of host functions 4016, and any number (including zero) of host/device functions 4018. In at least one embodiment, global functions 4012, device functions 4014, host functions 4016, and host/device functions 4018 may be mixed in CUDA source code 4010. In at least one embodiment, each of global functions 4012 is executable on a device and callable from a host. In at least one embodiment, one or more of global functions 4012 may therefore act as entry points to a device. In at least one embodiment, each of global functions 4012 is a kernel. In at least one embodiment and in a technique known as dynamic parallelism, one or more of global functions 4012 defines a kernel that is executable on a device and callable from such a device. In at least one embodiment, a kernel is executed N (where N is any positive integer) times in parallel by N different threads on a device during execution.

In at least one embodiment, each of device functions 4014 is executed on a device and callable from such a device only. In at least one embodiment, each of host functions 4016 is executed on a host and callable from such a host only. In at least one embodiment, each of host/device functions 4016 defines both a host version of a function that is executable on a host and callable from such a host only and a device version of the function that is executable on a device and callable from such a device only.

In at least one embodiment, CUDA source code 4010 may also include, without limitation, any number of calls to any number of functions that are defined via a CUDA runtime API 4002. In at least one embodiment, CUDA runtime API 4002 may include, without limitation, any number of functions that execute on a host to allocate and deallocate device memory, transfer data between host memory and device memory, manage systems with multiple devices, etc. In at least one embodiment, CUDA source code 4010 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 4002, a CUDA driver API, APIs for any number of CUDA libraries, etc. In at least one embodiment and relative to CUDA runtime API 4002, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 4050 compiles input CUDA code (e.g., CUDA source code 4010) to generate host executable code 4070(1) and CUDA device executable code 4084. In at least one embodiment, CUDA compiler 4050 is NVCC. In at least one embodiment, host executable code 4070(1) is a compiled version of host code included in input source code that is executable on CPU 4090. In at least one embodiment, CPU 4090 may be any processor that is optimized for sequential instruction processing.

In at least one embodiment, CUDA device executable code 4084 is a compiled version of device code included in input source code that is executable on CUDA-enabled GPU 4094. In at least one embodiment, CUDA device executable code 4084 includes, without limitation, binary code. In at least one embodiment, CUDA device executable code 4084 includes, without limitation, IR code, such as PTX code, that is further compiled at runtime into binary code for a specific target device (e.g., CUDA-enabled GPU 4094) by a device driver. In at least one embodiment, CUDA-enabled GPU 4094 may be any processor that is optimized for parallel instruction processing and that supports CUDA. In at least one embodiment, CUDA-enabled GPU 4094 is developed by NVIDIA Corporation of Santa Clara, CA.

In at least one embodiment, CUDA to HIP translation tool 4020 is configured to translate CUDA source code 4010 to functionally similar HIP source code 4030. In a least one embodiment, HIP source code 4030 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 4012, but such a HIP programming language may lack support for dynamic parallelism and therefore global functions 4012 defined in HIP code may be callable from a host only.

In at least one embodiment, HIP source code 4030 includes, without limitation, any number (including zero) of global functions 4012, any number (including zero) of device functions 4014, any number (including zero) of host functions 4016, and any number (including zero) of host/device functions 4018. In at least one embodiment, HIP source code 4030 may also include any number of calls to any number of functions that are specified in a HIP runtime API 4032. In at least one embodiment, HIP runtime API 4032 includes, without limitation, functionally similar versions of a subset of functions included in CUDA runtime API 4002. In at least one embodiment, HIP source code 4030 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 4032, a HIP driver API, APIs for any number of HIP libraries, APIs for any number of ROCm libraries, etc.

In at least one embodiment, CUDA to HIP translation tool 4020 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 4020 converts any number of calls to functions specified in CUDA runtime API 4002 to any number of calls to functions specified in HIP runtime API 4032.

In at least one embodiment, CUDA to HIP translation tool 4020 is a tool known as hipify-perl that executes a text-based translation process. In at least one embodiment, CUDA to HIP translation tool 4020 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 4020.

In at least one embodiment, HIP compiler driver 4040 is a front end that determines a target device 4046 and then configures a compiler that is compatible with target device 4046 to compile HIP source code 4030. In at least one embodiment, target device 4046 is a processor that is optimized for parallel instruction processing. In at least one embodiment, HIP compiler driver 4040 may determine target device 4046 in any technically feasible fashion.

In at least one embodiment, if target device 4046 is compatible with CUDA (e.g., CUDA-enabled GPU 4094), then HIP compiler driver 4040 generates a HIP/NVCC compilation command 4042. In at least one embodiment and as described in greater detail in conjunction with FIG. 40B, HIP/NVCC compilation command 4042 configures CUDA compiler 4050 to compile HIP source code 4030 using, without limitation, a HIP to CUDA translation header and a CUDA runtime library. In at least one embodiment and in response to HIP/NVCC compilation command 4042, CUDA compiler 4050 generates host executable code 4070(1) and CUDA device executable code 4084.

In at least one embodiment, if target device 4046 is not compatible with CUDA, then HIP compiler driver 4040 generates a HIP/HCC compilation command 4044. In at least one embodiment and as described in greater detail in conjunction with FIG. 40C, HIP/HCC compilation command 4044 configures HCC 4060 to compile HIP source code 4030 using, without limitation, an HCC header and a HIP/HCC runtime library. In at least one embodiment and in response to HIP/HCC compilation command 4044, HCC 4060 generates host executable code 4070(2) and HCC device executable code 4082. In at least one embodiment, HCC device executable code 4082 is a compiled version of device code included in HIP source code 4030 that is executable on GPU 4092. In at least one embodiment, GPU 4092 may be any processor that is optimized for parallel instruction processing, is not compatible with CUDA, and is compatible with HCC. In at least one embodiment, GPU 4092 is developed by AMD Corporation of Santa Clara, CA. In at least one embodiment GPU, 4092 is a non-CUDA-enabled GPU 4092.

For explanatory purposes only, three different flows that may be implemented in at least one embodiment to compile CUDA source code 4010 for execution on CPU 4090 and different devices are depicted in FIG. 40A. In at least one embodiment, a direct CUDA flow compiles CUDA source code 4010 for execution on CPU 4090 and CUDA-enabled GPU 4094 without translating CUDA source code 4010 to HIP source code 4030. In at least one embodiment, an indirect CUDA flow translates CUDA source code 4010 to HIP source code 4030 and then compiles HIP source code 4030 for execution on CPU 4090 and CUDA-enabled GPU 4094. In at least one embodiment, a CUDA/HCC flow translates CUDA source code 4010 to HIP source code 4030 and then compiles HIP source code 4030 for execution on CPU 4090 and GPU 4092.

A direct CUDA flow that may be implemented in at least one embodiment is depicted via dashed lines and a series of bubbles annotated A1-A3. In at least one embodiment and as depicted with bubble annotated A1, CUDA compiler 4050 receives CUDA source code 4010 and a CUDA compile command 4048 that configures CUDA compiler 4050 to compile CUDA source code 4010. In at least one embodiment, CUDA source code 4010 used in a direct CUDA flow is written in a CUDA programming language that is based on a programming language other than C++ (e.g., C, Fortran, Python, Java, etc.). In at least one embodiment and in response to CUDA compile command 4048, CUDA compiler 4050 generates host executable code 4070(1) and CUDA device executable code 4084 (depicted with bubble annotated A2). In at least one embodiment and as depicted with bubble annotated A3, host executable code 4070(1) and CUDA device executable code 4084 may be executed on, respectively, CPU 4090 and CUDA-enabled GPU 4094. In at least one embodiment, CUDA device executable code 4084 includes, without limitation, binary code. In at least one embodiment, CUDA device executable code 4084 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 4020 receives CUDA source code 4010.

In at least one embodiment and as depicted with bubble annotated B2, CUDA to HIP translation tool 4020 translates CUDA source code 4010 to HIP source code 4030. In at least one embodiment and as depicted with bubble annotated B3, HIP compiler driver 4040 receives HIP source code 4030 and determines that target device 4046 is CUDA-enabled.

In at least one embodiment and as depicted with bubble annotated B4, HIP compiler driver 4040 generates HIP/NVCC compilation command 4042 and transmits both HIP/NVCC compilation command 4042 and HIP source code 4030 to CUDA compiler 4050. In at least one embodiment and as described in greater detail in conjunction with FIG. 40B, HIP/NVCC compilation command 4042 configures CUDA compiler 4050 to compile HIP source code 4030 using, without limitation, a HIP to CUDA translation header and a CUDA runtime library. In at least one embodiment and in response to HIP/NVCC compilation command 4042, CUDA compiler 4050 generates host executable code 4070(1) and CUDA device executable code 4084 (depicted with bubble annotated B5). In at least one embodiment and as depicted with bubble annotated B6, host executable code 4070(1) and CUDA device executable code 4084 may be executed on, respectively, CPU 4090 and CUDA-enabled GPU 4094. In at least one embodiment, CUDA device executable code 4084 includes, without limitation, binary code. In at least one embodiment, CUDA device executable code 4084 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 4020 receives CUDA source code 4010. In at least one embodiment and as depicted with bubble annotated C2, CUDA to HIP translation tool 4020 translates CUDA source code 4010 to HIP source code 4030. In at least one embodiment and as depicted with bubble annotated C3, HIP compiler driver 4040 receives HIP source code 4030 and determines that target device 4046 is not CUDA-enabled.

In at least one embodiment, HIP compiler driver 4040 generates HIP/HCC compilation command 4044 and transmits both HIP/HCC compilation command 4044 and HIP source code 4030 to HCC 4060 (depicted with bubble annotated C4). In at least one embodiment and as described in greater detail in conjunction with FIG. 40C, HIP/HCC compilation command 4044 configures HCC 4060 to compile HIP source code 4030 using, without limitation, an HCC header and a HIP/HCC runtime library. In at least one embodiment and in response to HIP/HCC compilation command 4044, HCC 4060 generates host executable code 4070(2) and HCC device executable code 4082 (depicted with bubble annotated C5). In at least one embodiment and as depicted with bubble annotated C6, host executable code 4070(2) and HCC device executable code 4082 may be executed on, respectively, CPU 4090 and GPU 4092.

In at least one embodiment, after CUDA source code 4010 is translated to HIP source code 4030, HIP compiler driver 4040 may subsequently be used to generate executable code for either CUDA-enabled GPU 4094 or GPU 4092 without re-executing CUDA to HIP translation tool 4020. In at least one embodiment, CUDA to HIP translation tool 4020 translates CUDA source code 4010 to HIP source code 4030 that is then stored in memory. In at least one embodiment, HIP compiler driver 4040 then configures HCC 4060 to generate host executable code 4070(2) and HCC device executable code 4082 based on HIP source code 4030. In at least one embodiment, HIP compiler driver 4040 subsequently configures CUDA compiler 4050 to generate host executable code 4070(1) and CUDA device executable code 4084 based on stored HIP source code 4030.

Figure 40B:
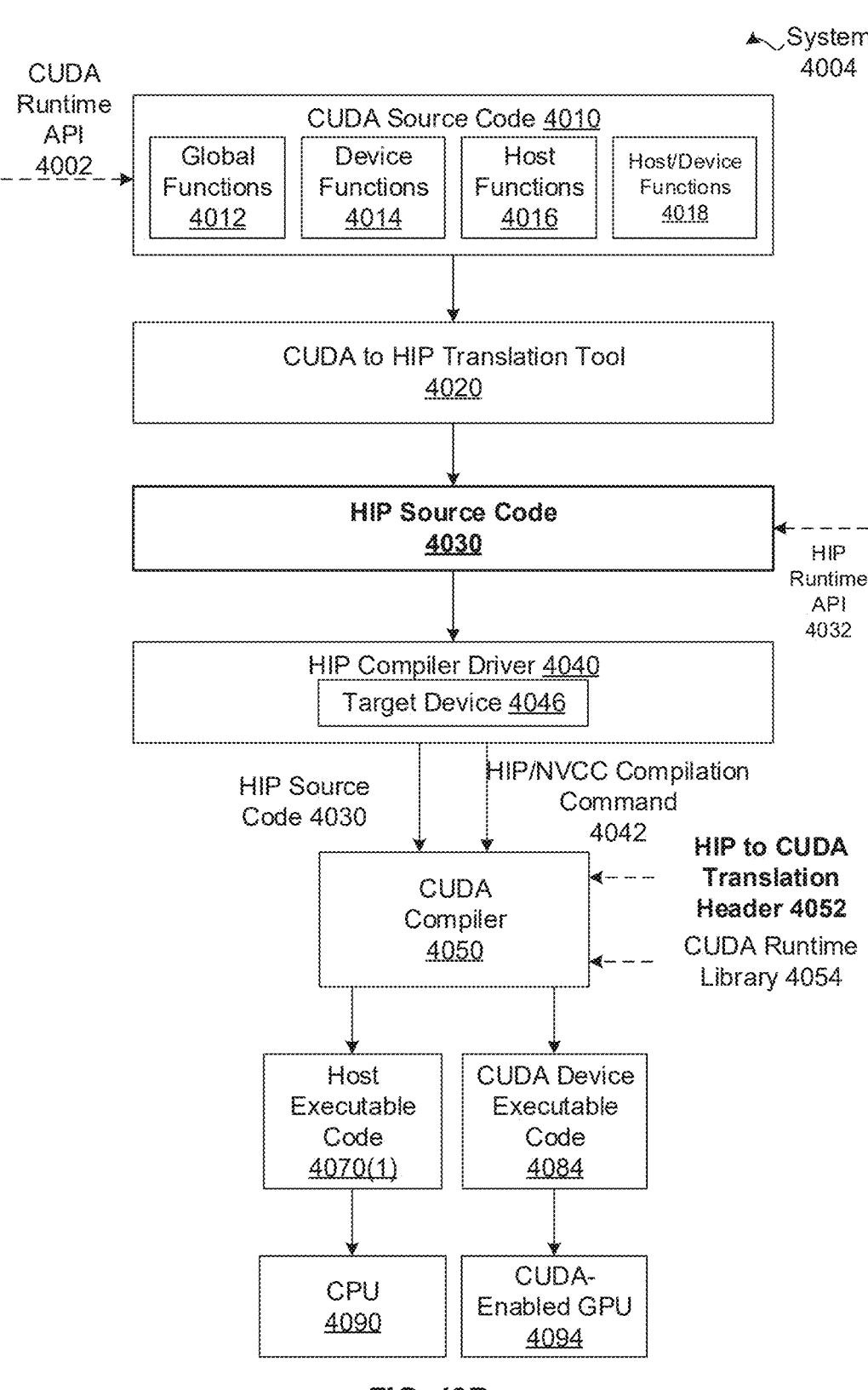
FIG. 40B illustrates a system configured to compile and execute CUDA source code of FIG. 40A using a CPU and a CUDA-enabled GPU, in accordance with at least one embodiment.

FIG. 40B illustrates a system 4004 configured to compile and execute CUDA source code 4010 of FIG. 40A using CPU 4090 and CUDA-enabled GPU 4094, in accordance with at least one embodiment. In at least one embodiment, system 4004 includes, without limitation, CUDA source code 4010, CUDA to HIP translation tool 4020, HIP source code 4030, HIP compiler driver 4040, CUDA compiler 4050, host executable code 4070(1), CUDA device executable code 4084, CPU 4090, and CUDA-enabled GPU 4094.

In at least one embodiment and as described previously herein in conjunction with FIG. 40A, CUDA source code 4010 includes, without limitation, any number (including zero) of global functions 4012, any number (including zero) of device functions 4014, any number (including zero) of host functions 4016, and any number (including zero) of host/device functions 4018. In at least one embodiment, CUDA source code 4010 also includes, without limitation, any number of calls to any number of functions that are specified in any number of CUDA APIs.

In at least one embodiment, CUDA to HIP translation tool 4020 translates CUDA source code 4010 to HIP source code 4030. In at least one embodiment, CUDA to HIP translation tool 4020 converts each kernel call in CUDA source code 4010 from a CUDA syntax to a HIP syntax and converts any number of other CUDA calls in CUDA source code 4010 to any number of other functionally similar HIP calls.

In at least one embodiment, HIP compiler driver 4040 determines that target device 4046 is CUDA-enabled and generates HIP/NVCC compilation command 4042. In at least one embodiment, HIP compiler driver 4040 then configures CUDA compiler 4050 via HIP/NVCC compilation command 4042 to compile HIP source code 4030. In at least one embodiment, HIP compiler driver 4040 provides access to a HIP to CUDA translation header 4052 as part of configuring CUDA compiler 4050. In at least one embodiment, HIP to CUDA translation header 4052 translates any number of mechanisms (e.g., functions) specified in any number of HIP APIs to any number of mechanisms specified in any number of CUDA APIs. In at least one embodiment, CUDA compiler 4050 uses HIP to CUDA translation header 4052 in conjunction with a CUDA runtime library 4054 corresponding to CUDA runtime API 4002 to generate host executable code 4070(1) and CUDA device executable code 4084. In at least one embodiment, host executable code 4070(1) and CUDA device executable code 4084 may then be executed on, respectively, CPU 4090 and CUDA-enabled GPU 4094. In at least one embodiment, CUDA device executable code 4084 includes, without limitation, binary code. In at least one embodiment, CUDA device executable code 4084 includes, without limitation, PTX code and is further compiled into binary code for a specific target device at runtime.

Figure 40C:
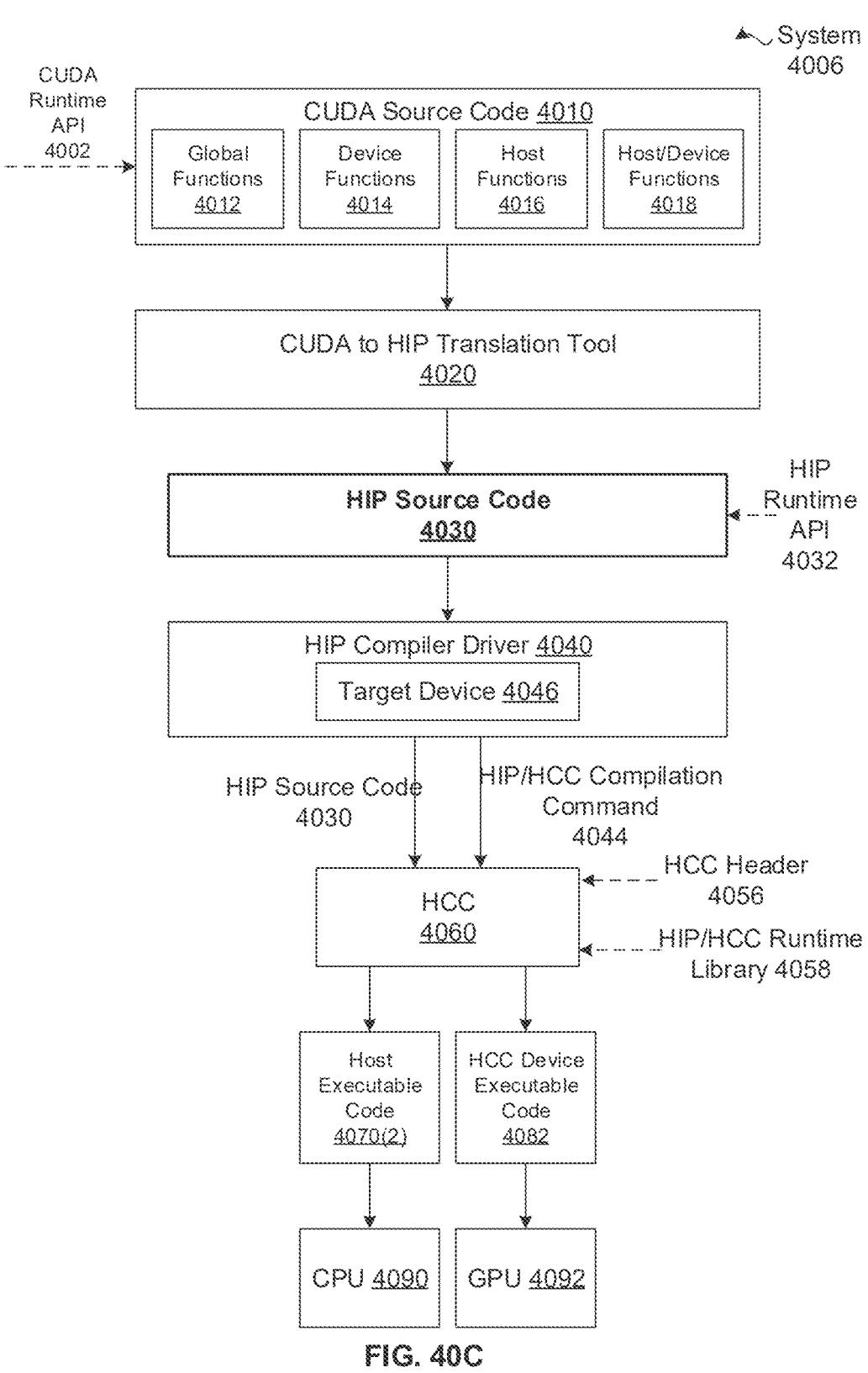
FIG. 40C illustrates a system configured to compile and execute CUDA source code of FIG. 40A using a CPU and a non-CUDA-enabled GPU, in accordance with at least one embodiment.

FIG. 40C illustrates a system 4006 configured to compile and execute CUDA source code 4010 of FIG. 40A using CPU 4090 and non-CUDA-enabled GPU 4092, in accordance with at least one embodiment. In at least one embodiment, system 4006 includes, without limitation, CUDA source code 4010, CUDA to HIP translation tool 4020, HIP source code 4030, HIP compiler driver 4040, HCC 4060, host executable code 4070(2), HCC device executable code 4082, CPU 4090, and GPU 4092.

In at least one embodiment and as described previously herein in conjunction with FIG. 40A, CUDA source code 4010 includes, without limitation, any number (including zero) of global functions 4012, any number (including zero) of device functions 4014, any number (including zero) of host functions 4016, and any number (including zero) of host/device functions 4018. In at least one embodiment, CUDA source code 4010 also includes, without limitation, any number of calls to any number of functions that are specified in any number of CUDA APIs.

In at least one embodiment, CUDA to HIP translation tool 4020 translates CUDA source code 4010 to HIP source code 4030. In at least one embodiment, CUDA to HIP translation tool 4020 converts each kernel call in CUDA source code 4010 from a CUDA syntax to a HIP syntax and converts any number of other CUDA calls in source code 4010 to any number of other functionally similar HIP calls.

In at least one embodiment, HIP compiler driver 4040 subsequently determines that target device 4046 is not CUDA-enabled and generates HIP/HCC compilation command 4044. In at least one embodiment, HIP compiler driver 4040 then configures HCC 4060 to execute HIP/HCC compilation command 4044 to compile HIP source code 4030. In at least one embodiment, HIP/HCC compilation command 4044 configures HCC 4060 to use, without limitation, a HIP/HCC runtime library 4058 and an HCC header 4056 to generate host executable code 4070(2) and HCC device executable code 4082. In at least one embodiment, HIP/HCC runtime library 4058 corresponds to HIP runtime API 4032. In at least one embodiment, HCC header 4056 includes, without limitation, any number and type of interoperability mechanisms for HIP and HCC. In at least one embodiment, host executable code 4070(2) and HCC device executable code 4082 may be executed on, respectively, CPU 4090 and GPU 4092.

FIG. 41 illustrates an exemplary kernel translated by CUDA-to-HIP translation tool 4020 of FIG. 40C, in accordance with at least one embodiment. In at least one embodiment, CUDA source code 4010 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 4010 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 4110. In at least one embodiment, CUDA kernel launch syntax 4110 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 4110 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 4110, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 4110, SharedMemorySize defaults to zero. In at least one embodiment and with respect to CUDA kernel launch syntax 4110, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 4010 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 4110, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 4010 to HIP source code 4030, CUDA to HIP translation tool 4020 translates each kernel call in CUDA source code 4010 from CUDA kernel launch syntax 4110 to a HIP kernel launch syntax 4120 and converts any number of other CUDA calls in source code 4010 to any number of other functionally similar HIP calls. In at least one embodiment, HIP kernel launch syntax 4120 is specified as "hipLaunchKernelGGL(KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 4120 as in CUDA kernel launch syntax 4110 (described previously herein). In at least one embodiment, arguments SharedMemorySize and Stream are required in HIP kernel launch syntax 4120 and are optional in CUDA kernel launch syntax 4110.

In at least one embodiment, a portion of HIP source code 4030 depicted in FIG. 41 is identical to a portion of CUDA source code 4010 depicted in FIG. 41 except for a kernel call that causes kernel MatAdd to execute on a device. In at least one embodiment, kernel MatAdd is defined in HIP source code 4030 with the same "_global_" declaration specifier with which kernel MatAdd is defined in CUDA source code 4010. In at least one embodiment, a kernel call in HIP source code 4030 is "hipLaunchKernelGGL(MatAdd, numBlocks, threadsPerBlock, 0, 0, A, B, C);", while a corresponding kernel call in CUDA source code 4010 is "MatAdd<<<numBlocks, threadsPerBlock>>>(A, B, C);".

Figure 42:
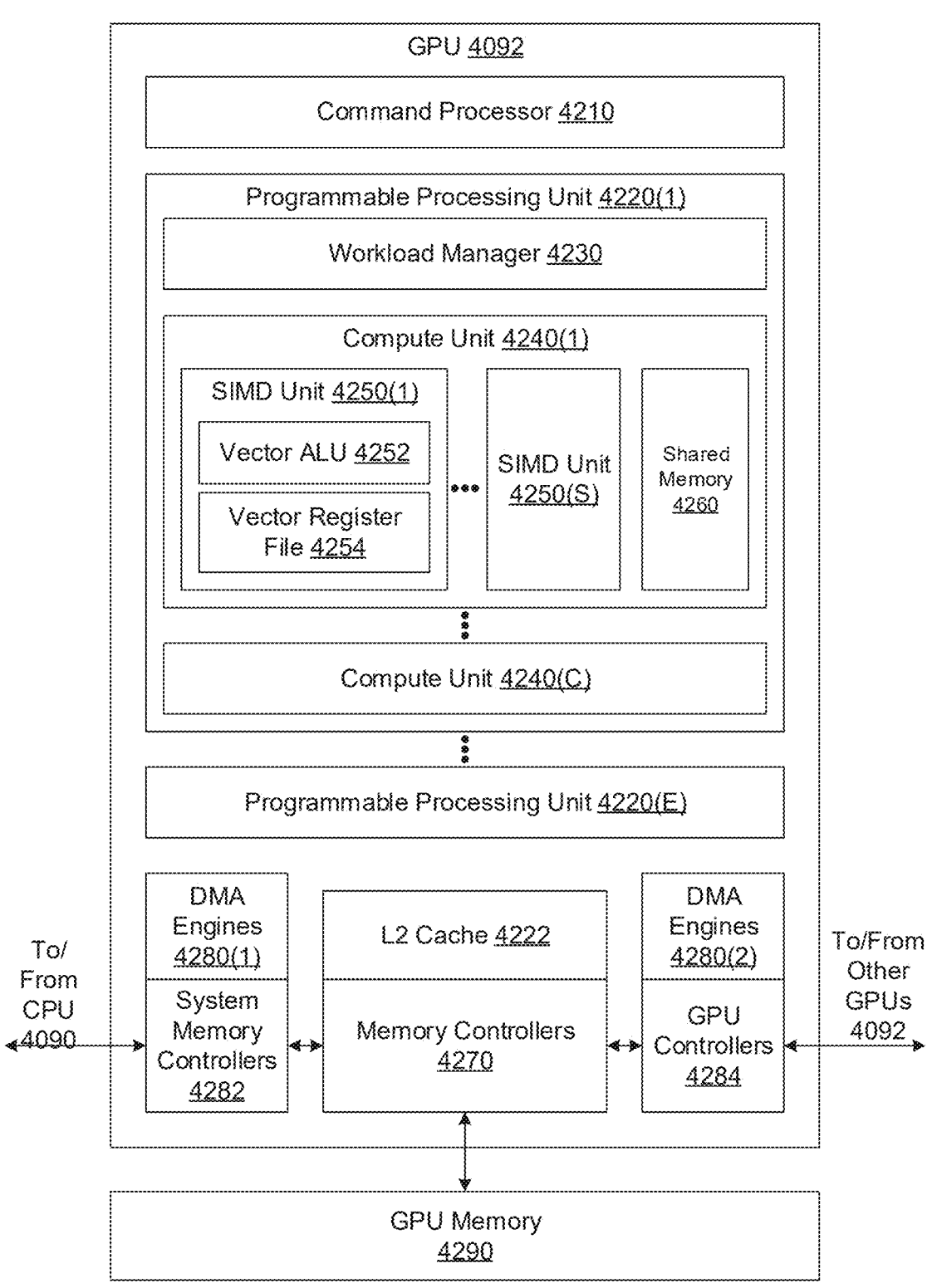
FIG. 42 illustrates non-CUDA-enabled GPU of FIG. 40C in greater detail, in accordance with at least one embodiment.

FIG. 42 illustrates non-CUDA-enabled GPU 4092 of FIG. 40C in greater detail, in accordance with at least one embodiment. In at least one embodiment, GPU 4092 is developed by AMD corporation of Santa Clara. In at least one embodiment, GPU 4092 can be configured to perform compute operations in a highly-parallel fashion. In at least one embodiment, GPU 4092 is configured to execute graphics pipeline operations such as draw commands, pixel operations, geometric computations, and other operations associated with rendering an image to a display. In at least one embodiment, GPU 4092 is configured to execute operations unrelated to graphics. In at least one embodiment, GPU 4092 is configured to execute both operations related to graphics and operations unrelated to graphics. In at least one embodiment, GPU 4092 can be configured to execute device code included in HIP source code 4030.

In at least one embodiment, GPU 4092 includes, without limitation, any number of programmable processing units 4220, a command processor 4210, an L2 cache 4222, memory controllers 4270, DMA engines 4280(1), system memory controllers 4282, DMA engines 4280(2), and GPU controllers 4284. In at least one embodiment, each programmable processing unit 4220 includes, without limitation, a workload manager 4230 and any number of compute units 4240. In at least one embodiment, command processor 4210 reads commands from one or more command queues (not shown) and distributes commands to workload managers 4230. In at least one embodiment, for each programmable processing unit 4220, associated workload manager 4230 distributes work to compute units 4240 included in programmable processing unit 4220. In at least one embodiment, each compute unit 4240 may execute any number of thread blocks, but each thread block executes on a single compute unit 4240. In at least one embodiment, a workgroup is a thread block.

In at least one embodiment, each compute unit 4240 includes, without limitation, any number of SIMD units 4250 and a shared memory 4260. In at least one embodiment, each SIMD unit 4250 implements a SIMD architecture and is configured to perform operations in parallel. In at least one embodiment, each SIMD unit 4250 includes, without limitation, a vector ALU 4252 and a vector register file 4254. In at least one embodiment, each SIMD unit 4250 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4260.

In at least one embodiment, programmable processing units 4220 are referred to as "shader engines." In at least one embodiment, each programmable processing unit 4220 includes, without limitation, any amount of dedicated graphics hardware in addition to compute units 4240. In at least one embodiment, each programmable processing unit 4220 includes, without limitation, any number (including zero) of geometry processors, any number (including zero) of rasterizers, any number (including zero) of render back ends, workload manager 4230, and any number of compute units 4240.

In at least one embodiment, compute units 4240 share L2 cache 4222. In at least one embodiment, L2 cache 4222 is partitioned. In at least one embodiment, a GPU memory 4290 is accessible by all compute units 4240 in GPU 4092. In at least one embodiment, memory controllers 4270 and system memory controllers 4282 facilitate data transfers between GPU 4092 and a host, and DMA engines 4280(1) enable asynchronous memory transfers between GPU 4092 and such a host. In at least one embodiment, memory controllers 4270 and GPU controllers 4284 facilitate data transfers between GPU 4092 and other GPUs 4092, and DMA engines 4280(2) enable asynchronous memory transfers between GPU 4092 and other GPUs 4092.

In at least one embodiment, GPU 4092 includes, without limitation, any amount and type of system interconnect that facilitates data and control transmissions across any number and type of directly or indirectly linked components that may be internal or external to GPU 4092. In at least one embodiment, GPU 4092 includes, without limitation, any number and type of I/O interfaces (e.g., PCIe) that are coupled to any number and type of peripheral devices. In at least one embodiment, GPU 4092 may include, without limitation, any number (including zero) of display engines and any number (including zero) of multimedia engines. In at least one embodiment, GPU 4092 implements a memory subsystem that includes, without limitation, any amount and type of memory controllers (e.g., memory controllers 4270 and system memory controllers 4282) and memory devices (e.g., shared memories 4260) that may be dedicated to one component or shared among multiple components. In at least one embodiment, GPU 4092 implements a cache subsystem that includes, without limitation, one or more cache memories (e.g., L2 cache 4222) that may each be private to or shared between any number of components (e.g., SIMD units 4250, compute units 4240, and programmable processing units 4220).

Figure 43:
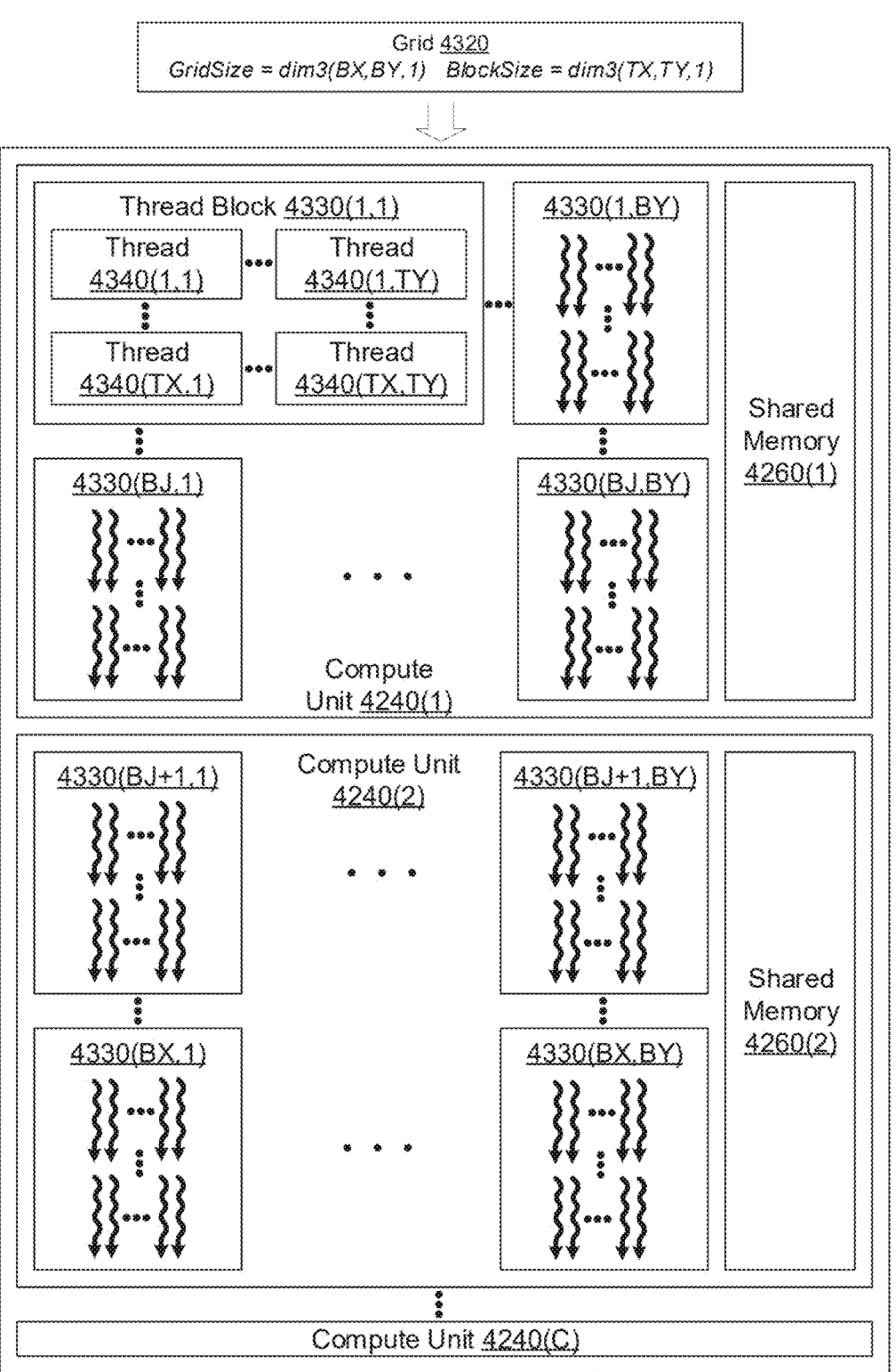
FIG. 43 illustrates how threads of an exemplary CUDA grid are mapped to different compute units of FIG. 42, in accordance with at least one embodiment.

FIG. 43 illustrates how threads of an exemplary CUDA grid 4320 are mapped to different compute units 4240 of FIG. 42, in accordance with at least one embodiment. In at least one embodiment and for explanatory purposes only, grid 4320 has a GridSize of BX by BY by 1 and a BlockSize of TX by TY by 1. In at least one embodiment, grid 4320 therefore includes, without limitation, (BX*BY) thread blocks 4330 and each thread block 4330 includes, without limitation, (TX*TY) threads 4340. Threads 4340 are depicted in FIG. 43 as squiggly arrows.

In at least one embodiment, grid 4320 is mapped to programmable processing unit 4220(1) that includes, without limitation, compute units 4240(1)-4240(C). In at least one embodiment and as shown, (BJ*BY) thread blocks 4330 are mapped to compute unit 4240(1), and the remaining thread blocks 4330 are mapped to compute unit 4240(2). In at least one embodiment, each thread block 4330 may include, without limitation, any number of warps, and each warp is mapped to a different SIMD unit 4250 of FIG. 42.

In at least one embodiment, warps in a given thread block 4330 may synchronize together and communicate through shared memory 4260 included in associated compute unit 4240. For example and in at least one embodiment, warps in thread block 4330(BJ,1) can synchronize together and communicate through shared memory 4260(1). For example and in at least one embodiment, warps in thread block 4330(BJ+1, 1) can synchronize together and communicate through shared memory 4260(2).

Figure 44:
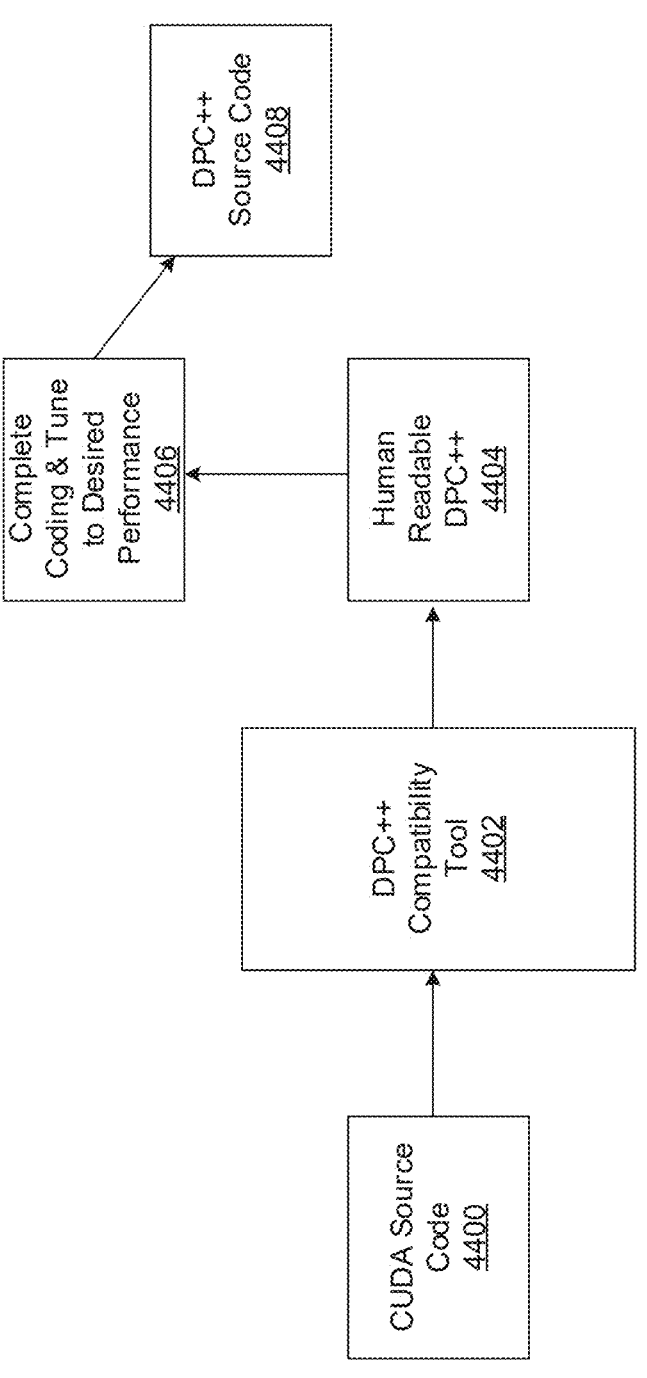
FIG. 44 illustrates how to migrate existing CUDA code to Data Parallel C++ code, in accordance with at least one embodiment.

FIG. 44 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 4400 is provided as an input to a DPC++ compatibility tool 4402 to generate human readable DPC++ 4404. In at least one embodiment, human readable DPC++ 4404 includes inline comments generated by DPC++ compatibility tool 4402 that guides a developer on how and/or where to modify DPC++ code to complete coding and tuning to desired performance 4406, thereby generating DPC++ source code 4408.

In at least one embodiment, CUDA source code 4400 is or includes a collection of human-readable source code in a CUDA programming language. In at least one embodiment, CUDA source code 4400 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 4400 described in connection with FIG. 44 may be in accordance with those discussed elsewhere in this document.

In at least one embodiment, DPC++ compatibility tool 4402 refers to an executable tool, program, application, or any other suitable type of tool that is used to facilitate migration of CUDA source code 4400 to DPC++ source code 4408. In at least one embodiment, DPC++ compatibility tool 4402 is a command-line-based code migration tool available as part of a DPC++ tool kit that is used to port existing CUDA sources to DPC++. In at least one embodiment, DPC++ compatibility tool 4402 converts some or all source code of a CUDA application from CUDA to DPC++ and generates a resulting file that is written at least partially in DPC++, referred to as human readable DPC++ 4404. In at least one embodiment, human readable DPC++ 4404 includes comments that are generated by DPC++ compatibility tool 4402 to indicate where user intervention may be necessary. In at least one embodiment, user intervention is necessary when CUDA source code 4400 calls a CUDA API that has no analogous DPC++ API; other examples where user intervention is required are discussed later in greater detail.

In at least one embodiment, a workflow for migrating CUDA source code 4400 (e.g., application or portion thereof) includes creating one or more compilation database files; migrating CUDA to DPC++ using a DPC++ compatibility tool 4402; completing migration and verifying correctness, thereby generating DPC++ source code 4408; and compiling DPC++ source code 4408 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 4402 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 4402 migrates CUDA code (e.g., applications) written in CUDA to DPC++ by generating DPC++ wherever possible. In at least one embodiment, DPC++ compatibility tool 4402 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 4402 to migrate CUDA code to DPC++. In at least one embodiment, non-CUDA C++ code and files are migrated as is. In at least one embodiment, DPC++ compatibility tool 4402 generates human readable DPC++ 4404 which may be DPC++ code that, as generated by DPC++ compatibility tool 4402, cannot be compiled by DPC++ compiler and requires additional plumbing for verifying portions of code that were not migrated correctly, and may involve manual intervention, such as by a developer. In at least one embodiment, DPC++ compatibility tool 4402 provides hints or tools embedded in code to help developers manually migrate additional code that could not be migrated automatically. In at least one embodiment, migration is a one-time activity for a source file, project, or application.

In at least one embodiment, DPC++ compatibility tool 44002 is able to successfully migrate all portions of CUDA code to DPC++ and there may simply be an optional step for manually verifying and tuning performance of DPC++ source code that was generated. In at least one embodiment, DPC++ compatibility tool 4402 directly generates DPC++ source code 4408 which is compiled by a DPC++ compiler without requiring or utilizing human intervention to modify DPC++ code generated by DPC++ compatibility tool 4402. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 4402. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global__ void VectorAddKernel(float* A, float* B, float* C)
{
    A[threadIdx.x] = threadIdx.x + 1.0f;
    B[threadIdx.x] = threadIdx.x + 1.0f;
    C[threadIdx.x] = A[threadIdx.x] + B[threadIdx.x];
}
int main( )
```

-continued

```
{
    float *d_A, *d_B, *d_C;
    cudaMalloc(&d_A, VECTOR_SIZE*sizeof(float));
    cudaMalloc(&d_B, VECTOR_SIZE*sizeof(float));
    cudaMalloc(&d_C, VECTOR_SIZE*sizeof(float));
    VectorAddKernel<<<1, VECTOR_SIZE>>>(d_A, d_B, d_C);
    float Result[VECTOR_SIZE] = { };
    cudaMemcpy(Result, d_C, VECTOR_SIZE*sizeof(float),
cudaMemcpyDeviceToHost);
    cudaFree(d_A);
    cudaFree(d_B);
    cudaFree(d_C);
    for (int i=0; i<VECTOR_SIZE; i++ {
        if (i % 16 == 0) {
            printf("\n");
        }
        printf("%f", Result[i]);
    }
    return 0;
}
```

In at least one embodiment and in connection with CUDA source file presented above, DPC++ compatibility tool 4402 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 4402 converts CUDA thread IDs used to index work elements to SYCL standard addressing for work elements via a local ID as part of migrating CUDA code to DPC++ code. In at least one embodiment, DPC++ code generated by DPC++ compatibility tool 4402 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 4402. In at least one embodiment, DPC++ compatibility tool 4402 modify CUDA APIs for memory setup and/or host calls to execute kernel on the acceleration device. In at least one embodiment and in connection with CUDA source file presented above, a corresponding human readable DPC++ 4404 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
sycl::nd_item<3> item_ct1)
{
    A[item_ct1.get_local_id(2)] = item_ct1.get_local_id(2) + 1.0f;
    B[item_ct1.get_local_id(2)] = item_ct1.get_local_id(2) + 1.0f;
    C[item_ct1.get_local_id(2)] = A[item_ct1.get_local_id(2)] +
B[item_ct1.get_local_id(2)];
}
int main( )
{
    float *d_A, *d_B, *d_C;
    d_A = (float *)sycl::malloc_device(VECTOR_SIZE * sizeof(float),
        dpct::get_current_device( ),
        dpct::get_default_context( ));
    d_B = (float *)sycl::malloc_device(VECTOR_SIZE * sizeof(float),
        dpct::get_current_device( ),
        dpct::get_default_context( ));
    d_C = (float *)sycl::malloc_device(VECTOR_SIZE * sizeof(float),
        dpct::get_current_device( ),
        dpct::get_default_context( ));
    dpct::get_default_queue_wait( ).submit([&](sycl::handler &cgh) {
        cgh.parallel_for(
            sycl::nd_range<3>(sycl::range<3>(1, 1, 1) *
            sycl::range<3>(1, 1, VECTOR SIZE) *
            sycl::range<3>(1, 1, VECTOR SIZE)),
            [=](sycl::nd_items<3> item_ct1) {
                VectorAddKernel(d_A, d_B, d_C, item_ct1);
            });
    });
    float Result[VECTOR_SIZE] = { };
    dpct::get_default_queue_wait( )
        .memcpy(Result, d_C, VECTOR SIZE * sizeof(float))
        .wait( );
    sycl::free(d_A, dpct::get_default_context( ));
    sycl::free(d_B, dpct::get_default_context( ));
    sycl::free(d_C, dpct::get_default_context( ));
    for (int i=0; i<VECTOR_SIZE; i++ {
        if (i % 16 == 0) {
            printf("\n");
        }
        printf("%f", Result[i]);
    }
    return 0;
}
```

In at least one embodiment, human readable DPC++ 4404 refers to output generated by DPC++ compatibility tool 4402 and may be optimized in one manner or another. In at least one embodiment, human readable DPC++ 4404 generated by DPC++ compatibility tool 4402 can be manually edited by a developer after migration to make it more maintainable, performance, or other considerations. In at least one embodiment, DPC++ code generated by DPC++ compatibility tool 44002 such as DPC++ disclosed can be optimized by removing repeat calls to get current device( ) and/or get default context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 4402 replace uses of unified shared memory with accessors.

In at least one embodiment, DPC++ compatibility tool 4402 has an option to change how it migrates CUDA code to DPC++ code. In at least one embodiment, DPC++ compatibility tool 4402 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 4402; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

It should be noted that, while example embodiments described herein may relate to a CUDA programming model, techniques described herein can be utilized with any suitable programming model, such HIP, oneAPI, and/or variations thereof.

At least one embodiment of the disclosure can be described in view of the following clauses:

1. A processor, comprising:
one or more circuits to perform a first application programming interface (API) to cause graph code to update a semaphore used by another API.
2. The processor of clause 1, wherein the graph code is to be performed, at least in part, by one or more graphics processing units (GPUs).
3. The processor of any one of clauses 1-2, wherein the first API is to add a semaphore signal node to the graph code.
4. The processor of any one of clauses 1-3, wherein the graph code is to be performed, at least in part, by one or more graphics processing units (GPUs) and the first API is to add a semaphore signal node to the graph code based, at least in part, on a parameter that specifies a graph to which to add the semaphore signal node.
5. The processor of any one of clauses 1-4, wherein the semaphore is to be allocated by the other API and the first API is to add a semaphore signal node to the graph code that is to perform a signal operation based, at least in part, on the semaphore, when the semaphore signal node is performed.
6. The processor of any one of clauses 1-4, wherein the first API is to add a semaphore signal node to the graph code, the one or more circuits are to perform a second API to update the semaphore signal node, and the other API is a third API.
7. The processor of any one of clauses 1-6, wherein the graph code is executable graph code, and the first API is to set one or more parameters of a semaphore signal node in the executable graph code.
8. The processor of any one of clauses 1-7, wherein the graph code is to be performed, at least in part, by one or more graphics processing units (GPUs), the other API is a graphics rendering API, and the semaphore is a counting semaphore.

9. A system, comprising:
one or more processors to perform a first application programming interface (API) to cause graph code to update a semaphore used by another API; and
one or more memories to store the graph code.
10. The system of clause 9, wherein the graph code is to be performed, at least in part, by one or more graphics processing units (GPUs), and the semaphore is to be allocated by the other API.
11. The system of any one of clauses 9-10, wherein the first API is to return one or more parameters of a semaphore signal node in the graph code in response to an API call to get the one or more parameters.
12. The system of any one of clauses 9-11, wherein the first API is to add a semaphore signal node to the graph code.
13. The system of any one of clauses 9-12, wherein the one or more memories are to store the semaphore and the other API is to use code not included in the graph code.
14. The system of any one of clauses 9-13, wherein the graph code is to be performed, at least in part, by one or more graphics processing units (GPUs) and the other API is a graphics rendering API.
15. A machine-readable medium having stored thereon a first application programming interface (API), which if performed by one or more processors, is to cause graph code to at least update a semaphore used by another API.
16. The machine-readable medium of clause 15, wherein the graph code is to be performed, at least in part, by one or more graphics processing units (GPUs), and the semaphore is a binary semaphore to be allocated by the other API.
17. The machine-readable medium of any one of clauses 15-16, wherein the graph code is to be performed, at least in part, by one or more graphics processing units (GPUs), and the semaphore is a counting semaphore to be allocated by the other API.
18. The machine-readable medium of any one of clauses 15-17, wherein the semaphore is to be allocated by the other API based, at least in part, on code not included in the graph code, and the first API is to add a semaphore signal node to the graph code that is to change a value of the semaphore when the semaphore signal node is performed.
19. The machine-readable medium of any one of clauses 15-18, wherein the first API is to add a semaphore signal node to the graph code based, at least in part, on a first parameter that specifies a graph to which to add the semaphore signal node, a second parameter that specifies one or more parameters of the semaphore signal node, and a third parameter that specifies one or more dependencies of the semaphore signal node.
20. The machine-readable medium of any one of clauses 15-19, wherein the semaphore is a counting semaphore to be allocated by the other API based, at least in part, on code not included in the graph code.
21. A method, comprising:
causing, based at least in part on a first application programming interface (API), graph code to update a semaphore used by another API.
22. The method of clause 21, wherein the graph code is to be performed, at least in part, by one or more graphics processing units (GPUs) and the first API is to add a semaphore signal node to the graph code that is to change a value of the semaphore.

23. The method of any one of clauses 21-22, wherein the graph code is to be performed, at least in part, by one or more graphics processing units (GPUs), the semaphore is to be allocated by the other API, and causing the graph code to update the semaphore includes causing the graph code to change a value of the semaphore when a semaphore signal node of the graph code is to be performed.

24. The method of any one of clauses 21-23, wherein the graph code is to be performed, at least in part, by one or more graphics processing units (GPUs) and the other API is to use code not included in the graph code.

25. The method of any one of clauses 21-24, wherein the method further includes generating executable graph code based, at least in part, on the graph code, and setting one or more parameters of a semaphore signal node of the executable graph code.

26. The method of any one of clauses 21-25, wherein the graph code is to be performed, at least in part, by one or more graphics processing units (GPUs), the semaphore is a counting semaphore to be allocated by the other API based, at least in part, on code not included in the graph code, and the method further includes adding, based at least in part on the first API, a semaphore signal node to the graph code that is to change a value of the counting semaphore when the semaphore signal node is performed.

27. A processor, comprising: one or more circuits to perform a first application programming interface (API) to cause graph code to wait on a semaphore used by another API.

28. The processor of clause 27, wherein the graph code is to be performed, at least in part, by one or more graphics processing units (GPUs).

29. The processor of any one of clauses 27-28, wherein the first API is to add a semaphore wait node to the graph code.

30. The processor of any one of clauses 27-29, wherein the graph code is to be performed, at least in part, by one or more graphics processing units (GPUs), and the first API is to add a semaphore wait node to the graph code based, at least in part, on a parameter that specifies a graph to which to add the semaphore wait node.

31. The processor of any one of clauses 27-30, wherein the semaphore is to be allocated by the other API, and the first API is to add a semaphore wait node to the graph code that is to perform a wait operation based, at least in part, on the semaphore, when the semaphore wait node is performed.

32. The processor of any one of clauses 27-31, wherein the first API is to add a semaphore wait node to the graph code, the one or more circuits are to perform a second API to set one or more parameters of the semaphore wait node, and the other API is a third API.

33. The processor of any one of clauses 27-32, wherein the graph code is executable graph code, and the first API is to set one or more parameters of a semaphore wait node in the executable graph code.

34. The processor of any one of clauses 27-33, wherein the graph code is to be performed, at least in part, by one or more graphics processing units (GPUs), the other API is a graphics rendering API, and the semaphore is a counting semaphore.

35. A system, comprising:
one or more processors to perform a first application programming interface (API) to cause graph code to wait on a semaphore used by another API; and
one or more memories to store the graph code.

36. The system of clause 35, wherein the semaphore is to be allocated by the other API, and the first API is to set one or more parameters of a semaphore wait node in the graph code that is to perform one or more wait operations based, at least in part, on the semaphore.

37. The system of any one of clauses 35-36, wherein the semaphore is to be allocated by the other API.

38. The system of any one of clauses 35-37, wherein the first API is to add a semaphore wait node to the graph code.

39. The system of any one of clauses 35-38, wherein the other API is to allocate the semaphore and the one or more memories are to store the semaphore.

40. The system of any one of clauses 35-39, wherein the graph code is to be performed, at least in part, by one or more graphics processing units (GPUs), the other API is to allocate the semaphore, and the other API is to use code not included in the graph code.

41. A machine-readable medium having stored thereon a first application programming interface (API), which if performed by one or more processors, is to cause graph code to at least wait on a semaphore used by another API.

42. The machine-readable medium of clause 41, wherein the graph code is to be performed, at least in part, by one or more graphics processing units (GPUs), and the semaphore is a binary semaphore to be allocated by the other API.

43. The machine-readable medium of any one of clauses 41-42, wherein the graph code is to be performed, at least in part, by one or more graphics processing units (GPUs), and the semaphore is a counting semaphore to be allocated by the other API.

44. The machine-readable medium of any one of clauses 41-43, wherein the semaphore is to be allocated by the other API based, at least in part, on code not included in the graph code, and the first API is to add a semaphore wait node to the graph code that is to perform a wait operation based, at least in part, on a value of the semaphore.

45. The machine-readable medium of any one of clauses 41-44, wherein the graph code is to be performed, at least in part, by one or more graphics processing units (GPUs), and the semaphore is a binary semaphore.

46. The machine-readable medium of any one of clauses 41-45, wherein the graph code is to be performed, at least in part, by one or more graphics processing units (GPUs), and the semaphore is a counting semaphore.

47. A method, comprising:
causing, based at least in part on a first application programming interface (API), graph code to wait on a semaphore used by another API.

48. The method of clause 47, wherein the graph code is to be performed, at least in part, by one or more graphics processing units (GPUs), and the first API is to add a semaphore wait node to the graph code that is to perform a wait operation based, at least in part, on the semaphore.

49. The method of any one of clauses 47-48, wherein the graph code is to be performed, at least in part, by one or more graphics processing units (GPUs), the semaphore is to be allocated by the other API, and the graph code is to wait to proceed until the semaphore is a predetermined value.

50. The method of any one of clauses 47-49, wherein the graph code is to be performed, at least in part, by one or more graphics processing units (GPUs), and the other API is to use code not included in the graph code.

51. The method of any one of clauses 47-50, wherein the method further includes generating executable graph code based, at least in part, on the graph code, and setting one or more parameters of a semaphore wait node of the executable graph code.

52. The method of any one of clauses 47-51, wherein the graph code is to be performed, at least in part, by one or more graphics processing units (GPUs), the semaphore is a counting semaphore to be allocated by the other API based, at least in part, on code not included in the graph code, and the method further includes adding, based at least in part on the first API, a semaphore wait node to the graph code that is to perform a wait operation based, at least in part, on a value of the counting semaphore.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising: one or more circuits to perform a first application programming interface (API) to generate one or more nodes in a graph code, wherein the one or more nodes causes the graph code to wait on a semaphore used by another API.

2. The processor of claim 1, wherein the graph code is to be performed, at least in part, by one or more graphics processing units (GPUs).

3. The processor of claim 1, wherein the first API is to update the one or more nodes in the graph code based, at least in part, on an update signal node parameter API.

4. The processor of claim 1, wherein the graph code is to be performed, at least in part, by one or more graphics processing units (GPUs), and the first API is to add the one or more nodes, wherein the one or more nodes is a semaphore wait node, to the graph code based, at least in part, on a parameter that specifies a graph to which to add the semaphore wait node.

5. The processor of claim 1, wherein the semaphore is to be allocated by the other API, and the first API is to add the one or more nodes, wherein the one or more nodes is a semaphore wait node, to the graph code that is to perform a wait operation based, at least in part, on the semaphore, when the semaphore wait node is performed.

6. The processor of claim 1, wherein the first API is to add the one or more nodes, wherein the one or more nodes is a semaphore wait node, to the graph code, the one or more circuits are to perform a second API to set one or more parameters of the semaphore wait node, and the other API is a third API.

7. The processor of claim 1, wherein the graph code is executable graph code, and the first API is to set one or more parameters of the one or more nodes in the executable graph code.

8. The processor of claim 1, wherein the graph code is to be performed, at least in part, by one or more graphics processing units (GPUs), the other API is a graphics rendering API, and the semaphore is a counting semaphore.

9. A system, comprising:
one or more processors to perform a first application programming interface (API) to generate one or more nodes in a graph code, wherein the one or more nodes causes the graph code to wait on a semaphore used by another API; and one or more memories to store the graph code.

10. The system of claim 9, wherein the semaphore is to be allocated by the other API, and the first API is to set one or more parameters of the one or more nodes in the graph code that is to perform one or more wait operations based, at least in part, on the semaphore.

11. The system of claim 9, wherein the semaphore is to be allocated by the other API.

12. The system of claim 9, wherein the first API is to update the one or more nodes in the graph code based, at least in part, on an update signal node parameter API.

13. The system of claim 9, wherein the other API is to allocate the semaphore and the one or more memories are to store the semaphore.

14. The system of claim 9, wherein the graph code is to be performed, at least in part, by one or more graphics processing units (GPUs), the other API is to allocate the semaphore, and the other API is to use code not included in the graph code.

15. A non-transitory machine-readable medium having stored thereon a first application programming interface (API), which if performed by one or more processors, is to generate one or more nodes in a graph code, wherein the one or more nodes causes the graph code to at least wait on a semaphore used by another API.

16. The non-transitory machine-readable medium of claim 15, wherein the graph code is to be performed, at least in part, by one or more graphics processing units (GPUs), and the semaphore is a binary semaphore to be allocated by the other API.

17. The non-transitory machine-readable medium of claim 15, wherein the graph code is to be performed, at least in part, by one or more graphics processing units (GPUs), and the semaphore is a counting semaphore to be allocated by the other API.

18. The non-transitory machine-readable medium of claim 15, wherein the semaphore is to be allocated by the other API based, at least in part, on code not included in the graph code, and the first API is to add the one or more nodes to the graph code that is to perform a wait operation based, at least in part, on a value of the semaphore.

19. The non-transitory machine-readable medium of claim 15, wherein the graph code is to be performed, at least in part, by one or more graphics processing units (GPUs), and the semaphore is a binary semaphore.

20. The non-transitory machine-readable medium of claim 15, wherein the graph code is to be performed, at least in part, by one or more graphics processing units (GPUs), and the semaphore is a counting semaphore.

21. A method, comprising:
generating, based at least in part on a first application programming interface (API), one or more nodes in a graph code to cause the graph code to wait on a semaphore used by another API.

22. The method of claim 21, wherein the graph code is to be performed, at least in part, by one or more graphics processing units (GPUs), and the first API is to add the one or more nodes to the graph code that is to perform a wait operation based, at least in part, on the semaphore.

23. The method of claim 21, wherein the graph code is to be performed, at least in part, by one or more graphics processing units (GPUs), the semaphore is to be allocated by the other API, and the graph code is to wait to proceed until the semaphore is a predetermined value.

24. The method of claim 21, wherein the graph code is to be performed, at least in part, by one or more graphics processing units (GPUs), and the other API is to use code not included in the graph code.

25. The method of claim 21, wherein the method further includes generating executable graph code based, at least in part, on the graph code, and setting one or more parameters of a semaphore wait node of the executable graph code.

26. The method of claim 21, wherein the graph code is to be performed, at least in part, by one or more graphics processing units (GPUs), the semaphore is a counting semaphore to be allocated by the other API based, at least in part, on code not included in the graph code, and the method further includes adding, based at least in part on the first API, the one or more nodes to the graph code that is to perform a wait operation based, at least in part, on a value of the counting semaphore.

27. The processor of claim 1, wherein the first API is to add an external semaphore wait node to a graph based, at least in part, on an API call that indicates one or more dependencies of the external semaphore wait node.

28. The processor of claim 1, wherein the first API is to add an external semaphore wait node to a graph based, at least in part, on an API call that includes a graph identifier parameter, a dependencies parameter, and a node parameters parameter.

* * * * *